US011273902B2

(12) United States Patent
Gatto

(10) Patent No.: US 11,273,902 B2
(45) Date of Patent: Mar. 15, 2022

(54) BLADE OR WING

(71) Applicant: Brunel University London, Uxbridge Middlesex (GB)

(72) Inventor: Alvin Gatto, Uxbridge Middlesex (GB)

(73) Assignee: Brunel University London, Uxbridge (GB)

( * ) Notice: Subject to any disclaimer, the term of this patent is extended or adjusted under 35 U.S.C. 154(b) by 461 days.

(21) Appl. No.: 16/297,126

(22) Filed: Mar. 8, 2019

(65) Prior Publication Data

US 2019/0202543 A1    Jul. 4, 2019

Related U.S. Application Data

(63) Continuation-in-part of application No. PCT/GB2017/052627, filed on Sep. 8, 2017.

(30) Foreign Application Priority Data

Sep. 9, 2016    (GB) .................................. 1615399.1

(51) Int. Cl.
*B64C 3/52*    (2006.01)
*F01D 5/00*    (2006.01)
(Continued)

(52) U.S. Cl.
CPC ................ *B64C 3/52* (2013.01); *B64C 3/187* (2013.01); *B64C 3/48* (2013.01); *B64C 13/40* (2013.01);
(Continued)

(58) Field of Classification Search
CPC .... B64C 3/38; B64C 3/42; B64C 3/48; B64C 3/52; B64C 3/187
See application file for complete search history.

(56) References Cited

U.S. PATENT DOCUMENTS 4,863,117 A  *  9/1989  Riout ...................... B64C 33/02
                                                          244/48
5,004,189 A  *  4/1991  Igram ...................... B64C 3/48
                                                          244/219
(Continued)

FOREIGN PATENT DOCUMENTS

DE        271830 C      3/1914
EP        2397403 A2    12/2011
(Continued)

OTHER PUBLICATIONS

Wenzinger, "Wind Tunnel Investigations of Aodinary and Split Flaps on Airfoils of Different Profile", NACA Report 554, Langley Field, VA, (1935), pp. 223-236.
(Continued)

*Primary Examiner* — Michael H Wang
(74) *Attorney, Agent, or Firm* — Cook Alex Ltd.

(57) ABSTRACT

A blade or wing element includes a plurality of ribs (20) rotatable and/or slidable with respect to one another whereby to vary the aerodynamic configuration of the blade or wing element by causing a twist thereof. A blade or wing or blade or wing assembly, including such a blade or wing element is disclosed, as well as an aerodynamic apparatus such as an aircraft, or a wind turbine. A method of assembling a blade or wing element is also disclosed.

16 Claims, 41 Drawing Sheets

(51) Int. Cl.
    B64C 3/48      (2006.01)
    B64C 3/18      (2006.01)
    B64C 13/40     (2006.01)
    F03D 1/06      (2006.01)
    B64C 3/44      (2006.01)
    B64C 3/54      (2006.01)

(52) U.S. Cl.
    CPC ............. *F01D 5/00* (2013.01); *F03D 1/0633* (2013.01); *F03D 1/0675* (2013.01); *B64C 2003/445* (2013.01); *B64C 2003/543* (2013.01); *F05B 2240/31* (2013.01); *F05B 2250/02* (2013.01); *Y02T 50/10* (2013.01)

(56)  References Cited

U.S. PATENT DOCUMENTS

| | | | | |
|---|---|---|---|---|
| 5,681,014 | A * | 10/1997 | Palmer | B64C 3/52 244/219 |
| 6,173,924 | B1 * | 1/2001 | Young | B64C 3/48 244/215 |
| 2003/0141409 | A1 * | 7/2003 | Lisoski | B64C 3/42 244/13 |
| 2008/0001028 | A1 * | 1/2008 | Kendall | B64C 3/52 244/75.1 |
| 2011/0084174 | A1 * | 4/2011 | Hemmelgarn | B64C 3/48 244/200 |
| 2011/0303796 | A1 * | 12/2011 | Etling | B64C 7/00 244/90 R |
| 2016/0176502 | A1 | 6/2016 | Snook | |
| 2017/0305525 | A1 * | 10/2017 | Xi | B64C 3/385 |
| 2018/0118327 | A1 * | 5/2018 | Blevins | B64C 3/185 |
| 2018/0257759 | A1 * | 9/2018 | Etling | B64C 9/08 |
| 2019/0077496 | A1 * | 3/2019 | Livieratos | B64C 9/10 |

FOREIGN PATENT DOCUMENTS

| | | | |
|---|---|---|---|
| EP | 2527247 | A1 | 11/2012 |
| FR | 2833571 | A1 | 6/2003 |
| GB | 191129058 | A | 12/1911 |
| GB | 2505942 | A | 3/2014 |
| WO | 2013061351 | A1 | 5/2013 |
| WO | WO 2013061351 | | 5/2013 |
| WO | WO-2013061351 | A1 * | 5/2013 ............... B64C 3/52 |

OTHER PUBLICATIONS

Shortal et al., "Wind Tunnel Investigations of Wings with Ordinary Ailerons and Full Span External Airfoil Flaps", NACA Report 603, Langley Field, VA., (1937).

Abbott et al., "Theory of Wing Sections: Including a Summary of Airfoil Data", Press 11 (1959), pp. 452-453.

Mueller et al. "Experimental Studies of the Eppler 61 Airfoil at Low Reynolds Numbers" AIAA Paper 82-0345 (1982), pp. 1-11.

Esdu, "Rolling Moment Derivative, L ξ for Plain Ailerons at Subsonic Speeds," (Aug. 1988), pp. 1-18.

Cebeci, "Numerical and Physical Aspects of Aerodynamic Flows IV", Springer-Verlag—Berlin Heidelberg GmbH, (1990), pp. 225-229.

Saffman, "Vortex Dynamics", Cambridge Univ. Press, Cambridge, England, U.K., (1992), pp. 271-273.

Barlow et al., "Low-Speed Wind Tunnel Testing", 3rd ed., Wiley-Interscience, New York, (1999), pp. 287-288.

Khot et al., "Optimization of Flexible Wing Without Ailerons for Rolling Maneuver", J. of Aircraft 37 (2000), pp. 892-897.

Khot et al., "Flexible Composite Wing with Internal Actuation for Roll Maneuver", J. of Aircraft, 39, (2002), pp. 521-527.

Garcia et al., "Roll Control for a Micro Air Vehicle Using Active Wing Morphing", University of Florida, AIAA paper AIAA-2003-5347, (2003), pp. 1-12.

Houghton et al., "Aerodynamics for Engineering Students", Butterworth-Heinemann, 5th ed., (2003), pp. 323-325.

Amprikidis et al., "Experimental Validation of Wing Twist Control Using Adaptive Internal Structures" 45th AIAA/ASME/ASCE/AHS/ASC Structures, Structural Dynamics and Materials Conference (Palm Springs, CA), (2004), pp. 1-11.

Jha et al., "Morphing Aircraft Concepts, Classifications, and Challenges", Industrial and Commercial Applications of Smart Structures Tech., 5388 (2004), pp. 213-224.

Phillips et al., "Lifting-Line Analysis of Roll Control and Variable Twist", J. of Aircraft, 41 (2004), pp. 1169-1176.

Phillips, "Lifting-Line Analysis for Twisted Wings and Washout-Optimized Wings", J. of Aircraft, 41 (2004), pp. 128-136.

Yokozeki et al., "Mechanical Properties of Corrugated Composites for Candidate Materials of Flexible Wing Structures" Compos: Part A 37 (2006), pp. 1578-1586.

Majji et al., "Design of a Morphing Wing: Modeling and Experiments" AIAA Atmospheric Flight Mechanics Conference and Exhibit, Hilton Head, SC, (2007), pp. 1-9.

Thill et al., "Morphing Skins", The Aeronautical J., 112 (2008).

Bubert et al., "Design and Fabrication of a Passive 1D Morphing Aircraft Skin" J. Intell Mater Syst Struct 21 (2010), pp. 1699-1717.

Olympio et al. "Design of a Flexible Skin for a Shear Morphing Wing" J. Intell Mater Syst Struct 21 (2010), pp. 1755-1770.

Thill et al., "Composite Corrugated Structures for Morphing Wing Skin Applications", Smart Mater Struct, 19 (2010), pp. 1-10.

Vos et al., "Mechanism for Warp-Controlled Twist of a Morphing Wing", J. of Aircraft 47 (2010), pp. 450-457.

Youtube video of the Festo Smartbird, uploaded Mar. 24, 2011, accessed Feb. 22nd 2017 Festo Bionic, https://www.youtube.com/watch?v=9fbm WQ3ExEs.

Ajaj et al., "Conceptual Modelling of an Adaptive Torsion Structure", 52nd AIAA/ASME/ASCE/AHS/ASC Structures, Structural Dynamics and Materials Conference, Denver, Colorado, AIAA-2011-1883, (2011), pp. 1-15.

Sadraey., "Aircraft Design: A Systems Engineering Approach", Chapter 12 Design of Control Surfaces. Wiley Publications, (2012), pp. 632-744.

Dayyani et al., "The Mechanical Behavior of Composite Corrugated Core Coated with Elastomer for Morphing Skins" J. Compos Mater 48 (2014), pp. 1623-1636.

Kaygan, et al., "Investigation of Adaptable Winglets for Improved UAV Control and Performance", Int'l J. of Mech., Aerospace, Industrial and Mechatronics Engineering, 8 (2014), pp. 1281-1286.

Smith et al., "Computational and Experimental Validation of the Active Morphing Wing", J. of Aircraft 51 (2014), pp. 925-937.

Kaygan, et al., "Computational Analysis of Adaptable Winglets for Improved Morphing Aircraft Performance", Int'l J. of Mech., Aerospace, Industrial, Mechatronic and Manufacturing Engineering, 9 (2015), pp. 1189-1195.

Shaw et al., "Optimisation of Composite Corrugated Skins for Buckling in Morphing Aircraft", Composite Structures 119, (2015), pp. 227-237.

Search Report dated Feb. 28, 2017 in connection with UK application GB 1616161.4.

Search Report dated Jan. 25, 2018 in connection with UK application GB 1616161.4.

Saffman, "Vortex Dynamics", Cambridge Univ. Press, Cambridge, England, U.K., (1992), pp. 271-273. Applicant.

Youtube video of the Festo Smartbird, uploaded Mar. 24, 2011, accessed Feb. 22, 2017 Festo Bionic, https://www.youtube.com/watch?v=9fbm WQ3ExEs.

Examination Report dated Jul. 25, 2018 "UKSR20180725".

Intention to Grant dated Mar. 8, 2019 "UKIG20190308".

International Search Report and Written Opinion dated Nov. 21, 2017 "ISR20171121".

International Preliminary Report on Patentability dated Mar. 12, 2019 "IPR20190312".

International Search Report and Written Opinion dated Nov. 21, 2017 issued in connection with International App. No. PCT/GB2017/052627.

Examination Report dated Jul. 25, 2018 in connection with UK application GB 1616161.4.

(56) References Cited

OTHER PUBLICATIONS

International Preliminary Report on Patentability dated Mar. 12, 2019 issued in connection with International App. No. PCT/GB2017/052627.

Intention to Grant dated Mar. 8, 2019 in connection with UK application GB 1616161.4.

* cited by examiner

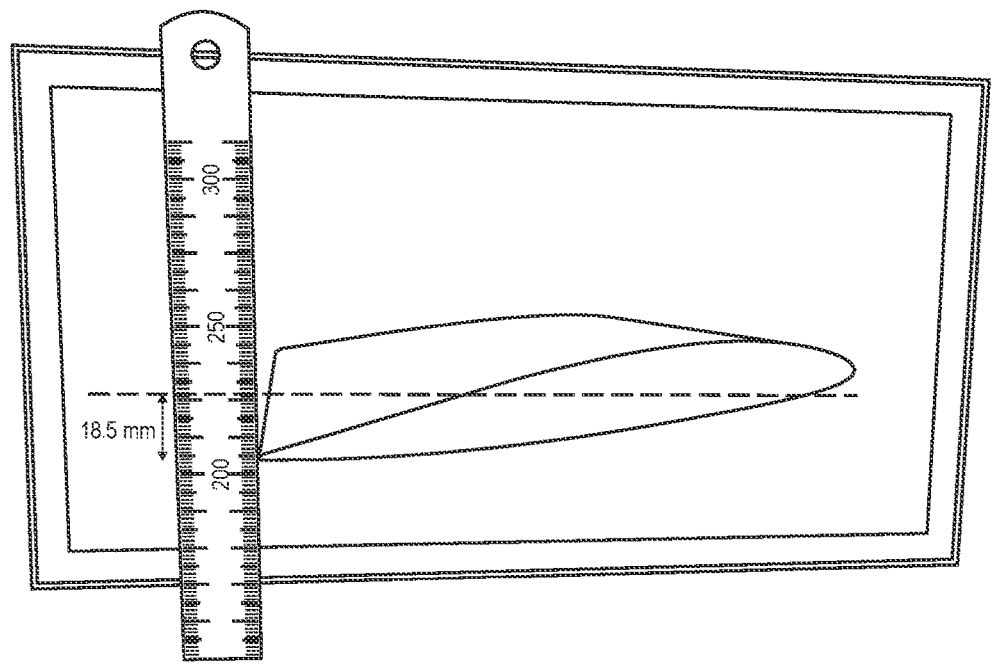
FIG. 12A
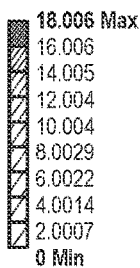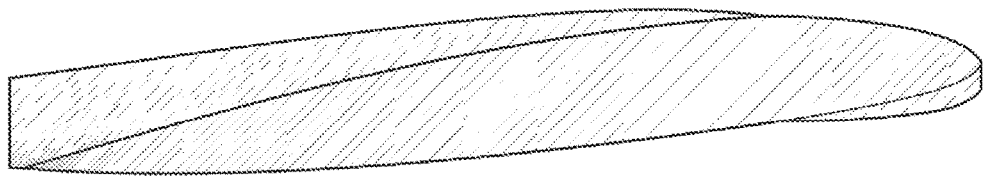
FIG. 12B

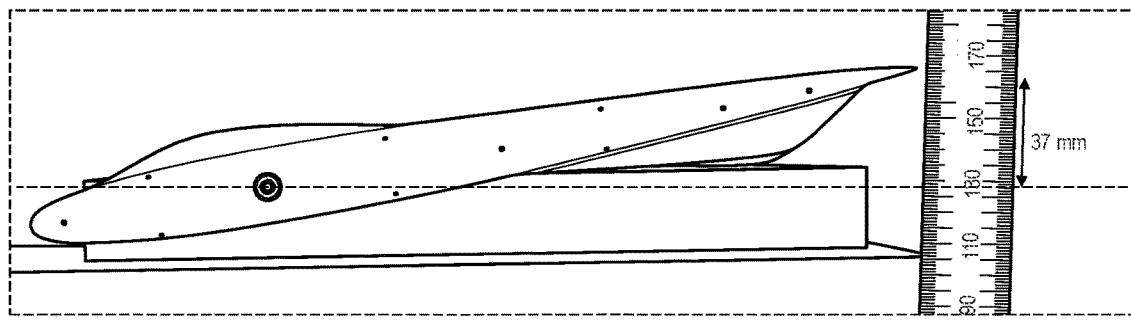
FIG. 21A
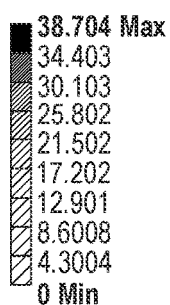
FIG. 21B

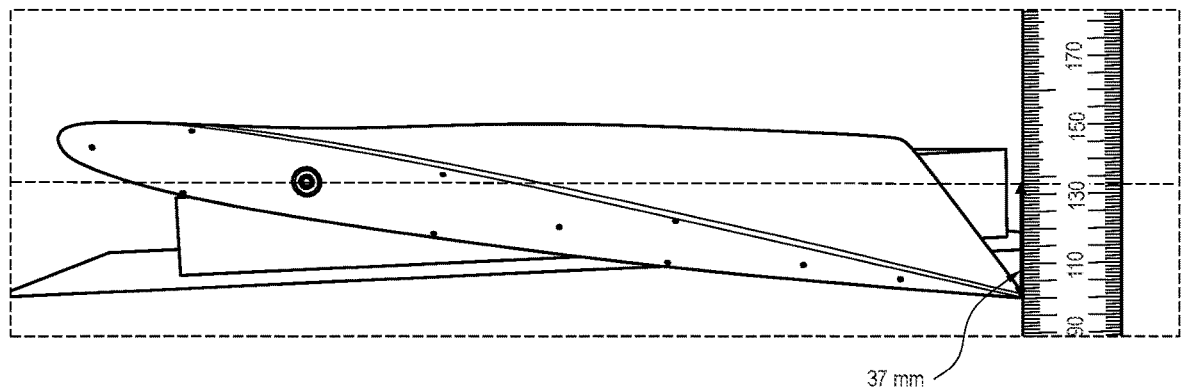
37 mm
FIG. 22A
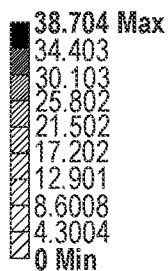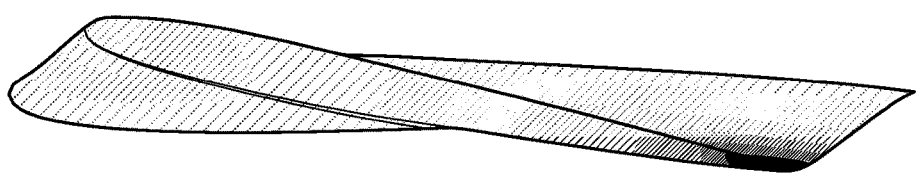
FIG. 22B

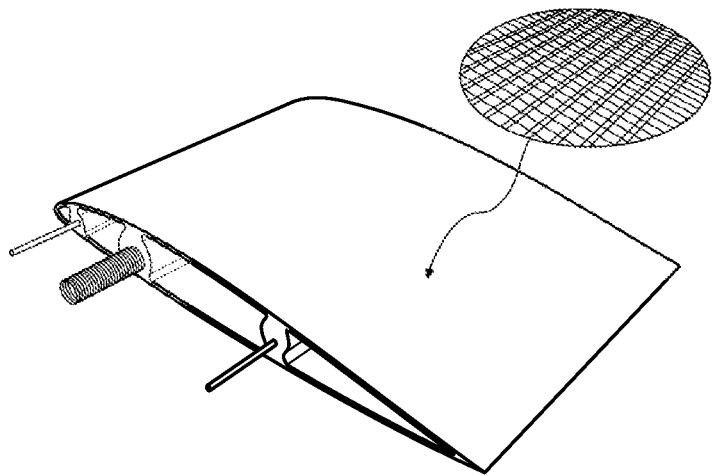

FIG. 34

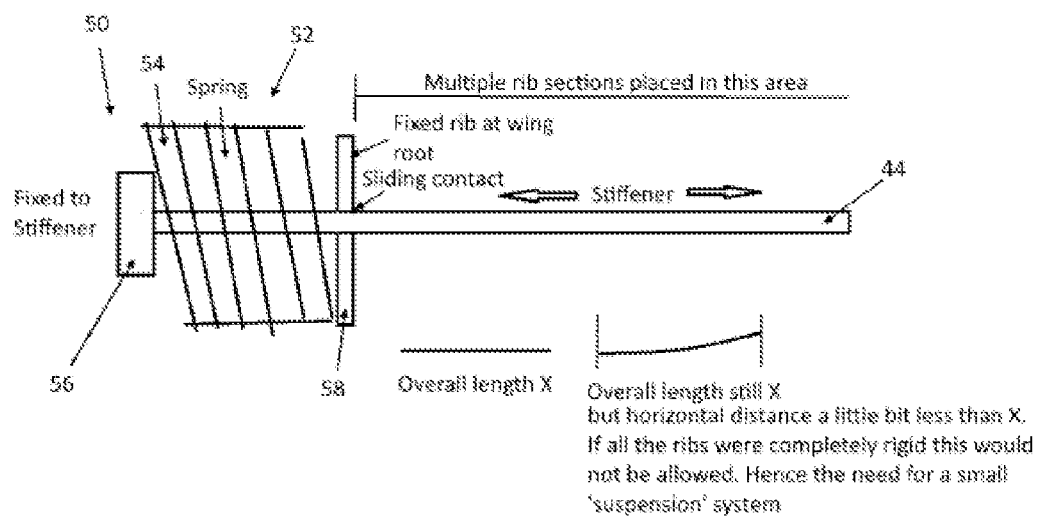

As the morphing elements twist the stiffeners move in and out slightly. Rather than compress these elements, we have designed a spring system to account for this movement. This system would be mounted on all stiffeners to adapt to the twist (change in length). The length changes because when the wing twists(if all rib elements are rigid), the overall wing span remains the same but an extra small length in stiffener is required to allow the twist out of plane

FIG. 35

BLADE OR WING

CROSS-REFERENCE TO RELATED APPLICATIONS

This application is a continuation-in-part of International Application No. PCT/GB2017/052627 having an international filing date of Sep. 8, 2017 entitled "Blade or Wing". The '627 international application claimed priority benefits, in turn, from United Kingdom Patent Application No. 1615399.1 filed on Sep. 9, 2016. The '627 international application also claimed priority benefits from United Kingdom Patent Application No. 1616161.4 filed on Sep. 22, 2016.

The '627 international application, the '399.1 UK application, and the '161.4 UK application are hereby incorporated by reference herein in their entireties.

FIELD OF THE INVENTION

The invention relates to a wing, for example for an aircraft, or a blade which is typically designed based on aerodynamic considerations.

Aircraft control through the use of traditional discrete control surfaces has achieved widespread success over many years. These traditional methods, widely accepted on the vast majority of aircraft, however can be detrimental to an aircraft aerodynamic performance as they rely on hinged control surfaces which can generate significant flow separation when actuated fully. To meet the ever-increasing demands for more efficient, robust, and cost effective designs, there is an argument that conventional control surface methodologies need to be re-examined, in favour of more "morphing" technologies and techniques.

Morphing technologies typically revolve around adaptive geometry structures and mechanisms and are very attractive to aircraft designers as they can provide substantial benefits to aircraft performance. Wing warping techniques were employed by the Wright Brothers to control the first powered, heavier than air, aircraft through wing twist via subtended cables. However, even with the substantial research efforts over the last few decades morphing concepts still suffer significant challenges. These challenges include added weight, costs, skin, structure, and/or complexity. Reviews of some of these challenges were discussed in JHA et al., "Morphing Aircraft Concepts, Classifications, and Challenges", Industrial and Commercial Applications of Smart Structures Tech., 5388 (2004). Some of the most significant challenges are the structural design of the concepts and mechanisms employed. For instance, to accommodate comparable control surface deflections of traditional techniques, high levels of structural design and analysis are needed, often requiring heavy actuators which increase overall weight.

Prandtl's Lifting Line Theory was the first mathematical method to estimate the performance of a wing's lift capabilities for an aircraft. This method was modified as described in PHILLIPS, "Lifting-Line Analysis for Twisted Wings and Washout-Optimized Wings", J. of Aircraft, 41 (2004) and PHILLIPS et al., "Lifting-Line Analysis of Roll Control and Variable Twist", J. of Aircraft, 41 (2004). The modified method estimates the influences of wing twist on lift distribution. Additional studies have considered morphing wing and/or winglet twist configuration, both theoretically and experimentally, to investigate influences on the aerodynamic performance of an aircraft. Studies using novel design concepts of twisted winglet configuration were presented in KAYGAN, et al., "Investigation of Adaptable Winglets for Improved UAV Control and Performance", Int'l J. of Mech., Aerospace, Industrial and Mechatronics Engineering, 8 (2014)., KAYGAN, et al., "Computational Analysis of Adaptable Winglets for Improved Morphing Aircraft Performance", Int'l J. of Mech., Aerospace, Industrial, Mechatronic and Manufacturing Engineering, 9 (2015)., and SMITH et al., "Computational and Experimental Validation of the Active Morphing Wing", J. of Aircraft 51 (2014) "SMITH". Results from these studies indicated that, high winglet twist angle performed well as a mechanism for control, and at up to winglet twist angles of $\phi=-5°$ and $\phi=-3°$, comparable to good aerodynamic efficiency was achieved.

Contrary to winglet twist, the application of variable wing twist seems to be a more attractive concepts for researchers. From the early stages of morphing to today, various methods and mechanism have attempted to find the solutions to provide twist deformation for the wings. Recent works have detailed the deflection of wing twist using torque rods, adaptive stiffness structures and threaded rods.

The torque rod twist mechanism for membrane wings was investigated in GARCIA et al., "Roll Control for a Micro Air Vehicle Using Active Wing Morphing", University of Florida, AIAA paper AIAA-2003-5347, (2003). According to his flight testing, comparable to traditional aileron roll rates were achieved via twisting wings.

Using Adaptive stiffness structures such as using pneumatic cylinders was investigated in AMPRIKIDIS et al., "Experimental Validation of Wing Twist Control Using Adaptive Internal Structures" 45th AIAA/ASME/ASCE/AHS/ASC Structures, Structural Dynamics and Materials Conference (Palm Springs, Calif.), (2004). Rotating and translating rib concepts was investigated in MAJJI et al., "Design of a Morphing Wing: Modeling and Experiments" AIAA Atmospheric Flight Mechanics Conference and Exhibit, Hilton Head, S.C., (2007). Both investigations showed good agreement with a wind tunnel experiments and effectively required wing twist or control moments were achieved.

Further study of twisted wings using threated torque rod mechanism and adaptive torsion wing concepts were carried out by VOS et al., "Mechanism for Warp-Controlled Twist of a Morphing Wing", J. of Aircraft 47 (2010) and AJAJ et al., "Conceptual Modelling of an Adaptive Torsion Structure", 52nd AIAA/ASME/ASCE/AHS/ASC Structures, Structural Dynamics and Materials Conference, Denver, Colo., AIAA-2011-1883, (2011). According to their research, good aerodynamic benefits were gained due to reduced induced drag.

Even though theoretical and subsequent wind tunnel tests do show huge benefits in terms of aerodynamics and roll control, the requirements to adapt these mechanisms into a real flight environment are still vague due to heavy twist mechanisms, their installation cost, complexity and required higher torque as well as reliefs formed on the skin.

One important component of a compliant morphing structure is the morphing skin, which should be flexible for actuation, but also rigid to allow favourable aerodynamic performance to be obtained. Prior literature on morphing skins, involves flexible skins such as FMC, elastomeric skins, and corrugated skins. However, none of these morphing skins have achieved widespread use. Part of the problem is conflicting requirements. The skins need to be capable of transferring aerodynamic loads at be flexible in order to move and/or change shape, but the surface should remain smooth and possess a low rate wrinkle at the location of moveable mechanism. Unfortunately, current morphing skin solutions exhibit many wrinkles, which can represent a source of undesired drag increase.

A survey of morphing skin technologies is discussed below. Potential solutions for flexible morphing skins are discussed in THILL et al., "Morphing Skins", The Aeronautical J., 112 (2008). It was found that the flexibility and stiffness problems in morphing air vehicles might be solved by using novel materials such as elastomeric skins, flexible matrix composites, and composite corrugated structures.

Flexible matrix composites were investigated by OLYMPIO et al. "Design of a Flexible Skin for a Shear Morphing Wing." J. Intell Mater Syst Struct 21 (2010). The study focused on flexible skins comprising a cellular substructure (Honeycomb) and pretension face sheet for shear morphing application. According to research, the honeycomb cellular structure was found to reduce the peak strain which results to reduce actuation energy, but wrinkling was found at face-sheet which disrupts aerodynamic smooth surface finish.

Similarly, elastomeric matrix composites for passive 1D morphing aircraft skin was investigated by BUBERT et al., "Design and Fabrication of a Passive 1d Morphing Aircraft Skin" J. Intell Mater Syst Struct 21 (2010).

A flexible honeycomb structure was used and then the structure was covered by an elastomeric fiber composite surface layer. Satisfactory results were achieved, and a 100% surface area change was obtained.

Alternatively, use of corrugated skin was investigated by several researchers. The benefits of this material are that the wing structure could be stiff enough to withstand the bending due to aerodynamic forces and flexible enough to deflect to adapt different flight conditions.

The use of corrugated composites for flexible wing structures was demonstrated in YOKOZEKI et al., "Mechanical Properties of Corrugated Composites for Candidate Materials of Flexible Wing Structures" Compos Part, 37 (2006). Tensile and flexural tests were conducted in the longitudinal and transverse direction and hence, composite corrugated structures were found to be rigid against aerodynamic forces. Moreover, stiff rod and flexible rubber were attempted to use to provide stiffness of morphing skin.

Details of structural and aerodynamic behaviours of composite corrugated sandwich structures were investigated in THILL et al., "Composite Corrugated Structures for Morphing Wing Skin Applications", Smart Mater Struct, 19 (2010). Research showed that structures generate low drag profile, but additional supports were needed to stiffen the morphing skin as well as to maintain smooth surfaces. Wind tunnel demonstration showed the concepts work well under aerodynamic load (at low speeds).

The comparison studies between experimental and numerical model for mechanical behaviours of coated corrugated panels made of glass fibers were investigated by DAYYANI et al., "The Mechanical Behavior of Composite Corrugated Core Coated with Elastomer for Morphing Skins" J. Compos Mater 48 (2014). Results obtained from this study showed good agreement between numerical and experimental testing. Also, they proposed ideas to deal with the smooth surface problem. For example, they suggested that composite corrugated covered with pre-stretched coating and triangular corrugated core with elastomer coating could be a solution for morphing skin, but the drawback was corrugated skin would require frequently elastomer covering to provide smooth surfaces.

In addition, optimization of composite corrugated skin for buckling in morphing aircraft was investigated by SHAW et al., "Optimisation of Composite Corrugated Skins for Buckling in Morphing Aircraft", Composite Structures 119 (2015). The work analyses the performance of corrugated panels under buckling loads, and optimizes corrugation patterns for the objectives of weight, buckling performance, and actuation compliance.

However, despite this substantial research done for aircraft skin; there are still challenges due to required high torque actuators, more stiffness materials with highly flexible as well as smooth aerodynamic surfaces.

SUMMARY OF INVENTION

In some embodiments, an improved blade or wing element is provided.

In some embodiments, a blade or wing element including a plurality of individual ribs rotatable and/or slidable with respect to one another whereby to vary the aerodynamic configuration or profile of the blade or wing element for example by causing a twist thereof is provided.

In some embodiments the twist can change the longitudinal or spanwise orientation of the wing or blade element.

In some preferred embodiments, the ribs are rotatable with respect to each other.

In some embodiments, the ribs are rotatable about a main spar, a control rod, or an axis of rotation, that can be substantially longitudinal or spanwise.

In some embodiments, the blade or wing element includes a plurality of actuators, each actuator being coupled to an associated rib and being operable to rotate the respective associated rib.

In some preferred embodiments, each actuator is coupled to a main spar and is operable to rotate the respective rib with respect to the main spar. In some embodiments, the main spar can be a fixed rod. In some embodiments, the main spar can provide an axis of rotation of the ribs. In some embodiments, the main spar can pass through each of the ribs.

In some preferred embodiments, the actuators are separated by several ribs.

In some preferred embodiments, each actuator is coupled to the main spar via a lever arm.

In some preferred embodiments, each actuator is operable to cause the respective lever arm to rotate about a pivot position in the main spar to cause a rotation of the respective rib In some preferred embodiments, each actuator includes a servomotor.

In some preferred embodiments, the ribs are coupled together by a linkage member configured to resist relative rotation of the ribs.

In some embodiments, the blade or wing element includes a control rod operable to rotate the ribs and which can in some embodiments provide the axis of rotation.

The control rod can be rotatably coupled to each of the ribs, for example by passing through each of the ribs.

In some preferred embodiments, the blade or wing element includes at least one stiffening rod coupled to each of the ribs to resist for example excessive relative rotation of the ribs, for example by passing through each of the ribs.

In some preferred embodiments, the at least one stiffening rod is spaced from an axis of rotation of each rib, the spacing preferably providing separation at least along a rib line of the rib, the rib line being an imaginary line joining leading and trailing edges of the rib.

In some embodiments, the blade or wing element includes an end element, wherein the control rod is preferably secured to the end element to rotate the end element.

In some embodiments, the at least one stiffening rod is coupled or secured to the end element.

In some preferred embodiments, the at least one stiffening rod is a plurality of stiffening rods.

In some embodiments, the ribs are parallel to each other and transverse, preferably perpendicular, to their axis of rotation.

In some embodiments, the ribs are parallel to each other and transverse, preferably perpendicular, to the control rod or main spar. In some embodiments, the ribs can be configured to rotate in a plane perpendicular to the control rod or main spar. In some embodiments, each rib can be configured to rotate in a plane that is at a non-perpendicular angle to the control rod or main spar.

In some embodiments, the ribs are parallel to each other and transverse to the longitudinal or spanwise direction.

In some embodiments, the ribs are coupled in a longitudinal or spanwise direction of the blade or wing element and are slidable in a direction transverse, for example perpendicular, to the longitudinal or spanwise direction.

In some embodiments, the ribs are coupled in a direction parallel to their axis of rotation and/or the axis of the control rod or main spar and are slidable in a direction transverse, for example perpendicular, to the direction in which they are coupled.

In some preferred embodiments, the ribs are adjacent and substantially without gaps between adjacent ribs whereby to provide a substantially smooth surface to the blade or wing element.

In some embodiments, the ribs are uncovered, that is to say that they can provide a surface of the blade or wing element.

In some embodiments, the ribs are covered, that is to say that they can provide a mounting surface for a continuous skin of the blade or wing element.

In some preferred embodiments the ribs are flexible for example by being formed of a flexible material. This can assist in rejecting external element ingress (such as rain or dirt). In some embodiments, the flexibility of the ribs can help to seal gaps between the rib elements.

In some preferred embodiments, the ribs are rigid. In some preferred embodiments each rib is continuous or unitary in that it does not have articulating parts. In some embodiments, each rib extends from a leading edge to a trailing edge of a wing or blade.

In some preferred embodiments, the ribs have a flexible width and rigid height. It is noted in this regard that the term height is used to indicate a different dimension from, typically orthogonal or perpendicular to, the width, but that a particular orientation with respect to the vertical is not implied. In some preferred embodiments, the ribs are compliant to deformation in width with applied load preferably so that the ribs have compliance between adjacent rigid ribs. In some embodiments, this can allow them to more adequately mate with the surfaces and inhibit foreign element ingress to the internal structure. They can act in a similar manner to a rubber seal or washer.

In some embodiments, the ribs can comprise an elastomeric material such as rubber to provide compliance in width and can also comprise a rigid material such as metal such as steel to provide rigidity. They can be arranged as a set of steel and rubber washers, one after the other or in other sequence combinations. For example, in some embodiments, each rib can be arranged as a rigid washer adjacent to an elastomeric washer.

In some embodiments, each rib has a transverse height greater than its width, where its width can, in some embodiments, be its longitudinal or spanwise thickness, or its thickness along its axis of rotation or along the main spar or control rod. In some embodiments, a transverse thickness of each rib in any direction perpendicular to the longitudinal or spanwise direction is greater than the width of the respective rib. In some embodiments, a transverse thickness of each rib in any direction perpendicular to the axis of rotation is greater than the width of the respective rib. In some embodiments, a transverse thickness of each rib in any direction perpendicular to the axis of the main spar or control rod is greater than the width of the respective rib.

According to an aspect of the disclosure, there is provided a blade or wing including a blade or wing element as discussed above. The blade or wing can include a fixed section in addition to the blade or wing element described above. The fixed section can be coupled to the above described blade or wing element in the longitudinal or spanwise direction for example such that the fixed section and the blade or wing element described above are adjacent in the spanwise direction, or longitudinally adjacent.

In some embodiments, the transverse cross-section of each of the ribs corresponds to the transverse cross-section of the fixed section.

Some embodiments provide a blade or wing assembly including a blade or wing element as described above and a reference element, the reference element being fixed with respect to a non-actuated configuration of the blade or wing element, wherein the at least one stiffening rod is coupled or secured to the reference element.

In some embodiments, a blade or wing assembly includes a blade or wing element as described above, and a reference element, the reference element being fixed with respect to a non-actuated configuration of the blade or wing element, wherein the main spar is coupled or secured to the reference element.

The plurality of ribs can be located between the reference element and the end element.

In some embodiments, the plurality of ribs, and in some embodiments also the end element, and in some embodiments also the reference element, are compressed together.

In some embodiments, the assembly includes a compression assembly configured to compress the ribs, and in some embodiments also the end element, and in some embodiments also the reference element, together.

In some embodiments, the or each stiffening rod is provided with a suspension arrangement.

In some embodiments, the assembly includes a compression assembly operable to compress the ribs, and in some embodiments also the end element, and in some embodiments also the reference element, together, in response to rotation of the ribs.

In some preferred embodiments, the compression assembly can compress the structure together to keep the surface smooth and free from gaps.

In some embodiments, the at least one stiffening rod is configured to compress the ribs, and in some embodiments also the end element, and in some embodiments also the reference element, together, for example in response to rotation of the ribs.

In some embodiments, the compression assembly can include a resilient assembly for each stiffening rod configured to maintain the respective stiffening rod under tension, and/or to allow a greater length of the respective stiffening rod to pass the ribs, that is to be located in a region of the ribs, in a twisted configuration of the ribs.

In some embodiments, the resilient assembly or suspension arrangement is configured to provide suspension for the or each stiffening rod with respect to the reference element and/or the end element.

In some embodiments, the compression assembly is configured to maintain the ribs under a compressive force irrespective of rotation of the ribs.

In some embodiments, the compression assembly is configured to increase a compressive force on the ribs in response to rotation of the ribs.

In some embodiments, each resilient assembly or suspension arrangement can include a resilient element coupled between the respective stiffening element and the reference element and/or between the respective stiffening element and the end element.

In some embodiments, there can be provided a drive unit operable to cause the ribs to slide or rotate with respect to one another. This can be provided as part of the blade or wing or coupled to the blade or wing element as part of an assembly. The drive unit is in some embodiments operable to rotate the end element.

In some embodiments, the drive unit can include one or more control rods, for example the control rod described above. In some embodiments, each of the one or more control rods contributes to the control of each of the plurality of ribs.

In some embodiments, the drive unit can include a servo mechanism operable to rotate the control rod. In some embodiments, the drive unit can include other actuators such as a linear drive unit or a leadscrew mechanism.

Some embodiments provide an aerodynamic apparatus, such as aeroplane, helicopter, or wind turbine, including a blade or wing element as described above.

Some embodiments provide a method of assembling a blade or wing element as above including compressing the plurality of ribs before coupling or securing the at least one stiffening rod.

In some preferred embodiments, the method includes compressing the end element and the ribs, and optionally also the reference element, together before securing the at least one stiffening rod to the end element and/or to the reference element.

Some embodiments use many small-thickness elements (ribs), that in essence are allowed to, very slightly, slide or rotate upon one-another to maintain an aerodynamically smooth and rigid surface skin (minimising drag). This can maintain a rigid, smooth surface while creating quite substantial changes in aerodynamic force from changes in wing twist angle. Normally, a rigid, smooth, surface such as this is not possible due to wrinkling (buckling) on the surface when twist is applied. By solving this problem, the disclosed embodiments improve the aerodynamic efficiency of such a capability as well as produced a method of generating more effective control forces.

In some embodiments, the ribs are collectively controlled via an internal actuation system. This can include a simple torque tube arrangement which uses a servo drive connected to a tube which is connected to the tip of the wing. Twisting the torque tube actuates the end element which in turn actuates the morphing ribs to move.

Some embodiments can be used in many other applications, such as helicopter blade optimisation, wind turbines, aircraft winglet optimisation, etc.

Some embodiments provide an active morphing wing with novel adaptive skin for aircraft control and performance.

Some preferred embodiments are described below, with reference to the accompanying drawings.

BRIEF DESCRIPTION OF THE DRAWINGS

FIG. 12A shows maximum positive twist (wash-in) of a morphing design without any flow interaction: Experimental model twist movement.

FIG. 12B shows maximum positive twist (wash-in) of a morphing design without any flow interaction: Numerical modelling twist movement.

FIG. 21A shows maximum twist of a morphing design without any flow interaction: Experimental model twist movement (wash-out).

FIG. 21B shows maximum twist of a morphing design without any flow interaction: Numerical modelling twist movement (wash-out).

FIG. 22A shows maximum twist of the morphing concept without any flow interaction: Experimental model twist movement (wash-in).

FIG. 22B shows maximum twist of the morphing concept without any flow interaction: Numerical modelling twist movement (wash-in).

FIG. 34 is a perspective view of a morphing wing section according to some embodiments.

FIG. 35 is a schematic diagram showing a resilient assembly according to some embodiments.

DETAILED DESCRIPTION OF ILLUSTRATED EMBODIMENT(S)

Some embodiments of the disclosure can be used for providing a wing section of an aircraft such as an aeroplane. As described below, a morphing wing section can be provided by a plurality of adjacent ribs which can slide and rotate slightly with respect to each other so as to create a smoothly changing twisting wing surface. In some embodiments, a control rod and at least one stiffening rod are coupled to the ribs, for example by passing through them, and are secured to an end element of the wing. By rotating the control rod, the end element is rotated, which causes the at least one stiffening rod to bend. The bending of the at least one stiffening rod causes each of the ribs to rotate, with the ribs rotating an increasing amount towards the end element, with each rib sliding slightly with respect to its adjacent rib. The result is a smooth but changeable and controllable twistable wing surface.

Figure 29:
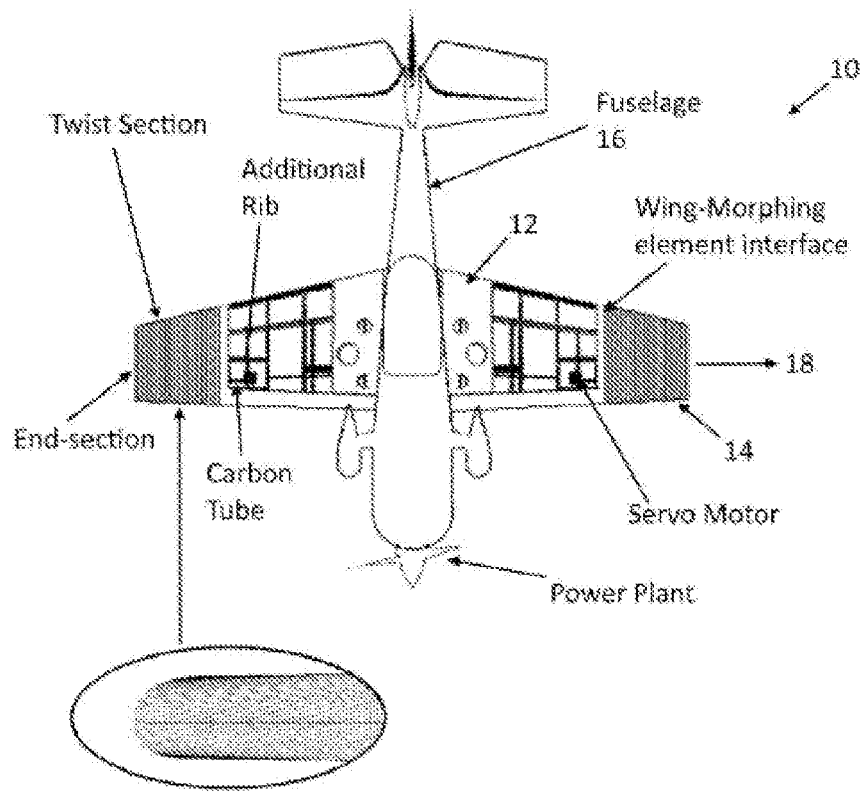
FIG. 29 shows a top view of an aircraft in accordance with an embodiment of the disclosure.

FIG. 29 shows a top view of an aeroplane with a morphing wing section at the end of the wing on each side of the aircraft.

Figure 30:
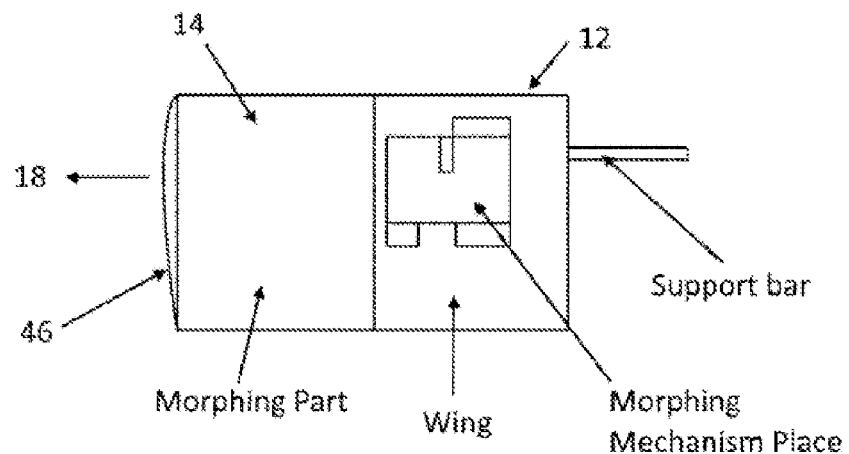
FIG. 30 shows a top view of a part of a wing in accordance with an embodiment of the disclosure.

As can be seen in FIG. 29, aircraft 10 can include, as part of the wing extending from each side of fuselage 16 of aircraft 10, fixed wing section 12 and morphing wing section 14. This is also shown in FIG. 30.

The wing on each side of fuselage 16 has a longitudinal or spanwise dimension or direction 18 extending away from fuselage 16. As can be seen from FIG. 30, fixed wing section 12 and morphing wing section 14 form two zones of the wing which are separate in the spanwise direction.

The wing on each side of fuselage 16 also has a chord line which is an imaginary line from the leading edge of the wing to the trailing edge of the wing.

Figure 31:
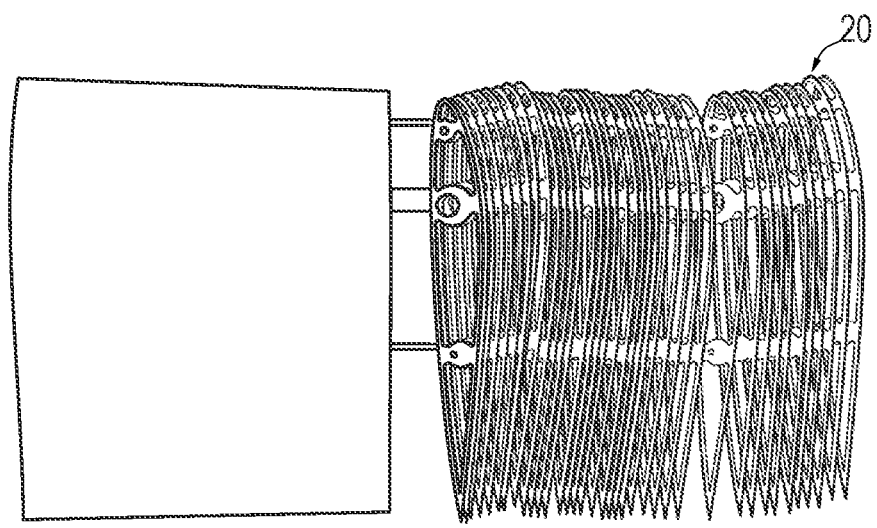
FIG. 31 shows a part of a wing with ribs of a morphing section loose.

As can be seen in FIG. 31 morphing wing section 14 can include a plurality of adjacent ribs 20. In at least some embodiments, the ribs are parallel to each other and transverse to the spanwise direction. In the shown embodiment, the ribs are perpendicular to the spanwise direction, although this is not necessary in every embodiment. In some embodiments, the ribs can form an angle of less or more than 90° to the spanwise direction. This can for example be by a rib line forming an angle of less or more than 90° to the spanwise direction, the rib line being an imaginary line joining leading and trailing edges of the rib. However, in such embodiments, an imaginary height line through the height of the rib perpendicular to the rib line can be perpendicular to the spanwise direction.

Each of ribs 20 has a transverse cross section which corresponds to the transverse cross section of fixed wing section 12. In some preferred embodiments, the transverse cross section is in a plane parallel to the interface with an adjacent rib and perpendicular to the width of the rib. Having corresponding transverse cross sections means that an outer perimeter of the cross section of each rib 20 preferably corresponds to, and is preferably the same as, the outer perimeter of the cross section of fixed wing section 12.

In some embodiments, the ribs are adjacent in a spanwise direction.

In at least some embodiments, ribs have substantially no gaps between them, thereby providing a smooth surface to the morphing wing section.

In some embodiments, ribs 20 are made of wood, although other materials can be used. In some embodiments, the surfaces of the ribs which are to form wing surfaces can be sanded and/or lacquered.

In some embodiments, the ribs can comprise an elastomeric material such as rubber which is compliant to deformation in width to seal gaps between adjacent ribs and prevent, or at least reduce the chance of the ingress of foreign material. Such embodiments can also include a rigid metal support to provide rigidity. In some embodiments, across the width of a rib, the rib can comprise a metal rib element adjacent to an elastomeric rib element, and the ribs can be arranged so that the metal element of one rib is adjacent to the elastomeric element of an adjacent rib.

Figure 32:
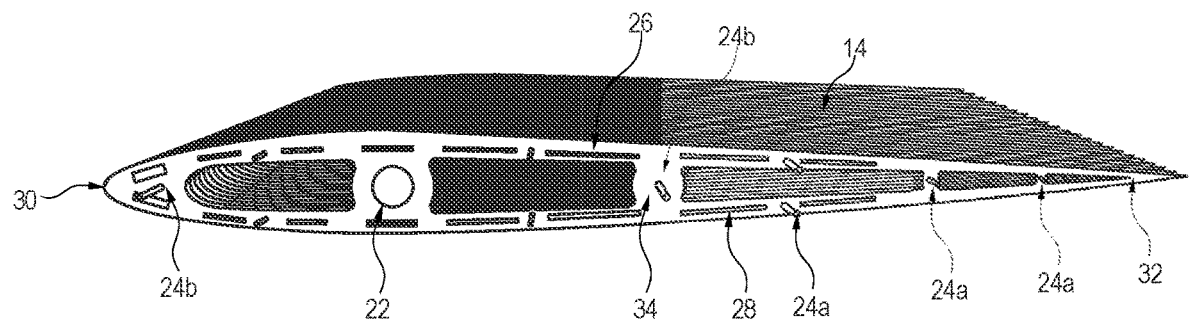
FIG. 32 shows an end view of a morphing wing section according to some embodiments.

As can be seen particularly in FIG. 32, which shows an end view of morphing wing section 14 and a side view of end rib 20, in some embodiments each of ribs 20 includes a frame including first frame member 26 and second frame member 28. In some embodiments, first frame member 26 and second frame members 28 are separated along a substantial part of the rib line of the rib but are joined at leading edge 30 and at trailing edge 32 of rib. In some embodiments, the leading edge and trailing edge of the rib are also, respectively, the leading edge and trailing edge of the wing, and the rib line of the rib corresponds to the chord line of the wing.

In the embodiment shown, first frame member 26 is at a top surface of the wing, and second frame member 28 is at a bottom surface of the wing.

In some embodiments, rib 20 is substantially hollow between the first and second frame members. However, it is not excluded that the rib could be solid or contain some other filling or support between the frame members.

In some embodiments, such as the one shown, the width of the rib is significantly less than the height of the rib.

It is to be noted that although the frame is described as including first and second frame members, the frame can be a monolithic structure.

In some embodiments, the frame further includes a plurality of bridging support members 34 which bridge from first frame member 26 to second frame member 28 and provide support for the cross-sectional shape of rib 20.

In at least some of the embodiments, each of ribs 20 includes a plurality of rod coupling elements, including control rod coupling element 22 and a plurality of stiffness rod coupling elements 24. In some embodiments, at least some of the rod coupling elements are spaced, the spacing preferably providing separation at least along the rib line. In other words, at least some of the rod coupling elements are preferably spaced along but not necessary located directly on the rib line, although they can be located directly on the rib line in some embodiments. In the shown embodiment, the rod coupling elements are provided as holes to allow the rods to pass through ribs 20. The rod coupling elements are for coupling the ribs to control and stiffness rods to allow the ribs to rotate but provide a continuous surface as described below.

In the embodiment of FIG. 32, control rod coupling element 22 is provided at the quarter chord position.

In the embodiment of FIG. 32, ten stiffening rod coupling elements 24 are provided, including three smaller coupling elements 24a in each of the first and second frame members, and two smaller coupling elements 24a in bridging support members 34 towards the trailing end of rib 20. Each of the three smaller coupling elements 24a in the first frame member is arranged to be opposite a counterpart smaller coupling element 24a in the second frame member. In addition, there are provided two larger rod coupling elements 24b at the origin of the chord. The smaller coupling elements 24a are designed to couple to smaller stiffening rods, of 0.5 mm diameter in this embodiment. The larger coupling elements 24b are designed to couple to larger stiffening rods, of 1.5 mm diameter in this embodiment. It is to be noted that in other embodiments, there can be provided different numbers, sizes, and arrangements of rod coupling elements.

In some embodiments, control rod 42 passes through control rod coupling element 22 of each of the ribs of morphing wing section 14. In some embodiments, control rod coupling element 22 of each rib 20 is configured to allow control rod 42 to rotate there within. In this example, control rod 42 is a steel shaft encased in a carbon tube. However, other materials can be used for control rod 42 and for a control rod sheath.

In some embodiments, stiffening rods 44 are coupled to each rib 20 at each of the stiffening rod coupling elements 24. The size of the stiffening rod coupled to each stiffening rod coupling element 24 corresponds to the size of rod for which the stiffening rod coupling element is designed as described above. In some embodiments, stiffening rods have some flexibility but are generally stiff and are configured to limit the degree of rotation or sliding of each rib 20 with respect to its adjacent rib, thereby to ensure, or at least increase the likelihood, that morphing wing section 14 retains a smooth gradually changing surface when control rod 42 is actuated to provide rotation to ribs 20.

In the example shown, stiffening rods 44 are carbon rods. However, other materials can also be used.

In some embodiments, all of the rods extend parallel to the axis of rotation of the ribs and in the spanwise direction. However, in other embodiments, they could for example extend at an angle to the spanwise direction.

In some embodiments, the ribs can be rotatable in a plane perpendicular to the axis of the control rod. However, in other embodiments, each rib can be rotatable in a plane that is at a non-perpendicular angle to the axis of the control rod.

As shown in FIG. 30, end element 46 is provided at the end of the morphing wing section opposite the spanwise direction from fixed wing section 12.

In some embodiments, control rod 42, and each of stiffening rods 44, of the morphing wing section, are secured to and terminate in the end element.

In some embodiments, end element 46 can be rib 20 with a solid cross section. In some preferred embodiments, it is rounded in accordance with known practices since it is preferably at the end of the wing. In other embodiments, end element could be an end rib with a further section of wing beyond it.

In at least some embodiments, each morphing wing section 14 has its own control rod and set of stiffness rods. In other words, one set of control and stiffness rods pass through each rib of a morphing wing section; but there can be a plurality of such sets of rods, each passing through a respective morphing wing section.

In some embodiments, each morphing wing section 14 has an associated control unit 36. Control unit 36 for morphing wing section 14 can be seen clearly in FIG. 33. In the shown embodiment, control unit 36 is provided in fixed wing section 12. However, control unit 36 can be provided elsewhere, for example in the fuselage.

Figure 33:
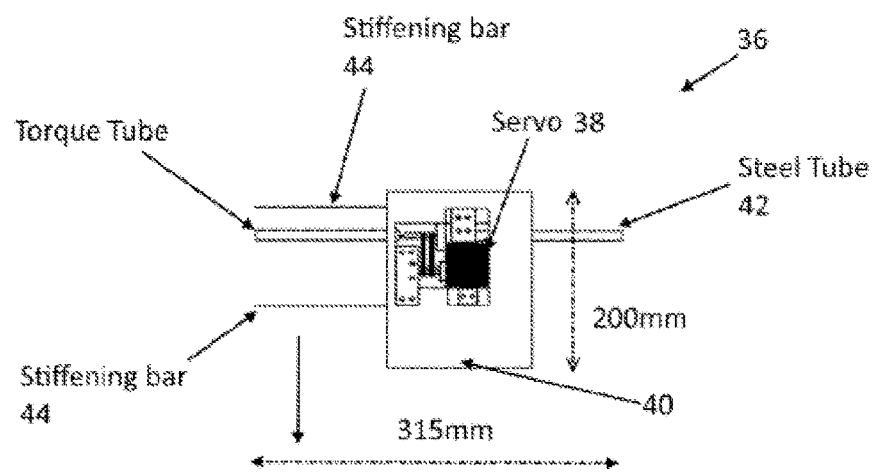
FIG. 33 is a schematic diagram of a control unit according to some embodiments.

As can be seen from FIG. 33, in this embodiment control unit 36 includes servo mechanism 38, along with associated electronics supported on a circuit board or other substrate 40. In some embodiments, servo mechanism 38 is configured to rotate control rod 42 of the associated morphing wing section 14 in order to provide appropriate twist to morphing wing section 14 as described in more detail below. The precise arrangement for controlling control unit 36 to adjust the rotation of control rod 42 can vary.

Stiffening rods 44 can be securely coupled to the respective control unit 36, for example to substrate 40 thereof, as shown in FIG. 33. However, they do not need to be coupled to the control unit, but are preferably coupled and in some embodiments secured to a section of the aircraft that is fixed with respect to a non-actuating state of control unit 36, that is not designed to be twisted by control unit 36, for example in fixed wing section 12. In some embodiments, the coupling of the stiffening rods to the fixed section of the aircraft allows some movement of the stiffening rods in the longitudinal direction of the stiffening rods, for example to allow for a resilient assembly as described below, but movement orthogonal to the longitudinal direction of the stiffening rods is preferably inhibited. This is so that they are caused to bend by rotation of end element 46.

When the control rod is in a non-actuated state, in which it is not providing rotation to any of ribs 20, the ribs are held by the control rod and stiffening rods so as to provide a continuous surface which is flush with the surface of fixed wing section 12.

In at least some embodiments, when control unit 36 is operated to actuate control rod 42, the control rod causes rotation of end element 46, causing the angle of the chord line at end element 46 with respect to the chord line at fixed wing section 12 to change.

In at least some embodiments, in the actuated state the servos also provide rigidity to the structure.

In some embodiments, the rotation of end element 46 causes bending of the stiffening rods which is resisted by the stiffness of the stiffening rods owing to their being coupled in these examples to control unit 36. In some embodiments, the displacement of the stiffening rods from their unbent configuration is greatest adjacent to end element 46 and smallest adjacent to fixed wing section 12. In some embodiments, the bending of the stiffness rods causes the ribs to rotate owing to the separation of the stiffness rods from the axis of rotation of the ribs. Similarly to the degree of displacement of the stiffness rods, ribs 20 close to end element 46 rotate to a larger extent, though not quite as extensively as end element 46. In addition, in at least some embodiments, most, if not all, the ribs between end element 46 and fixed wing section 12 rotate but to a diminishing extent towards fixed wing section 12. The ribs therefore align in a very smooth manner causing a very gradual change, or twist, in wing configuration from fixed wing section 12 to end element 46.

Typically, when the wing twists, there is an axial load on the stiffening rods due to the very small increase in length required when twisting. In some embodiments, during assembly, the end element and ribs are compressed before the stiffening rods are coupled or secured to the assembly. In this way, the ribs and end element collectively act like a spring when twisted, and maintain a smooth, gap-free surface.

Details of another embodiment are shown in FIG. 35. In this embodiment, at end 50 of each stiffening rod 44 there is provided a suspension arrangement or resilient assembly 52. In this embodiment, the suspension arrangement or resilient assembly 52 includes a resilient element such as spring 54 coupled between stiffening rod 44 and the fixed wing section. In this embodiment, spring 54 is disposed between and configured to press against first flange 56 fixed with respect to stiffening rod 44 and second flange 58 fixed with respect to the fixed wing section. In this embodiment, second flange 58 is provided by a fixed rib at the wing root. This provides a system whereby the stiffening rods are connected to springs that automatically take up the slack of the extension as the wing twists. In some embodiments, the suspension arrangement or resilient assembly could be provided at the end element instead of or as well as at the fixed wing section.

It is to be noted that for a large wing, the rib thickness can be larger without large drag increases. With regard to the internal distribution, size, and material of the stiffening rods, the bigger they are and the more in number makes the structure less/more stiff. They also provide the means to align most, if not all, the ribs precisely to maintain a smooth overall surface.

Figure 36:
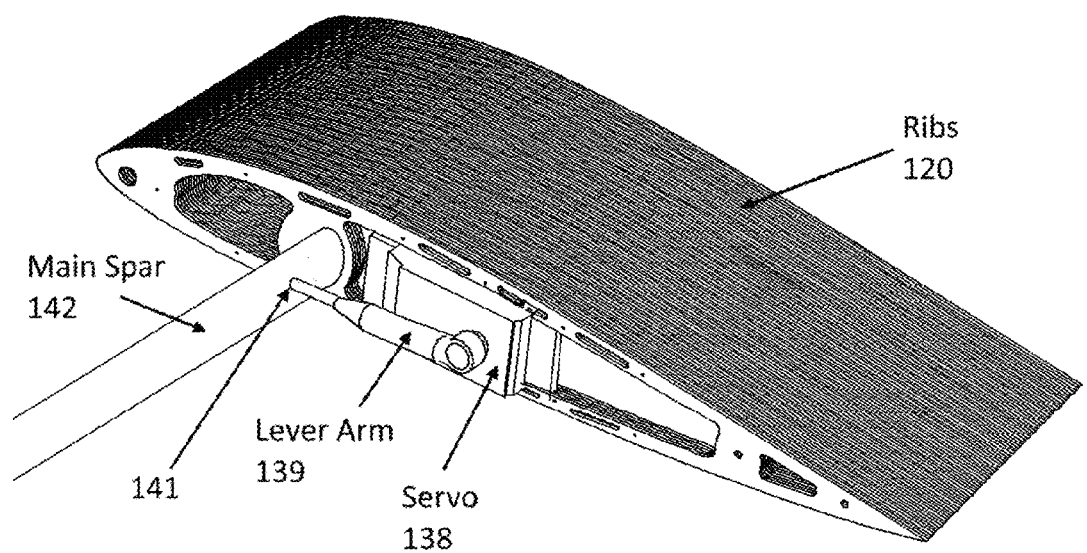
FIG. 36 is a schematic diagram showing part of a morphing wing section according to some embodiments.

Another embodiment of the disclosure is shown in FIG. 36. Except as otherwise described, the embodiment of FIG. 36 can include features as described for other embodiments.

FIG. 36 shows a part of a morphing wing section in which a number of the ribs have been removed in order to show clearly the actuation mechanism. In addition, the stiffening rods are not shown in FIG. 36, although these can be generally similar to those described elsewhere.

In place of the control rod of other embodiments, the embodiment of FIG. 36 includes main spar 142. Main spar 142 extends as per the control rod described above, and the ribs can rotate about the axis of main spar 142, but in this embodiment the main spar is not designed to be rotated. Similar to the embodiments above, in some embodiments, each rib can be rotatable in a plane perpendicular to the axis of the main spar. In other embodiments, each rib can be rotatable in a plane that is at a non-perpendicular angle to the axis of the main spar. One end of main spar 142 can be secured to a reference element which is fixed with respect to a non-actuated configuration of the morphing wing section. The reference element can be for example the fuselage of an aeroplane, a fixed wing section, or a control unit. The other end of main spar 142 can be secured to end element 46 such as described above. However, this is not necessary in the embodiment of FIG. 36.

In the embodiment of FIG. 36, there are provided a plurality of actuators 138 distributed along the span-wise length of the morphing wing section. In some embodiments, each of these actuators 138 can enact local twist deformation, as described below. Actuators 138 can be operated to work together to twist more of the wing section in the same twist direction, or work against each other to produce localised regions of positive and negative twist in close proximity to each other. This enables the embodiment to adjust wing twist locally and achieve adaptive wing twist distributions that allow maximum efficiency or wing loadings as required.

In the embodiment of FIG. 36, each actuator 138 is in the form of a servomotor. Each servomotor 138 is secured to one or more adjacent ribs 120, referred to as the respective associated rib(s). In this embodiment, each servomotor is rigidly embedded within the respective associated rib(s), in this example by being rigidly secured between the first and second frame members of the respective associated rib(s). Accordingly, movement of actuator 138 causes movement of the respective associated rib(s).

In some embodiments, each actuator 138 is connected to main spar 142 via respective lever arm 139. Each lever arm 139 is coupled to main spar 142 at a respective lever arm junction 141. Each lever arm junction 141 provides a pivot position for the respective lever arm 139, which allows the respective lever arm the ability to rotate about the axis of the main spar, as well as to translate in and out of the body of main spar 142.

Each actuator 138 is operable to rotate the respective associated rib(s) about main spar 142.

As discussed above, there are provided a plurality of actuators 138 coupled to main spar 142 and to respective associated ribs along the span-wise direction of the morphing wing section. Actuators 138 are spaced several ribs apart in the span-wise direction.

In some embodiments, each actuator 138 is coupled to a common control unit (not shown).

In some embodiments, the control unit is operable to operate each of the actuators independently of each other. When actuated, each servomotor 138 imparts a rotation that causes lever arm 139 to rotate about the pivot position in main spar 142. Lever arm 139 being effectively anchored by main spar 142 causes an adjustable and local rotation capability about the axis of the main spar, rotating the respective associated rib(s) about main spar 142.

In addition, owing to the presence of stiffening rods 44 discussed above, ribs adjacent to the respective associated rib(s) receive a force urging them to rotate in a similar manner, thereby maintaining a smooth wing surface.

In at least some embodiments, if different servomotors 138 are rotated to different degrees along the span-wise direction of the morphing wing section, the stiffening rods are caused to bend between these different servomotors 138. The bending of the stiffening rods causes ribs between the different servomotors to rotate to different degrees, causing a gradual change in rotation degree for ribs between the different servomotors. This provides a very smooth gradual change or twist in wing configuration between the different servomotors. In this way, wing twist can be adjusted locally to provide adaptive wing twist distributions that allow maximum efficiency of wing loadings as required.

Although some of the above embodiments include a fixed wing section, this is not necessary in all embodiments. The fixed wing section does not need to be fixed with respect to the fuselage. In addition, the components of the fixed wing section can for example be provided in the fuselage itself.

In some embodiments, the morphing element can be over the complete wing span, not only a portion.

Furthermore, the above described embodiment relates to a morphing wing section. However, in other embodiments, the morphing section can also be applied to a winglet of an aircraft, to a helicopter blade, or to a blade of other aerodynamic apparatuses, such as a wind turbine. In such embodiments, there would be provided blade sections rather than wing sections, and instead of a fuselage they can be coupled to a blade hub. The blade of a wind turbine is made up of an aerodynamically shaped profile that produces both lift and drag. The blade can be constructed as a plurality of ribs being actuated as described herein. For this example, a section of (or complete) blade can be comprised of many ribs mounted one-after the other along the span of the blade and allowed to slide relative to one-another to enact a change in twist along the blade span. This behaviour would be synonymous with the application for an aircraft's wing.

Some embodiments include multiple ribs with each rib assembled with multiple carbon rods. As is known for morphing concepts challenges such as surface deformation and the strength under aerodynamic load are the main issues. Therefore, in at least some embodiments, these carbon rods are used at the origin of the wing chord to provide stiffness for the structure and to offer an aerodynamically smooth surface finish while allowing the wing twist. The main Carbon tube is also placed at the quarter chord of the model to provide actuator torque. This also provides durability to the wing structure and alignment together with the other morphing elements.

In an example embodiment, the morphing elements were made of thin wood materials. The thickness size was determined from initial structural analysis, with the surface smoothness a main consideration to decide the right size for the morphing elements. Following that, the weight of the morphing elements was reduced to increase twist angle and reduce friction effects, hence low actuation energy was required to achieve twist. In assembly, significant attention was needed for the interface between the ribs and rods, consequently they were tightly fitted to reduce, if not eliminate, wrinkling and separation on the surface. This helped to achieve the similar drag profile relative the baseline fixed wing configurations. In addition, due to wood's rough surface, morphing elements were sanded and lacquered to receive the full benefits of the morphing twist system. A servo actuator was used with a servo-driven mechanism to actuate the twist. To enact twist deformation on the structure, moment (3.43 Nm) was applied to the main carbon tube. This moment was estimated through the torsion equation with desired twist change (minimum ±6°). Although, the friction effects were negligible in this model due to small surface area between each rib and the interface between the ribs and rods, additional torque was also estimated and the servo actuator was chosen based on high torque requirements. To allow the actuator tube to rotate the entire model, an end section was designed and placed at the tip of the structure with rods a fixed. When servo torque was applied to the carbon tube, the end support enacted twist by rotating all morphing elements correspondingly. This co-ordination was controlled by the carbon rods and the end-section.

One of the important benefits of this design is the ability to maintain a skin with a low drag (smooth surface finish) while twist deformation is in action. Moreover, the structure is lightweight and strong enough to carry aerodynamic loads. Comparing with current mechanisms, this mechanism largely overcomes most, if not all the morphing wing challenges.

Further details of an experimental example are provided below.

A design of an active wing twist with adaptive skin for morphing aircraft control and performance is provided below. The design includes a pair of active morphing elements which was designed to overcome skin problem as well to actively adjust wing twist angle using servo-driven mechanism. Preliminary design and Finite element analysis were carried out in ANSYS Mechanical and CATIA V5. Also, Athena Vortex Lattice (AVL) used as a CFD tool to analyse aerodynamic response of wing twist. Subsequent to numerical study, wind tunnel model was built and tested. To compare the effect of morphing mechanism with full baseline wing was used. Moreover, aileron configurations were also built and tested in the wind tunnel to investigate achieved roll rate. Afterwards, flight testing was performed with an Extra 300 78 inch remote controller aircraft with the results being compared against existing fixed wing configurations. Results presented below show the design does provide evidence for aerodynamic efficiency with smooth surface finish. Furthermore, it gives a good indication for controlling of an aircraft which was validated through flight testing with similar roll authority achieved compared to traditional aileron configuration.

The motivation for this study was to explore novel concepts of active wing concepts for morphing aircraft control and performance. The primary variables investigated involved changing the twist angle with the main aim being to identify degrees of movement both experimentally and numerically. ANSYS Mechanical and Athena Vortex Lattice software packages were used to obtain the numerical results and also for rib (skin) optimization. Principle aim was then to assess and demonstrate the developed concept within both the wind tunnel and flight test environment. This investigation also aimed to develop an alternative approach for a morphing skin.

Numerical Analysis

As a first step of the adaptive skin development and to ease the manufacturing difficulty, the straight wing was initially considered and created in AVL to provide aerodynamic data for ANSYS FEA tests. Obtained FEA data was used to compare with a wind tunnel model. Following that the analysis tool for the flight testing model mechanism and structural analysis setups are also described. Both adaptive skin and twist system were analysed in ANSYS and data used for comparison.

Aerodynamic Load Prediction

Figure 2A:
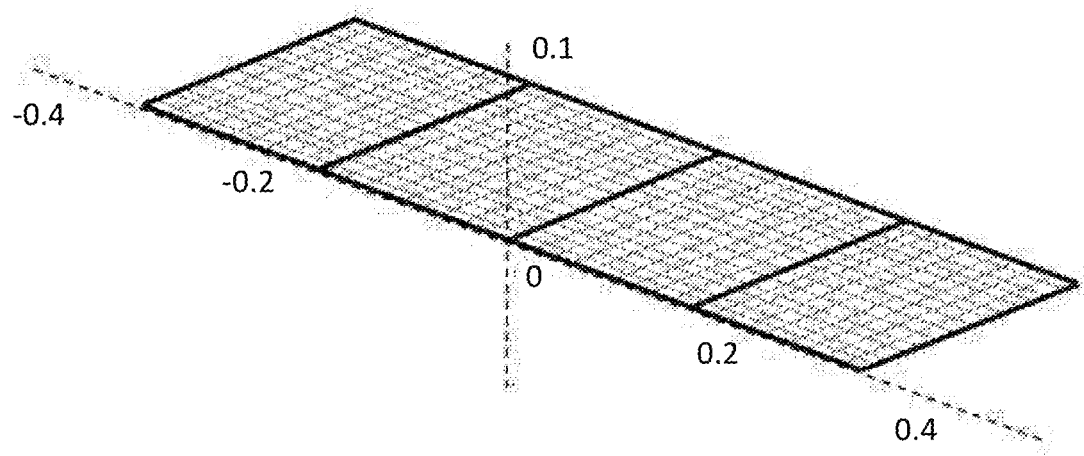
FIG. 2A is a schematic view of active straight wing (wind tunnel model) structure in AVL.
Figure 2B:
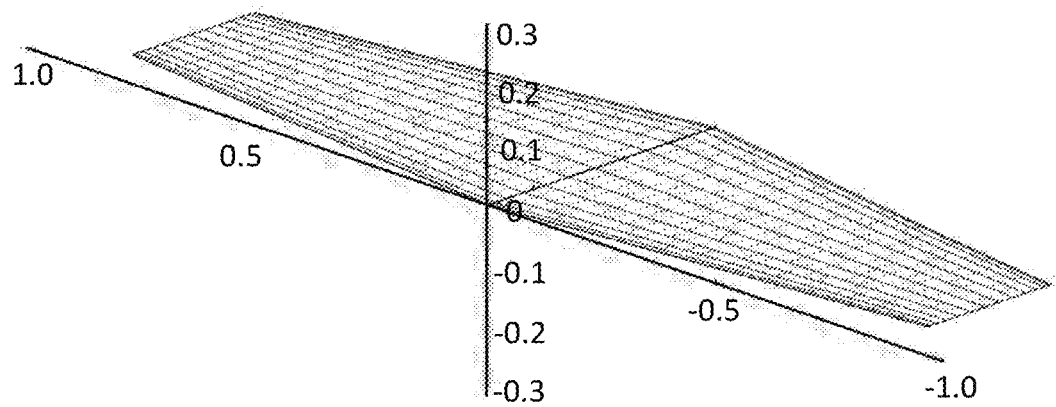
FIG. 2B is a schematic view of active tapered wing (prototype for flight test) structure in AVL.

The aerodynamic modelling and numerical computations were carried out using Athena Vortex Lattice (AVL) software. Athena Vortex Lattice is a simulation package that determines the solutions to a linear aerodynamic flow model. For all simulations, modelling was performed from a set of wing panels along the wing span and chord axes (computational model of wing/winglet structure is shown in FIG. 2A-2B). Each surface panel was assigned as a single horse-shoe vortex with velocities induced by each vortex evaluated at certain control points using the "Biot-Savart law". Forces and moments were obtained from the solved load distribution by applying the "Kutta-Joukowski Theorem" as discussed in SAFFMAN, "Vortex Dynamics", Cambridge Univ. Press, Cambridge, England, U.K., (1992).

For all simulations, the free-stream velocity was set to 30 m/s and 40 m/s and all results were calculated without the influence of compressibility. In order to be computationally efficient, a grid refinement study was performed on the baseline configuration prior to widespread use of the developed model.

Finite Element Model Analysis

The Finite Element Modelling (FEM) was carried out using ANSYS Mechanical and CATIA V5 software packages. The wing structure was modelled in CATIA V5 design software and then imported to the ANSYS software structurally and, together with AVL results, investigated further the aerodynamic and structural relationship. The FEM structural model of the wing was also used to assess the magnitude of the wing-twist deformation magnitudes for the concept. In order to achieve this, external AVL of aerodynamic loads were applied to this morphing concept.

Table 1 shows the material properties of the wing components. Laser ply (for wind tunnel model) and Balsa (for flight test prototype) were used for ribs, and carbon materials were used for rods and tube to provide strength of the model. To provide twist movement, end-bit part was manufactured which was made of Raku-Tool WB-1700 (for wind tunnel model) and P400 ABS Plastic (for flight test prototype).

TABLE 1

Summary of Material Properties

| Materials | Tensile Strength, MPa |
|---|---|
| Raku-Tool WB-1700 | 85.00 |
| Laser Plywood Sheets | 70.93 |
| Balsa Wood | 30.00 |
| P400 ABS Plastic | 56.58 |
| Carbon Fibre | 600.00 |

Figure 3A:
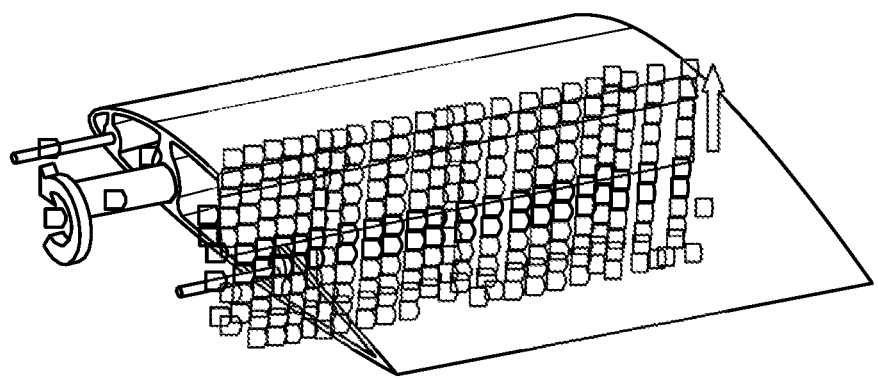
FIG. 3A shows boundary condition applied to wing structures in a wind tunnel model.
Figure 3B:
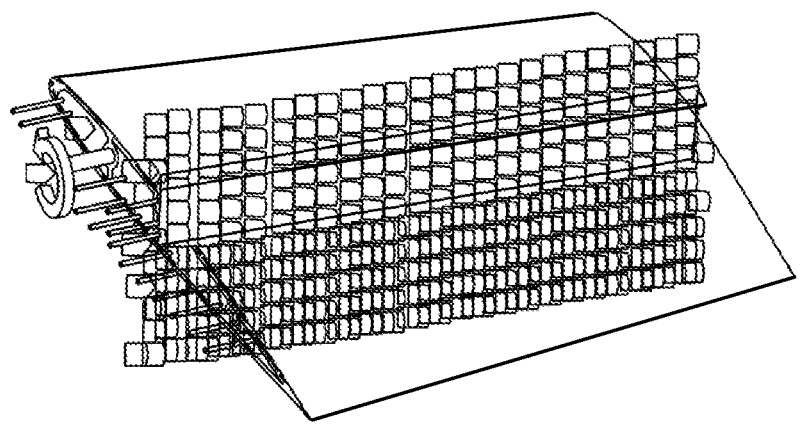
FIG. 3B shows boundary condition applied to wing structures in a flight prototype model.

Once the geometry and the materials had been applied, the assembled ribs began to constraint. FIG. 3A-3B depicts the boundary conditions applied to the winglet model. For each rib, sliding contact (no separation) properties were used to achieve the twist movements. In these contact properties, separation of the geometries in the contact is not allowed, but small amounts of frictionless sliding can occur along the contact geometries. Also, each rib was connected to the rods via the sliding contact, which provided free rotation during deformation. All three carbon rods were connected to the end section with bonded constraints, which enabled rotation of the end section and subsequent rib twist. In total 960 and 4731 connections were used for wind tunnel model and flight test prototype respectively. To achieve twist deformation on the structure, 3.43 Nm torque was applied to the main carbon tube. Aerodynamic load was also applied to each rib from segmented data obtained from AVL (40N (aerodynamic load) and 3 Nm (pitching moment) for wind tunnel model and 80N (aerodynamic load) and 5 Nm (pitching moment) for flight test prototype). After setting up the components and constraints, the next task was to apply mesh to the structure.

Experimental Setup and Apparatus

The experimental testing was carried out at Brunel University, in a 0.46 m×0.46 m open circuit low speed wind tunnel, giving a maximum operating free stream velocity of 40 m/s. Three different configurations were used with fixed baseline wing, morphing wing, and wing with an aileron components. For flight testing, the flying site used for this study was Playing Fields. In total four circuits were completed. Two of them were with a fixed wing configuration and the other two were with the morphing configuration. Flight data were recorded for each circuit and then analysed to investigate flight performance.

Morphing Wing Geometry and Twist Mechanism

Figure 1A:
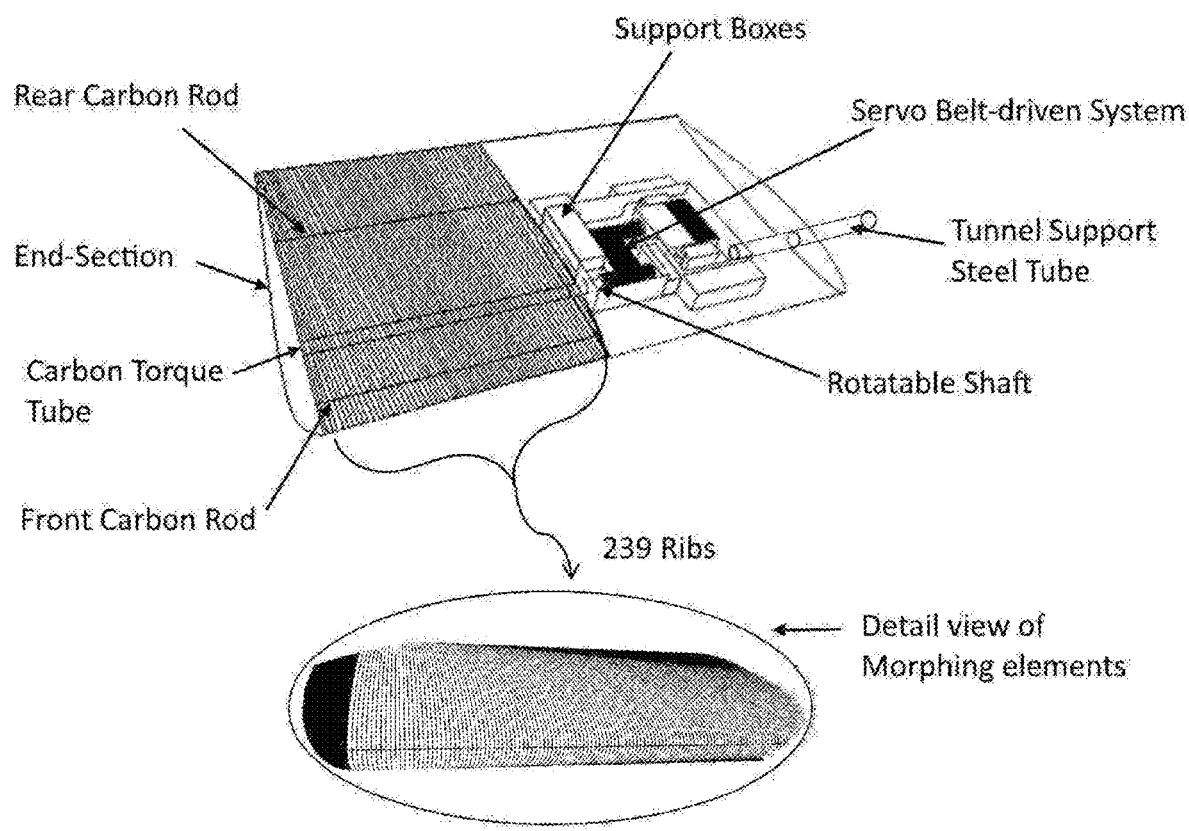
FIG. 1A is a schematic view of an active wing showing wing twist mechanism.
Figure 1B:
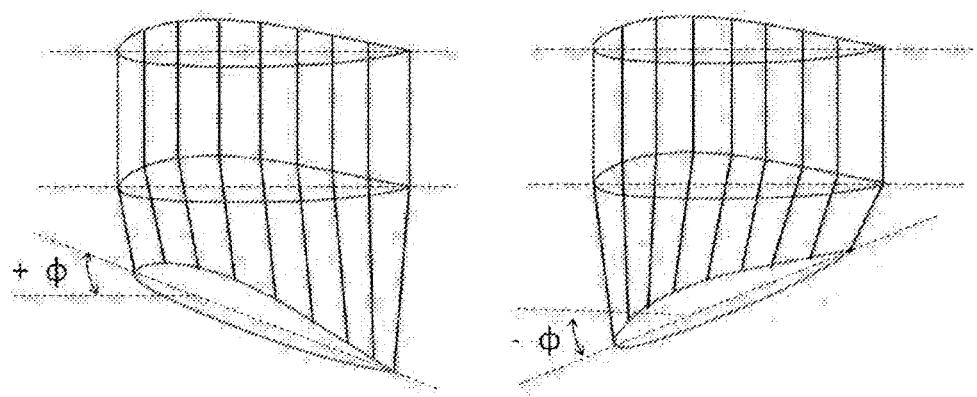
FIG. 1B shows positive twist angle (washin) and negative twist angle (washout).

The model choosing for this twist demonstration study and its twist parameters are shown in FIG. 1A-FIG. 1B. As can be seen that rectangular wing was initially investigated due to the ease of implementation compared to sweep wing geometries. The baseline wing configuration (without morphing) comprised a 12% thick, Zagi airfoil section, no leading edge sweep angle, a 0.330 m half wing span, a 0.2 m root chord, a 0.2 m tip chord, with aspect and tip ratios of 1.65 and 1 respectively. The morphing part had a 0.2 m winglet tip chord, and a span of 0.15 m.

The morphing actuation mechanism was critical for the concept to work adequately. It also had to be integrated into the model seamlessly to minimise drag. Once the mechanism is working, the vibration should be minimal in order to achieve accurate system performance. To accommodate this system, a part of the bottom section of the wing was removed and an internal mechanism installed inside the wing. Some support parts were used to provide adequate housing support for the mechanism as is shown in FIG. 1A. The Carbon Fibre Torsion Tube was fixed to the main wing before installing the mechanism. On the other side of the carbon tube, an end support was fitted.

The morphing mechanism was placed inside the wing profile. The twist mechanism encompassed one Hitec HS-7950 TH high voltage torque servo, which was a titanium gear coreless servo. It is rated at 3.43 N-m torque at 7.4 Volts, and was retrofitted with a belt drive system operating with a 1:1 gear ratio to rotate the shaft, which was positioned at the quarter chord of the overall wing. When the servo torque was applied to this shaft to end-support would enact twist. A belt tensioning system was also set up inside the wing profile to allow belt tension adjustment. The system consisted of the ABS plastic boxes, which were glued to the bottom side of the wing and the top side of the system was free to slide and tension the belt. On this top surface, a bearing was used with a servo shaft connected to provide alignment and support structural bending. Once the belt system was tensioned, the top surface (plate) was screwed to the bottom side to maintain the aerodynamic shape. Space was also left inside the wing section for the servo cable to exit the wind tunnel support and connect to the driving electronics. Additionally, in order to reduce vibration, additional support boxes were also fastened and glued to the inside of the wing profile to further support the servo as well as the gears.

Figure 4:
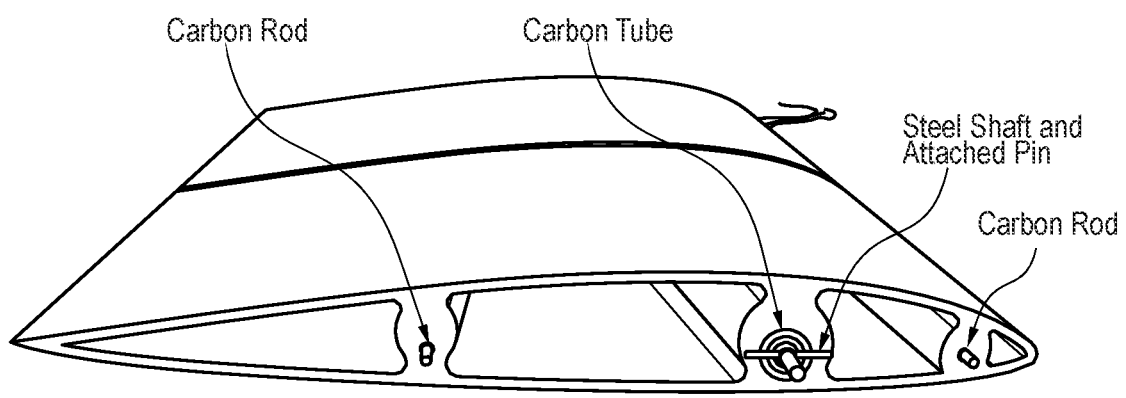
FIG. 4 shows the internal mechanism of an active wing.

For the morphing section each of the 239 ribs were made from 0.6 mm thick laser plywood sheet. For the combined morphing structure, CAD designs were imported into ANSYS to analyse structural performance to ensure it could withstand the required aerodynamic loads. Several rib designs and configurations were tested. After these exploratory investigations (mentioned in result section), it was decided that 2 carbon rods and one carbon tube would provide satisfactory stiffness to the concept. These lightweight and strong carbon fibre rods were both glued and screwed to the main wing. The torsion tube, which was a 10 mm diameter pultruded carbon fibre tube, was also glued to the wing. The parts were then assembled and the end-section was mounted and screwed with nuts and grub screws. Cavities were filled and sanded to create an aerodynamically smooth surface finish. After assembly, the top and bottom sections of the rib surfaces were also sanded in situ to ensure a smooth, aerodynamically clear surface. The completed wing internal mechanism is indicated in FIG. 4.

Figure 5A:
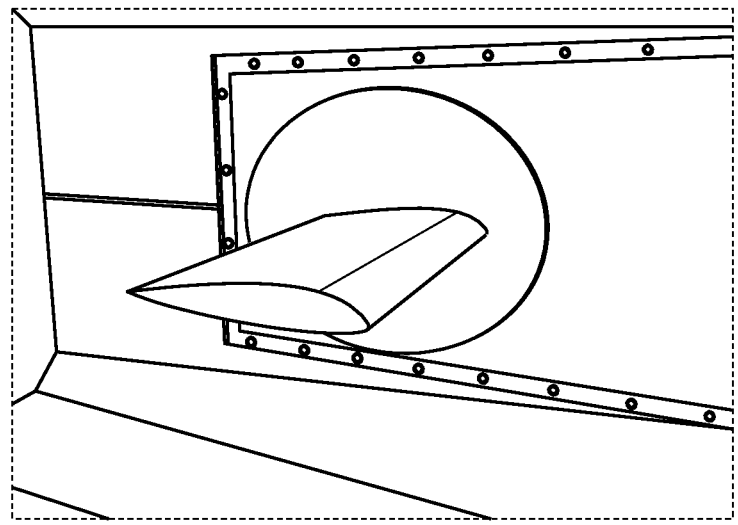
FIG. 5A is a photo of an experimental model of a full wing profile.

To attach the wing model to the wind tunnel, a 10 mm diameter steel tube was also fastened and glued with epoxy resin at the quarter chord point of the wing model. The servo motor cable was then passed from the steel tube and pulled out from the holes created for this purpose on the steel tube. An aluminium cover was also designed to enclose the top of the mechanism. To reduce undue aerodynamic flow behaviour, the exposed part of the cover was trimmed and sanded back to the main wing surface creating an aerodynamic smooth surface finish. To compare the results of morphing concept, a full wing baselined-fixed was separately manufactured (shown in FIG. 5A.) Similar to the other configuration, the wing was made of Raku Tool WB-1700 with an identical span of 0.315 m.

Figure 5B:
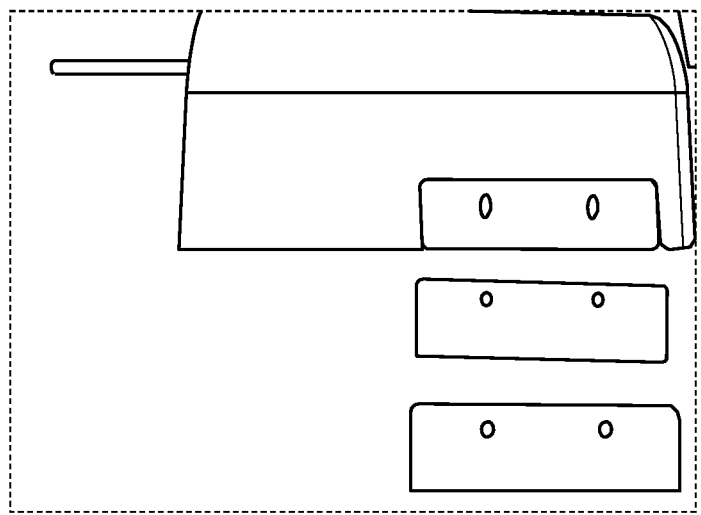
FIG. 5B is a photo of an experimental model of an aileron configurations.
Figure 5C:
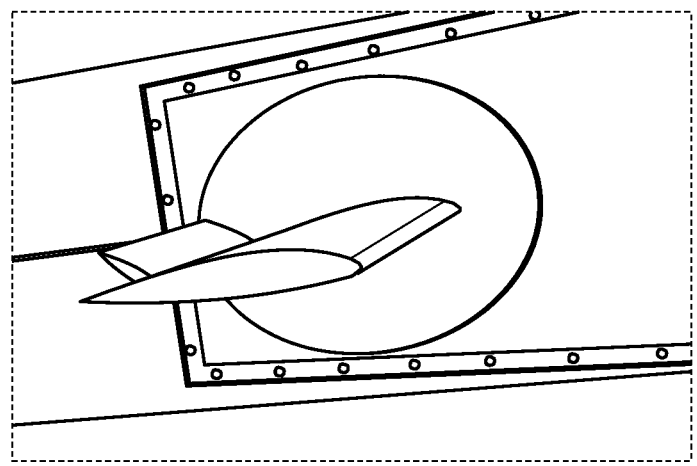
FIG. 5C is a photo of an experimental model of an aileron at (−30°).
Figure 5D:
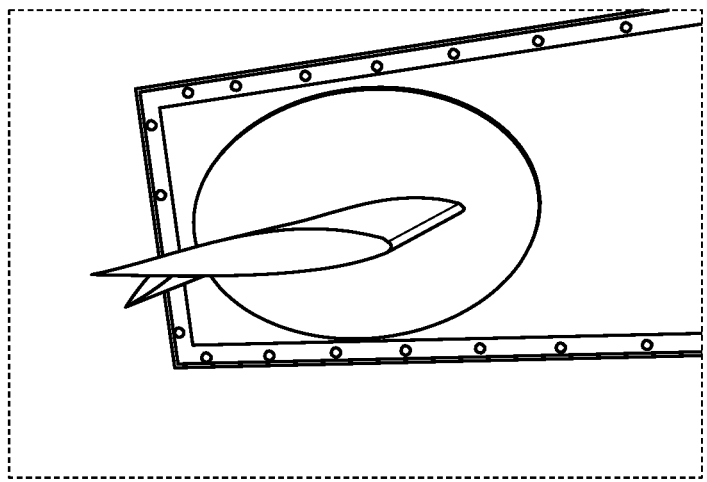
FIG. 5D is a photo of an experimental model of an aileron at (+30°).

In order to make a direct comparison and further validate the morphing concept and a traditional aileron system for roll control, six different ailerons (±10°, ±20° and ±30°) was designed and manufactured (as shown in FIG. 5B, and then tested in a wind tunnel (as shown in FIG. 5C and FIG. 5D). These angular ranges were selected based on recommendations of conventional aircraft ailerons discussed in WENZINGER, "Wind Tunnel Investigations of Aodinary and Split Flaps on Airfoils of Different Profile", *NACA Report* 554, Langley Field, Va., (1935) and SHORTAL et al., "Wind Tunnel Investigations of Wings with Ordinary Ailerons and Full Span External Airfoil Flaps", *NACA Report* 603, Langley Field, Va., (1937). The aileron was also placed outboard of the trailing edge of the wing with a size chosen at 50 mm chord length (0.25% wing chord), and a span of 145 mm. The decision was made based on the standard aileron system as discussed in SADRAEY., "Aircraft Design: A Systems Engineering Approach", Chapter 12 Design of Control Surfaces. Wiley Publications, (2012).

The decision was also based on the calculated twisted wing roll rate as discussed in ESDU, "Rolling Moment Derivative, L $\xi$ for Plain Ailerons at Subsonic Speeds," (August 1988).

Each aileron was made from a combination of 6 mm thick elements in a combined linear array.

The final model is shown in FIG. 5. This configuration was CNC machined encompassing the aileron with the required space for the aileron removed. To provide an aerodynamic finish, the surface was sanded and coated with black paint. Two locating screws were used to fix the aileron to the wing structure. The screw holes were then filled with putty and sanded smooth. Similar manufacturing procedures were used to construct the other ailerons. In total, 3 different aileron angles were produced with each one providing both a negative and positive test case (a total of 6 configurations). Additionally, the gap between the aileron and the wing structure was sealed to minimize, or at least reduce, flow discontinuities.

Flight Test Mode

Figure 6:
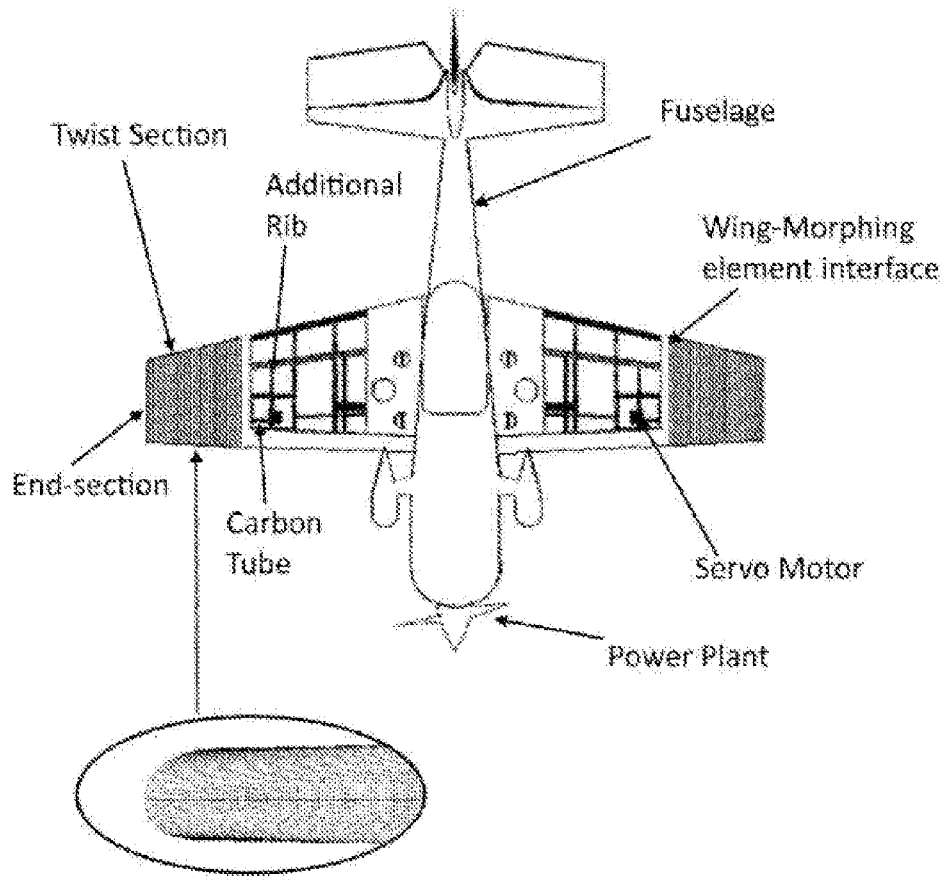
FIG. 6 is a schematic of an Extra 300-78 inch aerobatic plane and wing twist design.

The model chosen for this study was an Extreme flight Extra 300 with a 78-inch wingspan. The baseline wing configuration comprised a symmetrical airfoil section and a 2.5° leading edge sweep angle, a 1.980 m wing span, a 0.5 m root chord, and a 0.27 m tip chord, with aspect and tip ratios of 5.45 and 0.54 respectively. The fuselage part was 1.930 m long and the maximum thickness was 0.215 m. In this study two wing sets (left and right wing) were used (the schematic view of the plane is shown in FIG. 6). The wings had a fixed configuration with a full aileron section. It was decided to make the twistable wing sections 0.3 m long according to initial morphing applications as discussed in HOUGHTON et al., "Aerodynamics for Engineering Students", Butterworth-Heinemann, 5th ed., (2003).

Figure 7:
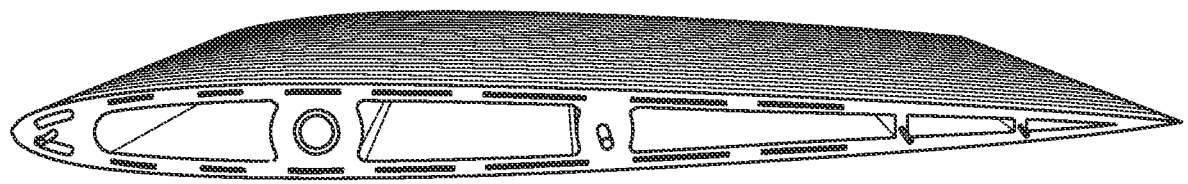
FIG. 7 is a photo of the internal structure of a morphing element (Flight Prototype).

For the twist mechanism, due to the weight requirements for an actual flight environment, balsa wood sheets were used as the main material for the ribs and the inside of the rib sections. The number of stiffening rods selected was based on the achievable twist displacement. The final model consists of 365 balsa wood ribs, which were cut using a Laser Cutter machine. The active wing model also had eight small carbon rods (each with a 0.5 mm diameter) that were distributed along the wing span. These rods produced an aerodynamic smooth surface while morphing as well as making the structure able to resist aerodynamic load. Additionally, two 1.5 mm diameter carbon rods were used at the origin of the wing chord. These also aimed to provide durability to the wing structure. Furthermore, the main carbon tube (10 mm outer-diameter) was used to align the ribs as well as to accommodate the internal shaft to rotate the end-section. The internal mechanism is also shown in FIG. 7.

Additional parts were needed to increase the strength of the edge of the fixed wing structure. Therefore 15 mm ribs consisting of 1 piece of plywood (6 mm thick) and 3 pieces of balsa wood (3 mm thick) were glued to the end of the wing structure. Additionally, a carbon tube was used to increase the strength of the wing tip for both wings. This was important due to the morphing element creating additional load when the twist was rotated. The carbon rod tube was then glued to the main wing with the ribs able to rotate with the twist action.

The actuator mechanism for the twist movement consisted of a Hitec HS-7950 TH high voltage torque servo (which is a titanium gear coreless servo, 3.43 N-m maximum Torque at 7.4 Volt), a steel shaft, an attachment pin, bearings, a washer, nuts, and the ABS plastic made end-section. The steel shaft was positioned at the quarter chord of the wing over the span of the structure.

Figure 8A:
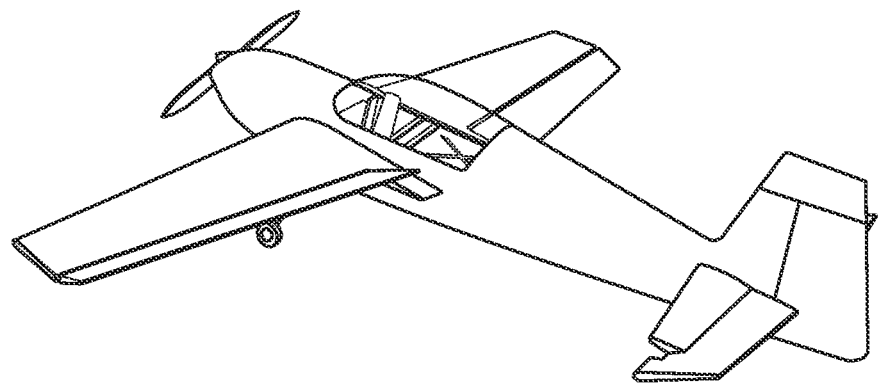
FIG. 8A shows a flight-testing model with wings with ailerons.
Figure 8B:
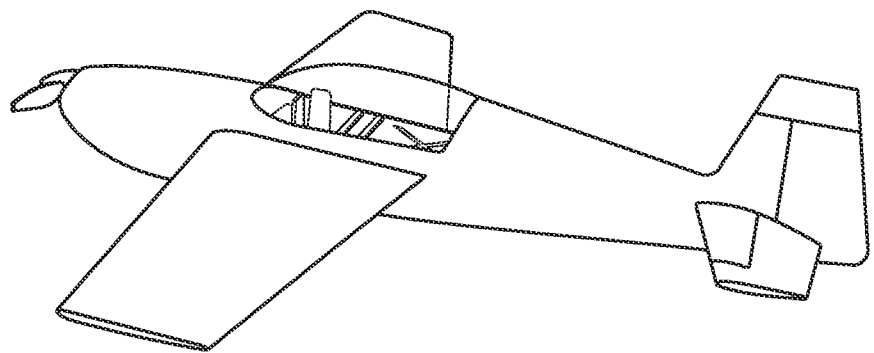
FIG. 8B shows a flight-testing model with wing with a morphing design.

The manufactured servo coupling held the connection between the servo motor and the steel shaft. The other side of the steel rod was connected to the end-section using a fitted attachment pin as well as additional nuts. Activating the servo rotated the end-section where all of the interconnection carbon rods were bonded. To align the steel rod with a carbon tube and to reduce any misalignment inside the carbon tube, four bearings were positioned and fixed to the steel rod. A 3 mm plywood cut and was also glued to the required position inside the wing to support the servo (FIG. 6). The inside of the end section was also carefully removed. The surface needed to be as smooth as possible, because discontinues on the surface have a negative effect on the aircraft's performance. To prevent any undue aerodynamic flow behaviour, the complete morphing elements were sanded. The final model is shown in FIG. 8A-FIG. 8B.

After installing all servo mechanisms, shafts and electrical connections, baseline and morphing concept were compared to investigate any differences between these two wing configurations and the baseline wing was found to be lighter (54 gram less) than the morphing wing.

A Futaba R617FS 2.4 GHz FASST 7-Channel receiver was used as the main controlling device. Servo cables, which provide wing twist, pitch, yaw and thrust, were connected to the receiver. These control surfaces were controlled by the transmitter (Futuba T10CG 2.4 GHz 10-Channel T-FHSS radio system). An Eagle Tree data flight recorder was used with a Seagull wireless data transmitter that used a static pressure/pitot tube/transducer combination for flight speed and pressure altitude, a magnetic RPM sensor for motor RPM, a thermocouple for temperature and a two axis accelerometer for g-forces in the rolling axis. Note that the G-force device was positioned on the plane's cg. The Eagle tree recorder also recorded the servo positions and control inputs from the radio. Data were recorded at 10 Hz and saved on an on-board computer. Velocity, altitude and signal strength were continuously transmitted to a ground station. The data recorder utilises a USB cord to communicate with the Eagletree software loaded on a laptop computer. RC Logger Video Telemetry and Orientation G-Force Module was also used to measure pitch angle, roll angle, direction, linear acceleration, angular position, and velocity during flight.

The Wind Tunnel Measurement Environment

Figure 9:
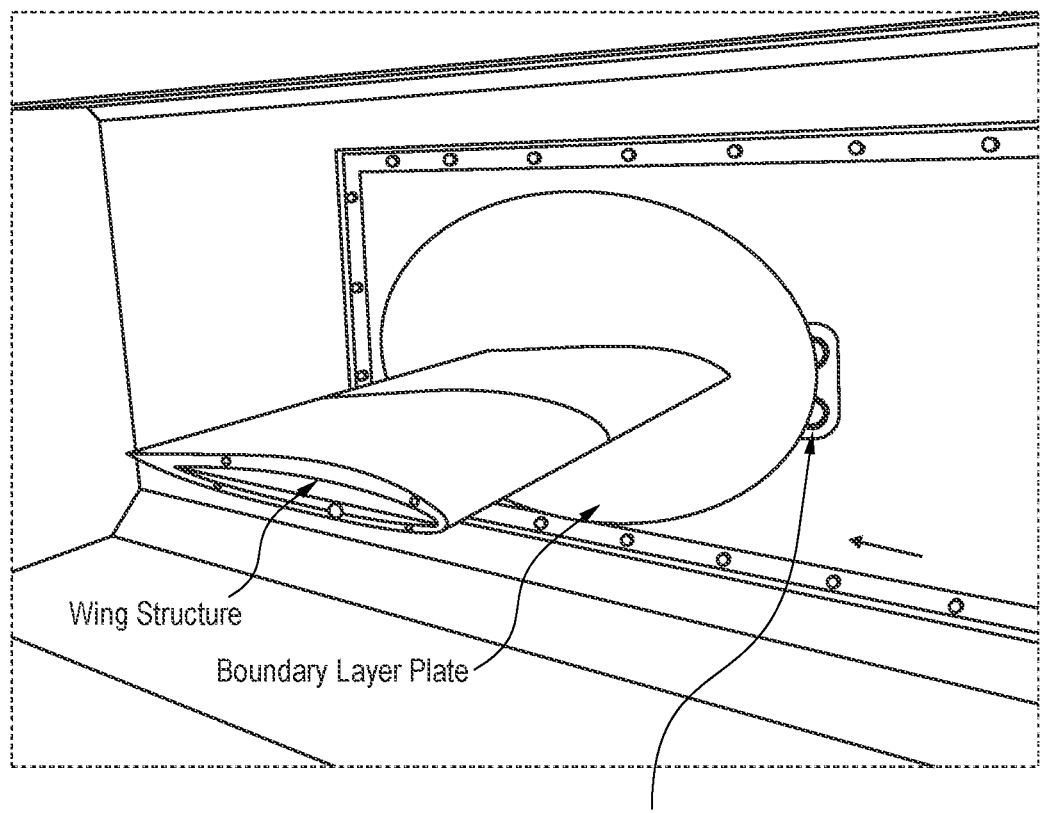
FIG. 9 is a photo of an experimental setup for an adaptive winglet configuration.

The models as shown in FIG. 9, were installed in the middle of the test section. To reduce boundary layer wall effects, an end plate was used (0.37 m×0.25 m) according to the results discussed in BARLOW et al., "Low-Speed Wind Tunnel Testing", 3rd ed., Wiley-Interscience, New York, (1999). The boundary layer plate was installed 0.025 m off the tunnel wall using adjustable threaded rods. The wing model was also placed 0.001 m off the plate to allow free movement as discussed in MUELLER et al. "Experimental Studies of the Eppler 61 Airfoil at Low Reynolds Numbers" AIAA Paper 82-0345 (1982). They showed that the gap size needs to be around 0.5% of the span to not have any interference on the results. Also, to reduce any flow interference between the support rod with the plate and the tunnel wall, an airfoil shaped fairing was manufactured and glued with epoxy resin.

The force and moment balance used to measure the performance of the wind tunnel models was an AMTI MC3A-500. To support the load cell on the wind tunnel, an aluminium balance support frame was manufactured and fixed to the tunnel wall. A spirit level and inclinometer were used to ensure that the load cell was level. The model support sting was then mounted to the active plate of the AMTI MC3A-500. To prevent contact between the support sting and the tunnel wall, a clearance hole was cut out of the tunnel lid. A symmetrical airfoil shaped fairing was manufactured and bonded to the boundary layer. Calibration of the load cell was completed before testing and derivation was found to be less the ±2.5% of full scale output. Force and balance data were measured before each section to compensate of the final test results. No wind tunnel blockage corrections and artificial mechanism were used.

Figure 10A:
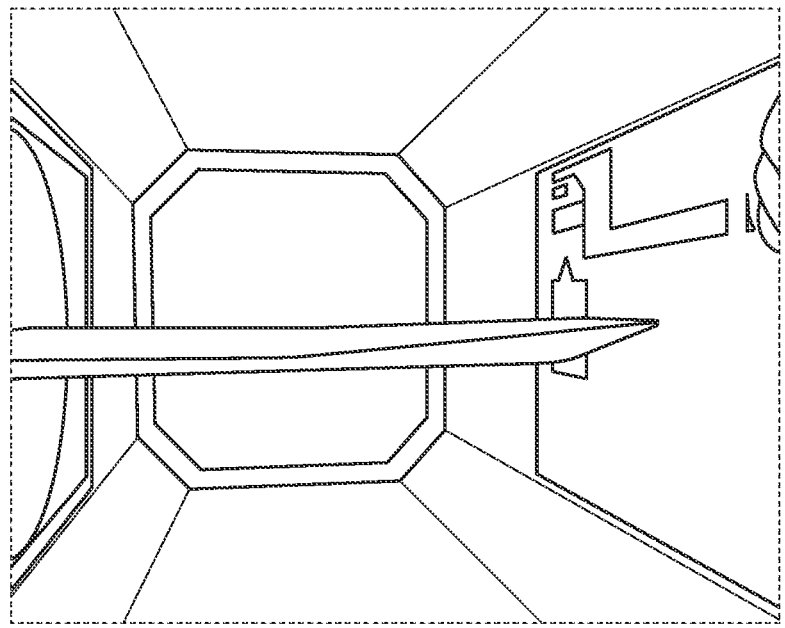
FIG. 10A shows a negative twist ($\phi=-6°$) for a wind tunnel model.
Figure 10B:
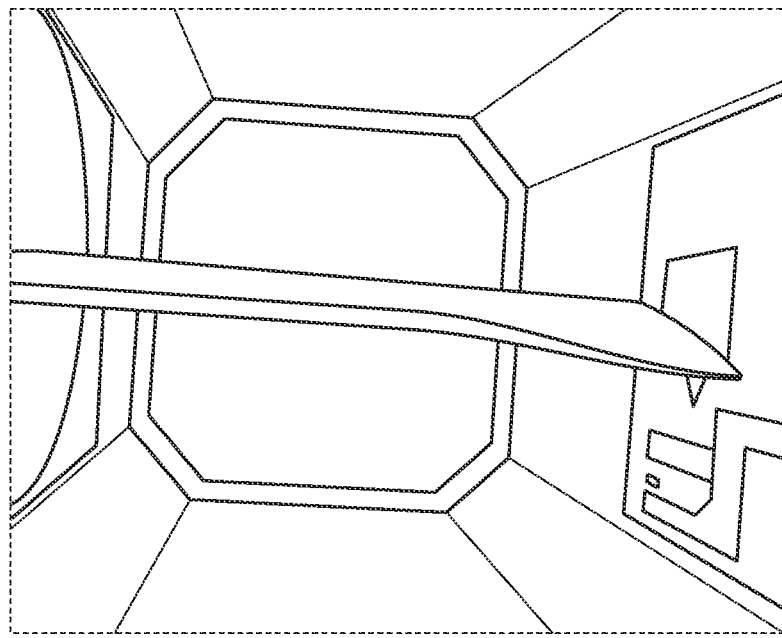
FIG. 10B shows a positive twist ($\phi=+6°$) for a wind tunnel model.

A Futaba R617FS 2.4 GHz FASST 7-Channel receiver and Futuba T10CG 2.4 GHz 10-Channel T-FHSS radio system (transmitter) were used to control the servo motor of the morphing wing. The Hitec Servo within the model was connected to the receiver and a 6V NiMh battery was utilised as the power source. The model would twist $\phi=\pm6°$ (FIG. 10A-FIG. 10B).

To adjust the angle of attack of the wing configurations, a manual rotation stage was designed and attached to a support bar. This manual rotation stage was also mounted directly onto the force and moment balance, which was connected to the support frame fixed to the outside test-section wall. Using additional bolts, the wing support sting could be adjusted in accordance with the oncoming flow. A digital inclinometer was used to calibrate the angle of attack mechanism (position error ±0.5°). To obtain turbulence intensity, a Streamline CTA Module signal conditioners A/D boar NI e-series, miniature X wire Probe (Dantec 55P61) was used with a 55H24 probe support bar and an A1863 cable. The hot-wire voltage output was measured and averaged with the Stream Wire software. The nominal flow speed was chosen for this study V=30 m/s and V=40 m/s (±0.25 m/s), and turbulent intensity level was measured 0.35%.

Results and Discussion

The results were divided into three sections. First is the Finite Element Analysis (FEA) of the wing twist structures. Following that, wind tunnel results including aerodynamic force and moment results are discussed, as are comparisons to a traditional wing-aileron system to ascertain any performance enhancements. Final section shows the flight test results with comparing fixed baseline aileron configuration and morphing element.

Experimental and Numerical Analysis of Wind Tunnel Model

Figure 11A:
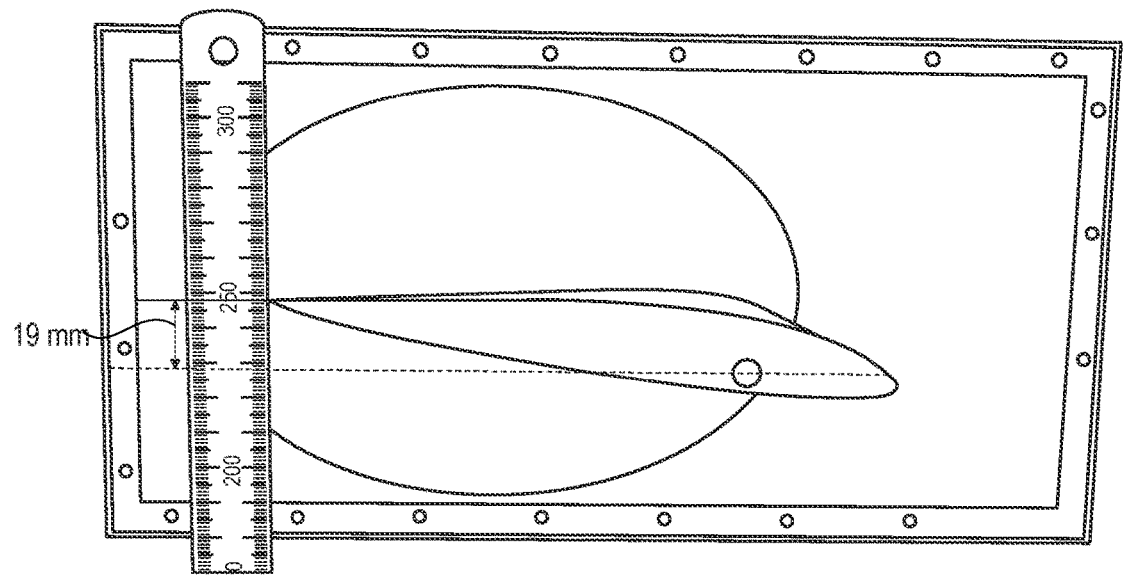
FIG. 11A shows maximum negative twist (wash-out) of a morphing design without any flow interaction: Experimental model twist and (b) Numerical modelling twist movement.
Figure 11B:
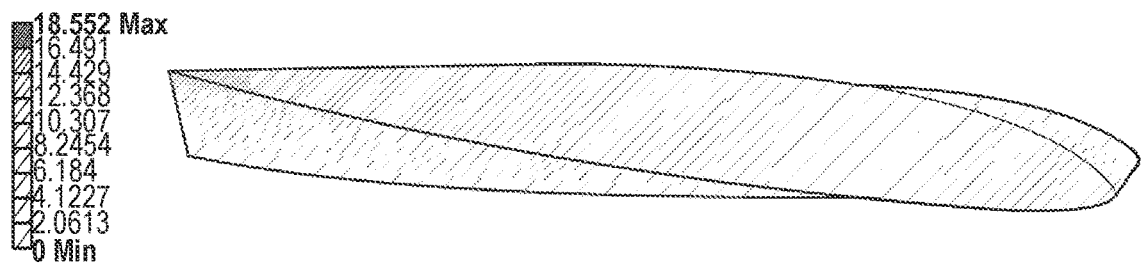
FIG. 11B shows maximum negative twist (wash-out) of a morphing design without any flow interaction: Numerical modelling twist movement.

The results taken from ANSYS for the FEA model was compared directly to results from the experimental model under no-wind condition (shown in FIG. 11A and FIG. 11B). It can be seen from FIG. 11A and FIG. 11B that there is good agreement between the numerical and experimental model for wash-out (negative twist) deflection (negative twist) with maximum tip deflection was found to be 19 mm compared to 18.552 mm in from ANSYS.

With wash-in (positive twist) deflection FIG. 12A and FIG. 12B, the comparisons between the computational and experimental model gave differences of approximately 0.5 mm. A maximum 18.5 mm deflection was measured at the tip with the numerical model giving 18.006 mm. A few differences could be due to un-modelled friction factors between the components.

Comparison Between the Morphing Concept and Baseline Fixed Wing

Figure 13:
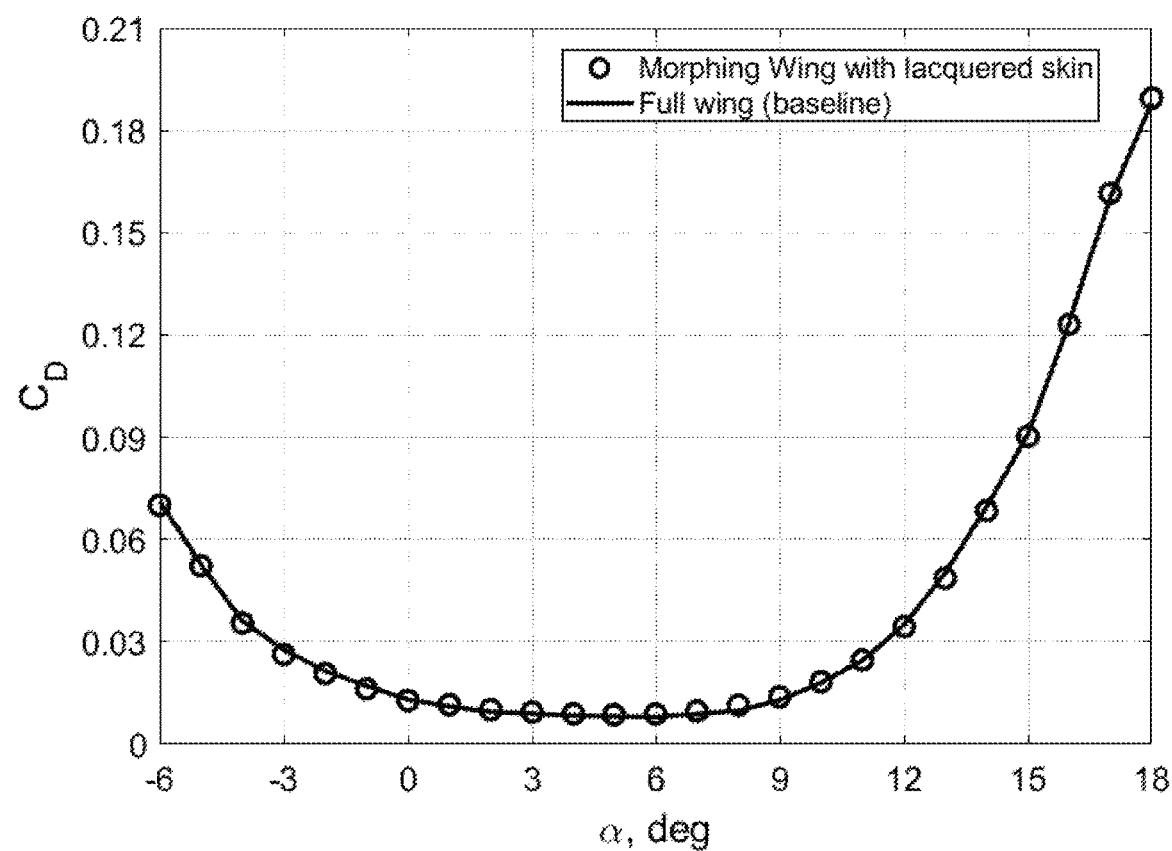
FIG. 13 is a graph showing a drag coefficient comparison between a full wing (baseline) and Morphing wing.

Drag coefficient results play a significant role in obtaining the aerodynamic performance of the aircraft. To illustrate the effects of morphing wing, initial test were conducted and compared to the baseline fixed wing. The drag coefficient results versus angle of attack for the morphing concept and the baseline fixed wing is shown in FIG. 13. The model (morphing wing) provided drag coefficients that were extremely close to that observed for full wing, fixed baseline model in all range of angle of attacks. This implies that the proposed design does not have detrimental effects in aerodynamic.

Static Forces and Moments

The static force and moment results produced through wing twist between $-6°<\phi<6°$ versus angle of attack are shown from FIG. 14A to 14F. The first aerodynamic measurement on the morphing concept was conducted to understand the effects of the sliced ribs mechanism on static force and moment coefficients compared to a full span (baseline) wing model. In general, results show adequately the trends with varying angle of attack and are consistent with well-known wing aerodynamics such as those suggested in ABBOTT et al., "Theory of Wing Sections: Including a Summary of Airfoil Data", Press 11 (1959). The results for different twist configurations also show significant aerodynamic benefits in terms of efficiency and control compared to the baseline model.

Figure 14A:
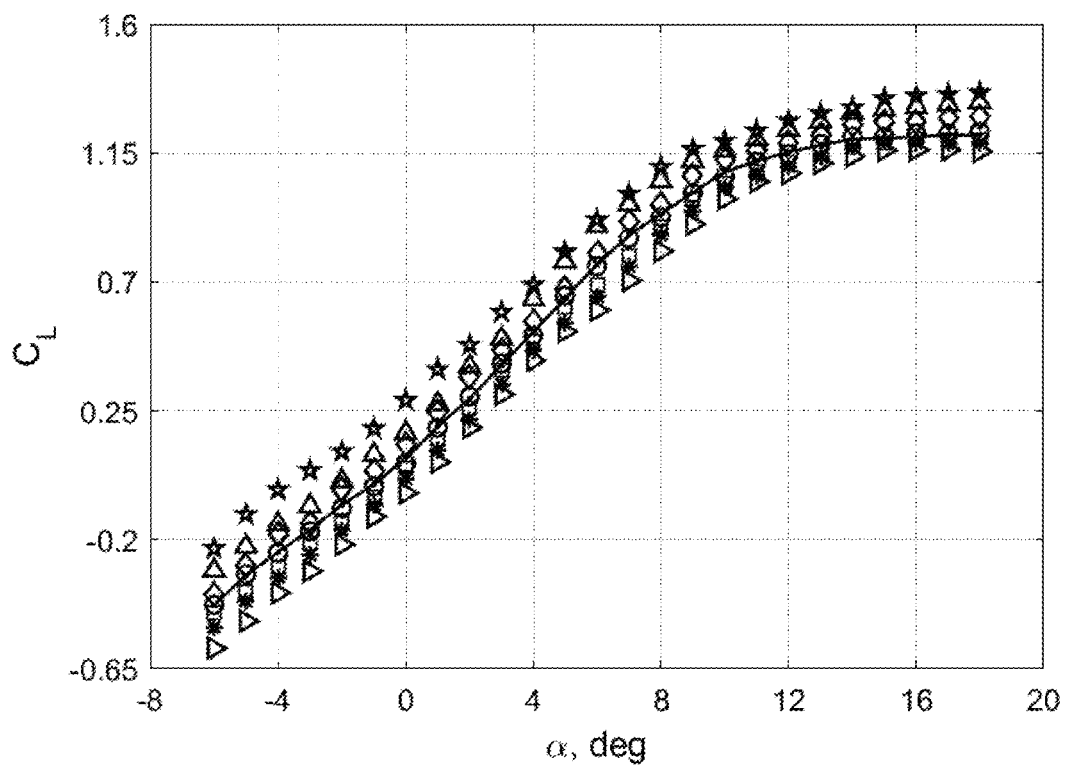
FIG. 14A-FIG. 14F are graphs showing the effects of changing twist angle on the longitudinal static forces and moments, $Re_n=3.85\times10^5$.
Figure 14B:
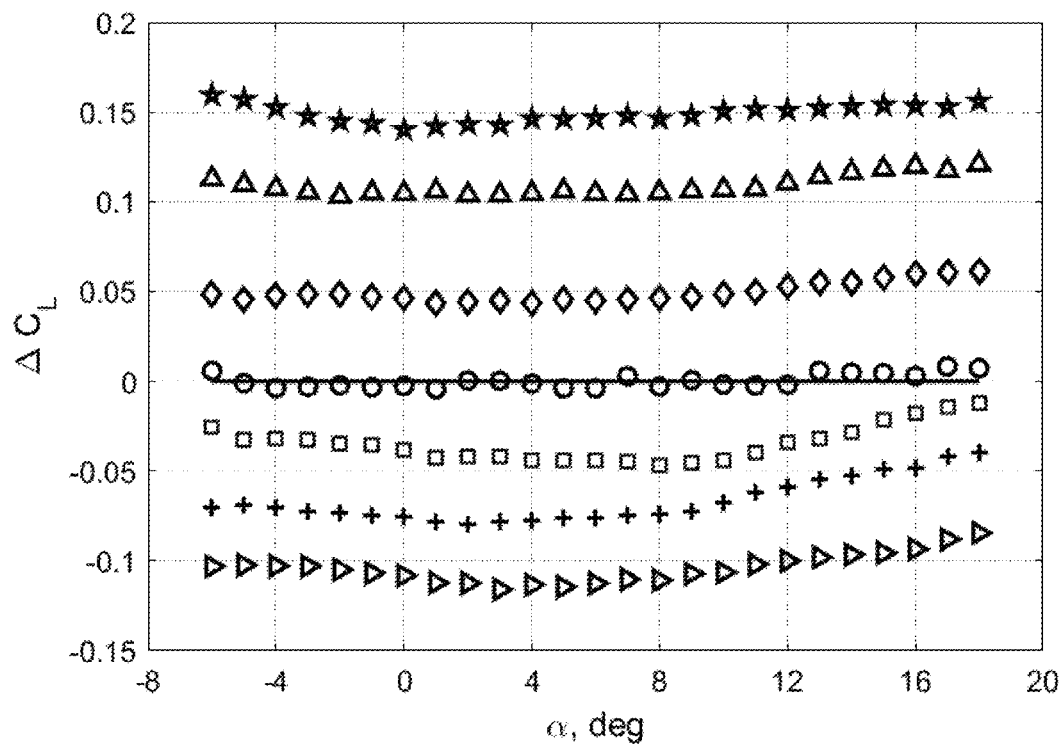

FIG. 14A shows lift coefficient results for various twist configurations. It can be seen that increasing the twist angle to 6° tends to increase lift. This was suggested by "SMITH" As the twist angle is increased to 6° as would be expected, the lift curve slope increases with angle of attack increases to maximum ($\Delta C_L$=0.23 (13%) compare to un-twisted wing configuration at $\alpha$=18°). Conversely, reductions are seen as twist angle decreases to $\phi$=4° and $\phi$=2° with maximum $\Delta C_L$ being 0.146 and 0.091 respectively. When negative twist configurations are considered, lift coefficient results were reduced further. When the twist angle varied to $\phi$=−6°, a maximum reduction of $\Delta C_L$=−0.145 was found compared to the untwisted configuration (around 15.4% less compared to $\phi$=6°). This would be expected due to both net reductions in effective angle of attack as the wingtip moves out of the wing plane and contribution to overall lift production reduces as discussed in PHILLIPS, "Lifting-Line Analysis for Twisted Wings and Washout-Optimized Wings," J. of Aircraft, 41 (2004). Similar results were found in "SMITH" where experimental results present greater $C_L$ for higher positive twist angles. Direct comparison between the morphing concept and the full-span baseline wing are also illustrated in FIGS. 14A and 14B. Similar trends are shown with a maximum $\Delta C_L$=0.022 at maximum angle of attack ($\alpha$=18°).

Figure 14C:
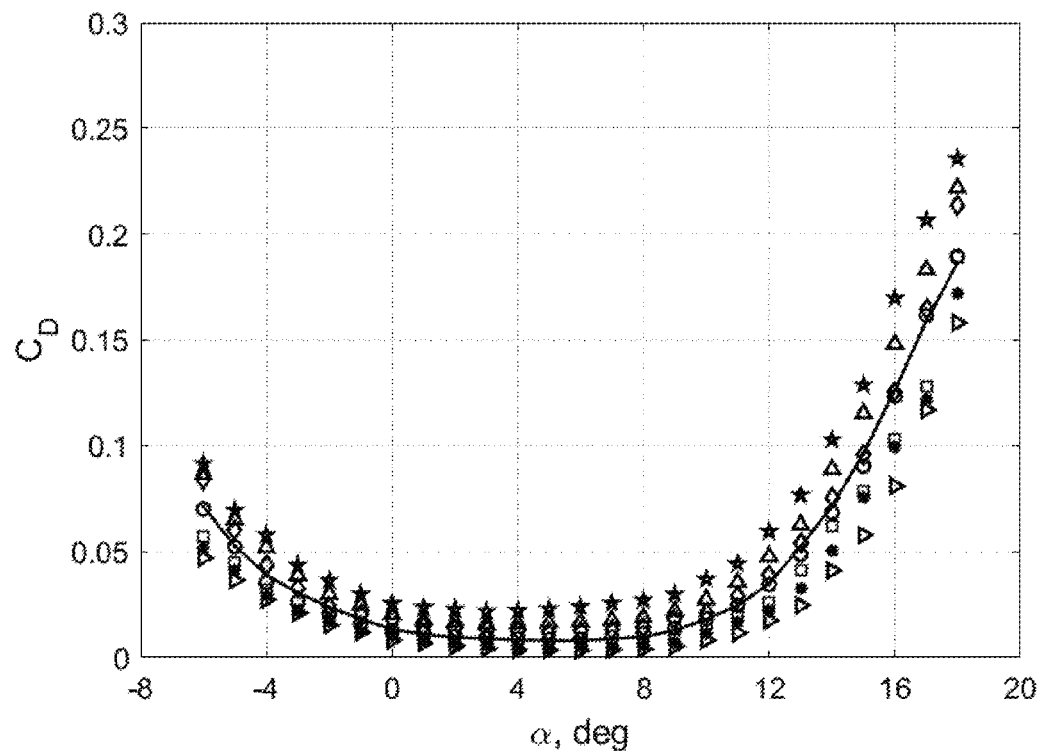
Figure 14D:
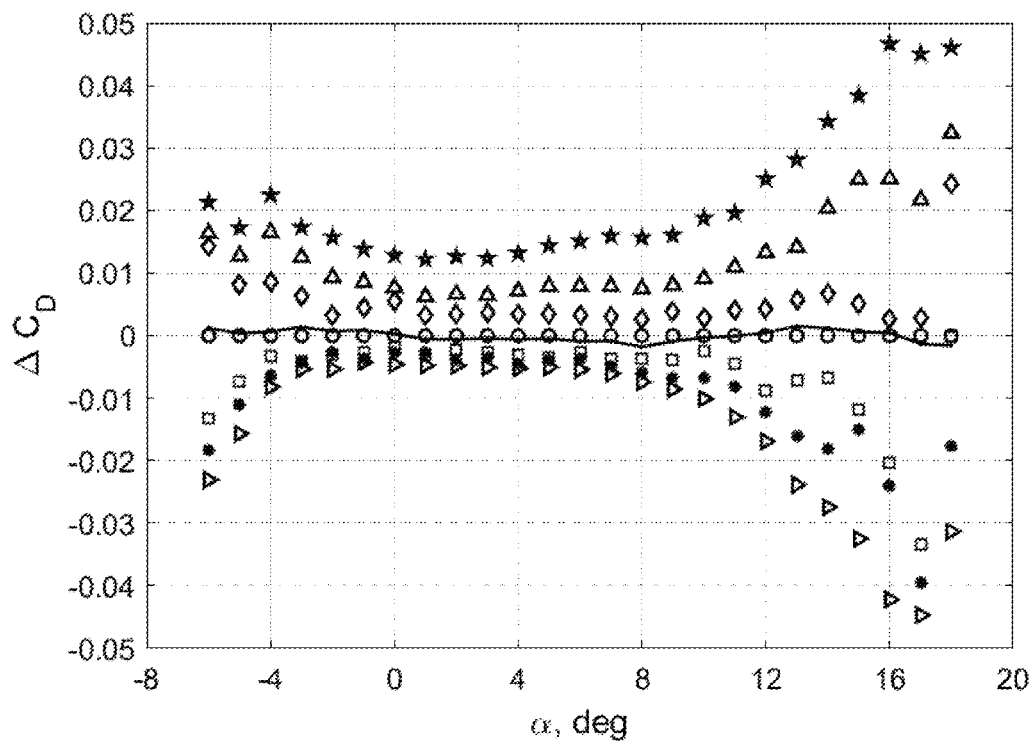

Considering further with increasing angle of attack, overall drag increases can also be seen in FIGS. 14C and 14D. The experiments show this drag increase to be more effective at $\phi$=6° ($\Delta C_D$=0.049 (20.6% higher than $\phi$=0°, at $\alpha$=18°). When $\phi$=4° and $\phi$=2° are considered, the results still show reasonable drag increases in contrast to $\phi$=0° with a maximum increase at $\alpha$=18° with $\Delta C_D$=0.031 (16.4%) and $\Delta C_D$=0.025 (11.1%) for $\phi$=4° and $\phi$=2° respectively. On the other hand, the influence of negative twist angle on drag reduction was found to be significant with maximum $\Delta C_D$=−0.031 (19.6% at $\alpha$=12°) when wing twist varied from $\phi$=0° to $\phi$=−6°. As reducing the twist angle to $\phi$=−4° and $\phi$=−2°, drag reduction was also decreased, but still less drag increase compare to $\phi$=0° with 9.88% and 1.37% respectively. This result gives some indication of the influence of large twist angles out of the wing plane on overall performance. This does however, seem to be some exceptions to this finding, particularly for 0°<$\alpha$>5° where the results seem to be relatively low due to a lower increase in angle of attack. Due to increased sensitivity to the onset tip flow separation on wing after $\alpha$=12°, a dramatic drag increase was seen in most of the twist cases presented. A similar trend was observed both computationally and experimentally in "SMITH" where there is a link between a reduction in $C_D$ with negative twist variation to a maximum. Moreover, the un-twisted configuration of the morphing concept and full span baseline wing cases show very similar drag level trends (maximum $\Delta C_D$=0.001 at $\alpha$=18°) implying adequate simulate between these two configurations under these conditions.

Figure 14E:
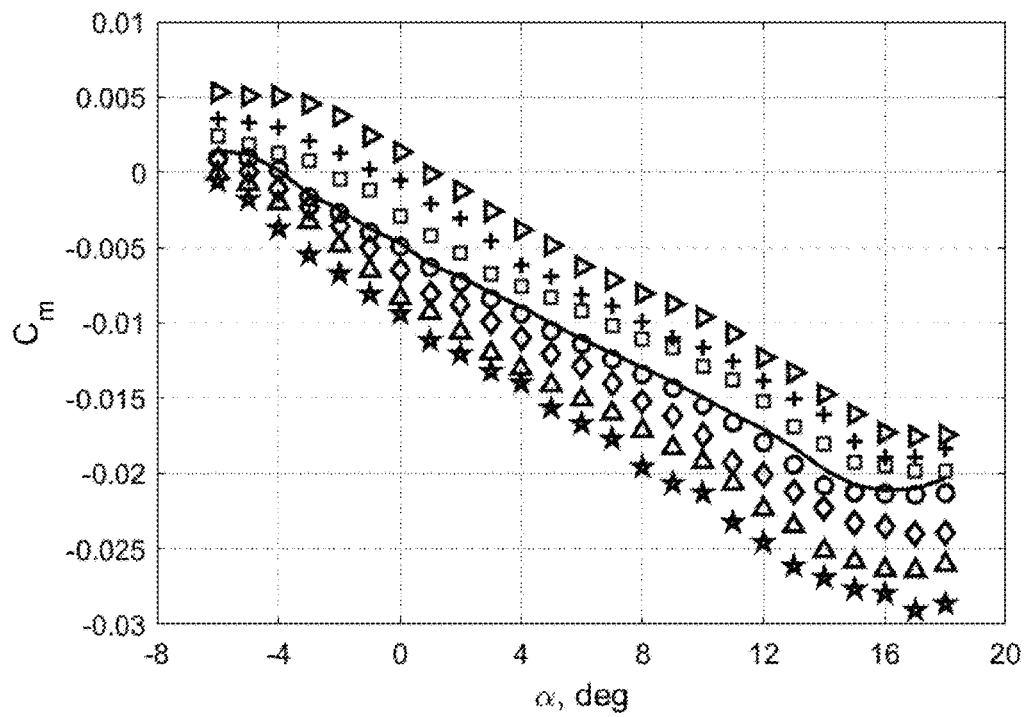
Figure 14F:
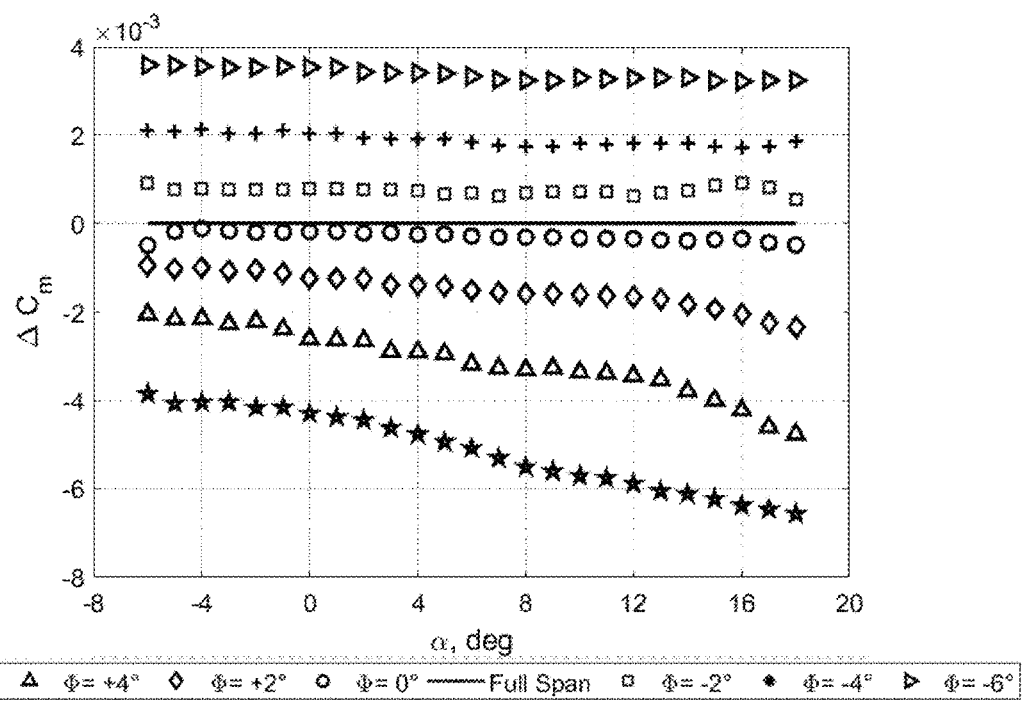

FIGS. 14E and 14F illustrates the pitching moment coefficient results for various wing configurations. It can be clearly seen that nose down pitching moments are the predominant action on the wing twist change. This was expected due to the use of the reflexed trailing edge of the 12% Zagi airfoil. It can also be seen from plot $C_m$ (FIG. 14(e)), at $\phi$=−6° that the pitching moment is positive ($\alpha$<0°) signifying the effectiveness of the trailing edge at producing stabilising nose-up moments with increasing the angle of attack, a maximum negative pitching moment was observed. In general, trends between the twist cases are very similar. At $\phi$=+6°, results showed that the aerodynamic centre translation aft is much more than other cases presented with a maximum difference of $\Delta C_m$=−0.0067. Reducing the twist angle to $\phi$=−6°, pitching moment coefficient still shows the trend as seen in $\phi$=+6°, representing a 40% decrease compared to $\phi$=0° ($\Delta C_m$=0.0037).

Further comparisons between the full span baseline wing and the $\phi$=0° twist configurations are shown in FIG. 14F. It can be clearly seen that there is strong evidence that both cases perform the same for most aerodynamic metrics (maximum $\Delta C_m$=0.001 at $\alpha$=11°).

Figure 15A:
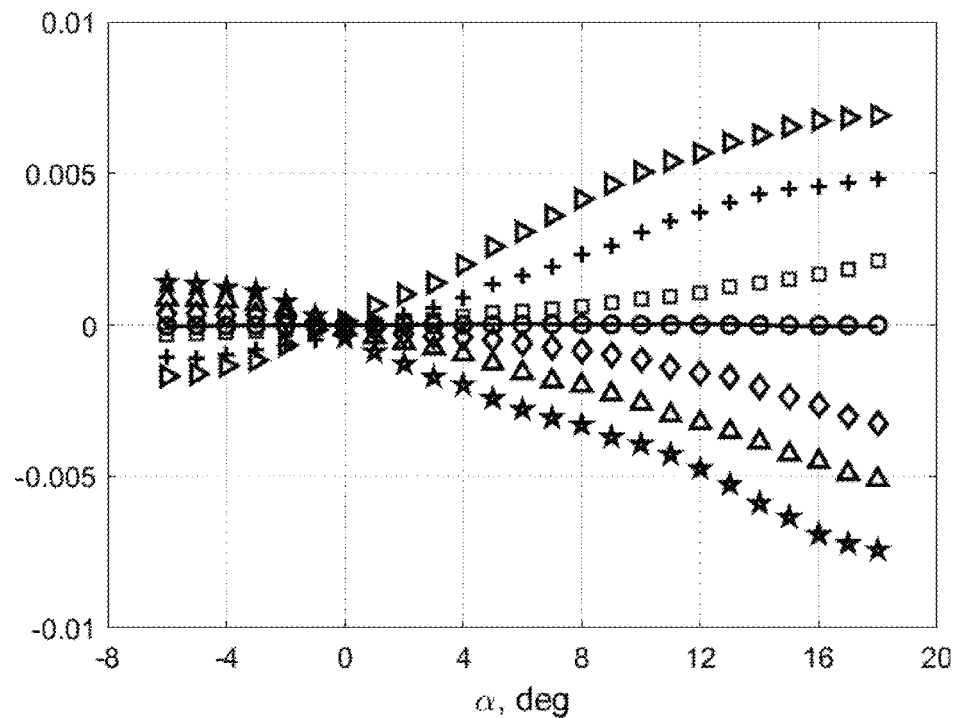
FIG. 15A-FIG. 15F are graphs showing the effects of changing twist angle on the lateral static forces and moments, $Re_n=3.85\times10^5$.
Figure 15B:
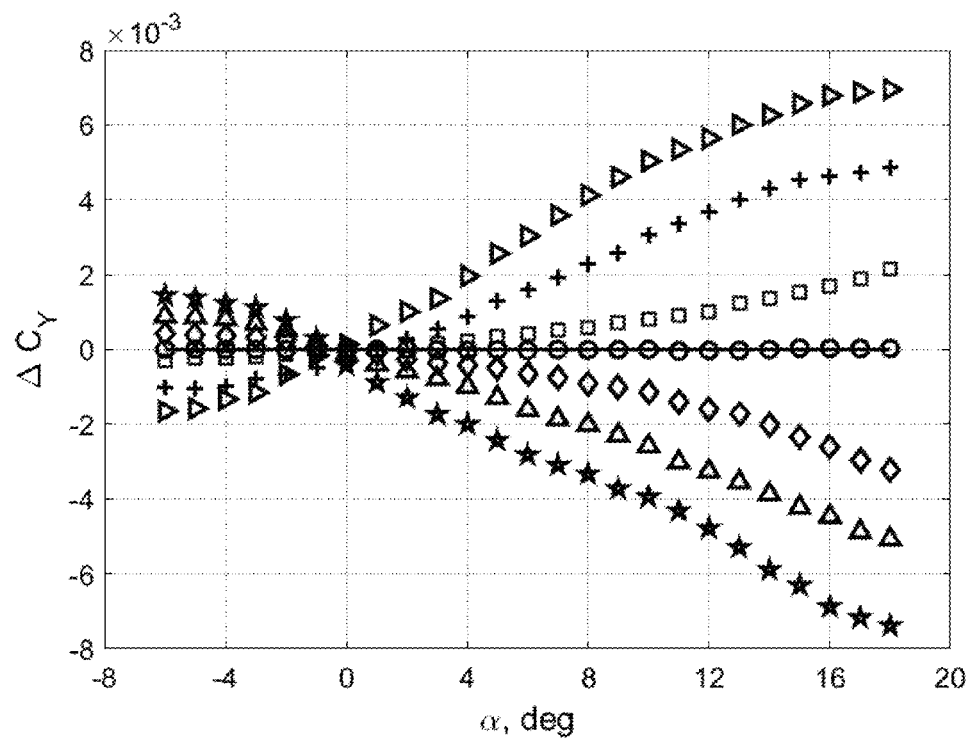

For side force coefficients, there is a linear trend with an augmented side force coefficient with varying angle of attack and twist angle to a maximum (both positive and negative side FIG. 15A and FIG. 15B). As would be expected, no side force was seen at $\phi$=0° or for the full span wing model (FIG. 15B) in all ranges of angles of attack. As twist increased, the side force increased and augmented with further increase in angle of attack ($C_Y$=−0.0072 and $C_Y$=0.0068 for $\phi$=6° and $\phi$=−6° respectively at $\alpha$=16°). Furthermore, due to the unsteady vortex bursting phenomenon, after $\alpha$=16° the results started becoming more stable, and began to reduce at $\phi$=−6°. The vortex bursting phenomenon is discussed in CEBECI, "Numerical and Physical Aspects of Aerodynamic Flows IV", Springer-Verlag-Berlin Heidelberg GmbH, (1990). As corresponding twist angles of $\phi$=4° and $\phi$=−4°, clear reduction was observed compared to $\phi$=±6°, with 42% and 35% respectively at $\alpha$=18°.

Figure 15C:
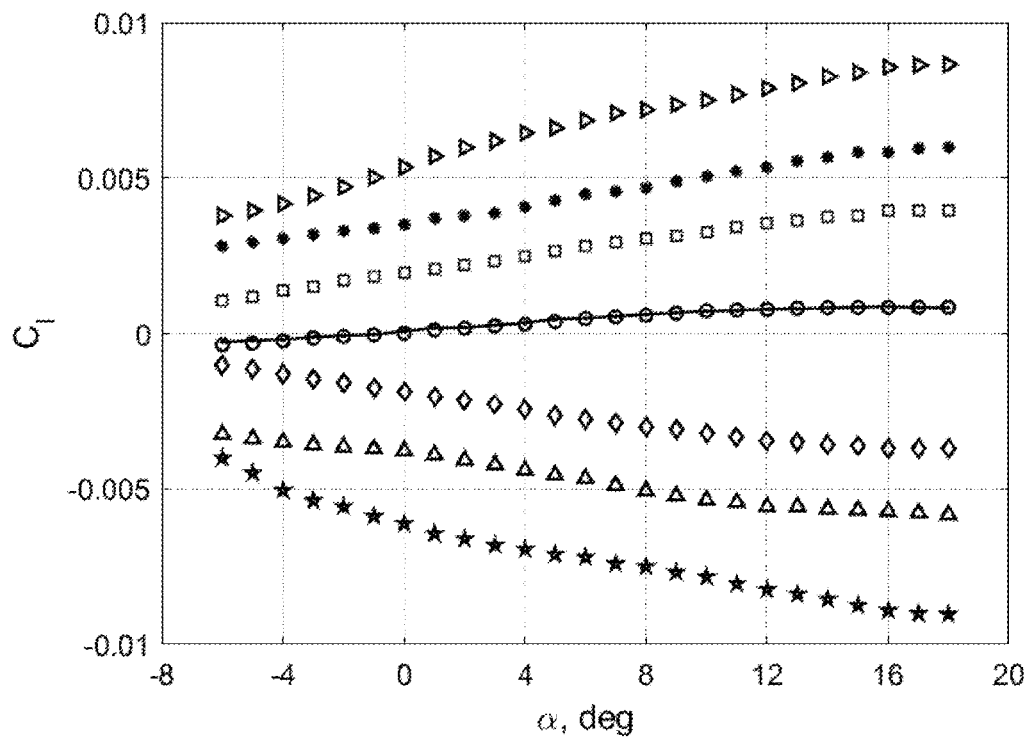
Figure 15D:
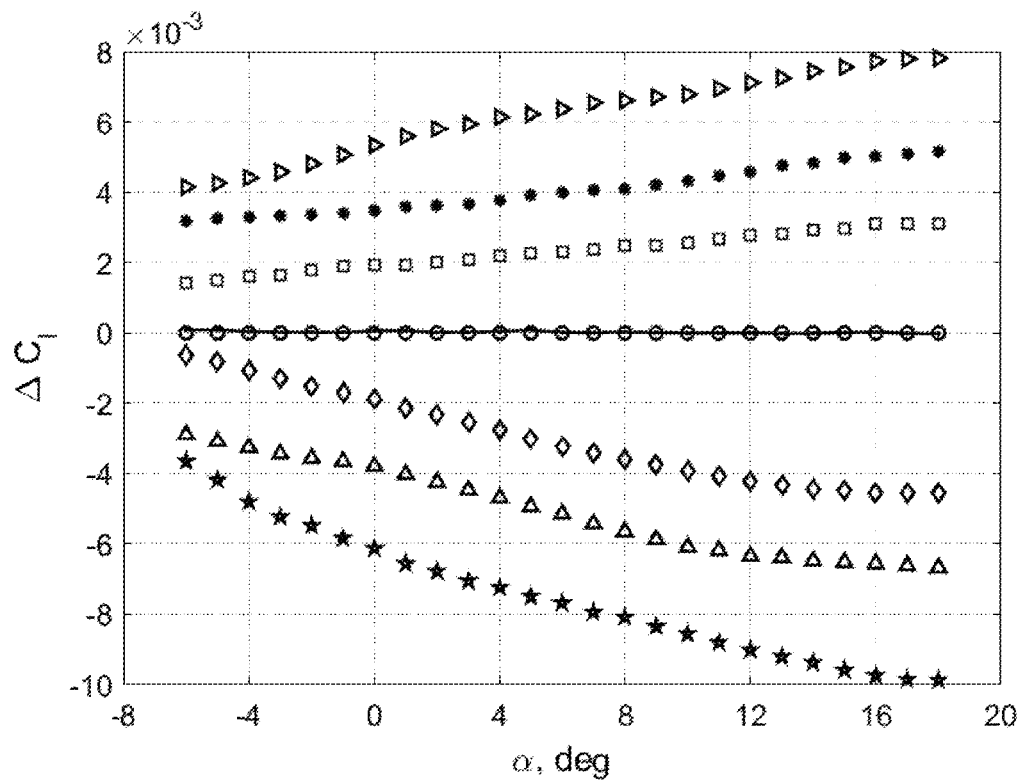

The influence of twist on the rolling moment coefficient for both positive and negative twist is presented in FIG. 15C and FIG. 15D. Prandtl's classical lifting-line theory and the Fourier coefficients have previously shown that increases in wing twist away from the planar configuration can provide substantial roll authority suitable for aircraft roll control in PHILLIPS et al., "Lifting-Line Analysis of Roll Control and Variable Twist," J. of Aircraft, 41 (2004); KHOT et al., "Flexible Composite Wing with Internal Actuation for Roll Maneuver", J. of Aircraft, 39, (2002); and KHOT et al., "Optimization of Flexible Wing Without Ailerons for Rolling Maneuver", J. of Aircraft 37 (2000).

As can be seen from FIG. 15C and FIG. 15D, rolling moments achieved through increasing twist angle to ±6° were maximum at $\Delta C_l$=0.0079 and $\Delta C_l$=−0.0099 ($\alpha$=18°) for $\phi$=−6° and $\phi$=6° respectively. As would be expected, negative roll moments were achieved for $\phi$>0° due to increased lift force over the morphing element that tends to roll aircraft left. At $\phi$=−4° and $\phi$=+4°, maximum roll coefficients of $\Delta C_l$=0.0057 (30% less than $\phi$=−6°) and $\Delta C_l$=−0.0066 (34.4% less than $\phi$=−6°) at $\alpha$=18° respectively were found and reducing to $\Delta C_l=0.0035$ and $\Delta C_l=-0.0045$ for $\phi=-2°$ and $\phi=+2°$ respectively.

Figure 15E:
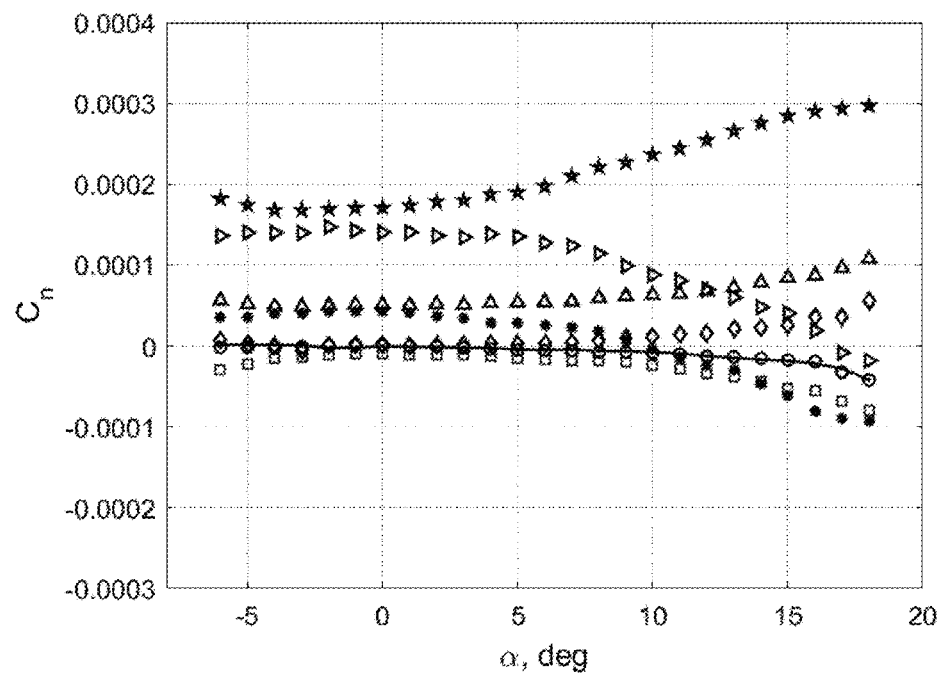
Figure 15F:
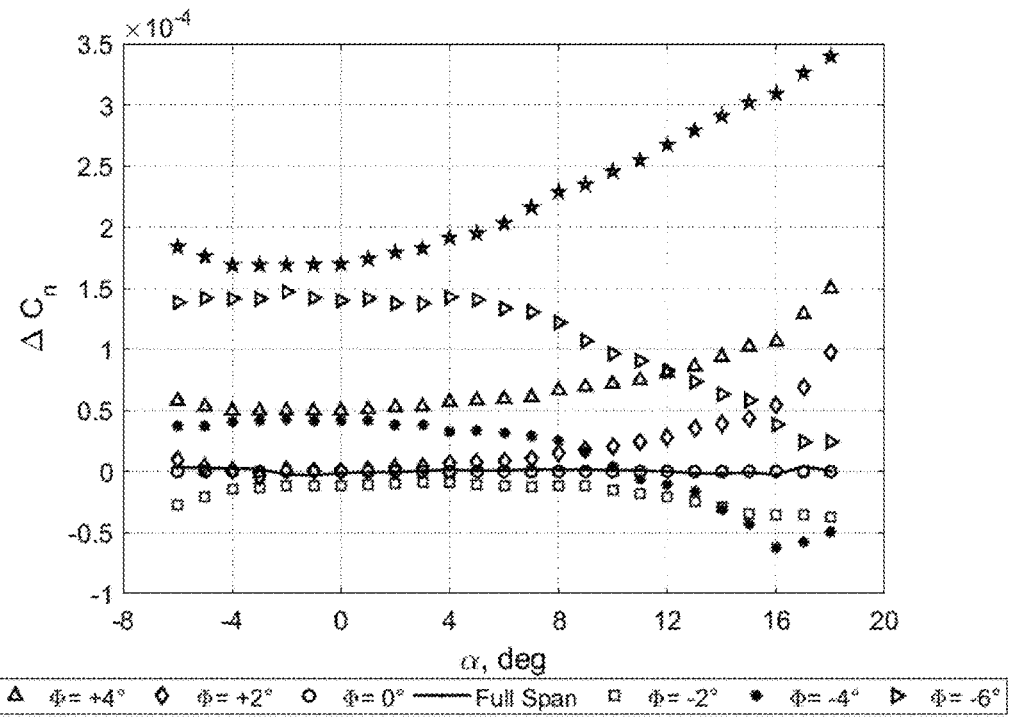

The yaw moment coefficient with different twist cases versus angle of attack is presented in FIG. 15E and FIG. 15F. The general trend shows positive yawing moments exist for $\phi=-2°$ and $\phi=-4°$, at $\alpha>15°$. When $-2°\leq\phi\geq2°$, the results suggest a limited effects on $C_n$ with a maximum $\Delta C_n=1\times10^{-4}$ at $\phi=+2°$. Increasing twist angles to a maximum, $C_n$ was found to be more effective with a maximum $\Delta C_n=1.4\times10^{-4}$ and $\Delta C_n=3.4\times10^{-4}$ for $\phi=6°$ and $\phi=-6°$ respectively. As can also be seen yaw moments seem to be insensitive to changing angle of attack ($-6°<\alpha<12°$) in all twist cases presented. This situation does change as further aerodynamic loading increases on wing the model and the results become more pronounced for $\alpha>12°$. This would be expected as increased wing drag level becomes more substantial after $\alpha=12°$ as seen in FIG. 14C.

Influence of Reynold Number on Aerodynamic Response of Wing Twist

Figure 16A:
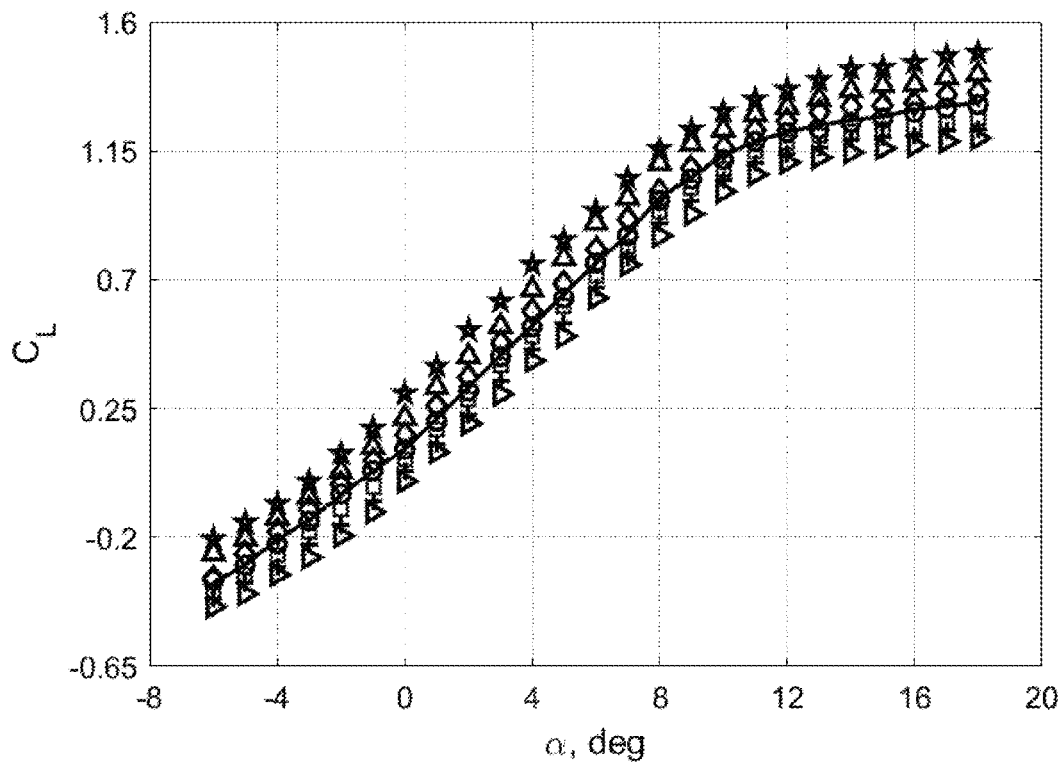
FIG. 16A-FIG. 16F are graphs showing the effects of changing twist angle on the longitudinal static forces and moments, $Re_n=5.14\times10^5$.
Figure 16B:
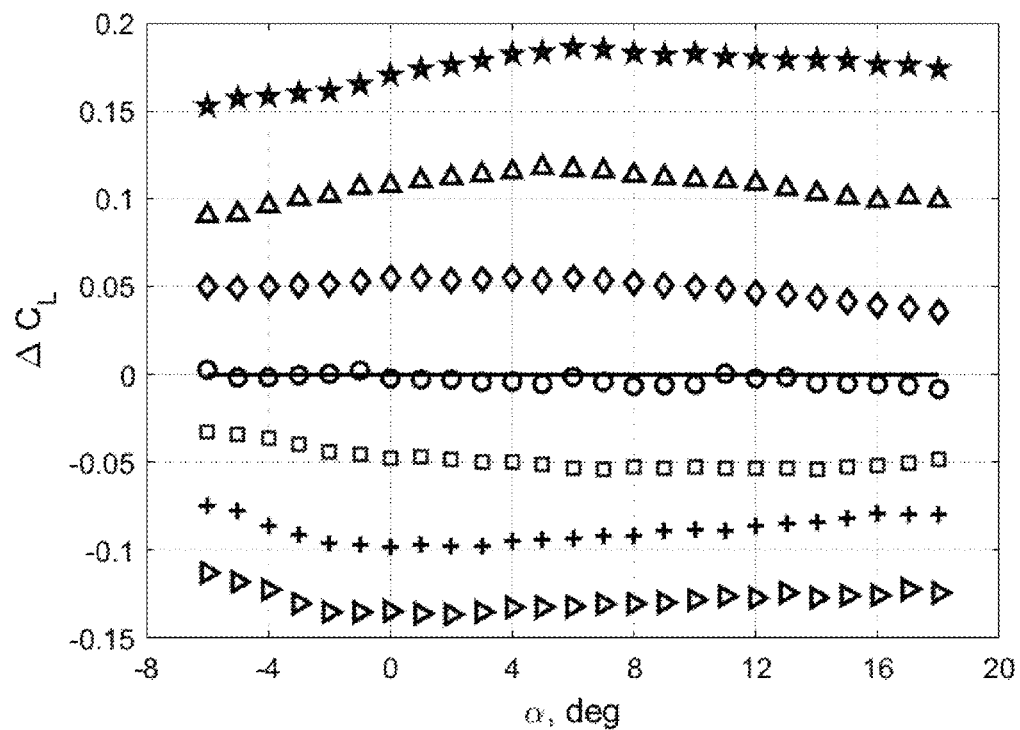

With the decision to introduce no artificial boundary layer tripping to the model, a study of the influence of the Reynolds number on the static force and moment characteristics was conducted to investigate changes in the results in this transitional flow regime. FIG. 16A-FIG. 17F illustrate the results for twist at $Re_n=5.14\times10^5$. It can be clearly seen that the basic aerodynamic trends were observed to be the same as seen for $Re_n=3.85\times10^5$. For $C_L$, the twist cases ($\phi>0°$) presented do provide effective lift production compared to $\phi<0°$. This would be expected as increased angle of twist at the wing-tip tends to increase the lift force. Comparing this lift production with $Re_n=3.85\times10^5$, the results seem to be slightly increased approximately $\Delta C_L(max)=0.04$ (2.75%) for $\phi=6°$ at $\alpha=18°$ (FIG. 16A and FIG. 16B). This highlights that the increased Reynolds number provides additional lift force, as reducing the twist angle to $-6°$, similar to $\phi=6°$, the influence of $Re_n$ has a very minor influence on the lift coefficient results. As would be expected, the magnitude of lift coefficient is reduced and compared to $Re_n=3.85\times10^5$, $\Delta C_L(max)=0.05$ (3%) is obtained for $\phi=-6°$ favouring $Re_n=5.14\times10^5$. In addition, the lift coefficient of a full span wing model is also presented and it can be seen that there is good agreement between full span wing and zero twisted wing modelling. This indicates that the twist mechanism works as normal as a full span wing.

Figure 16C:
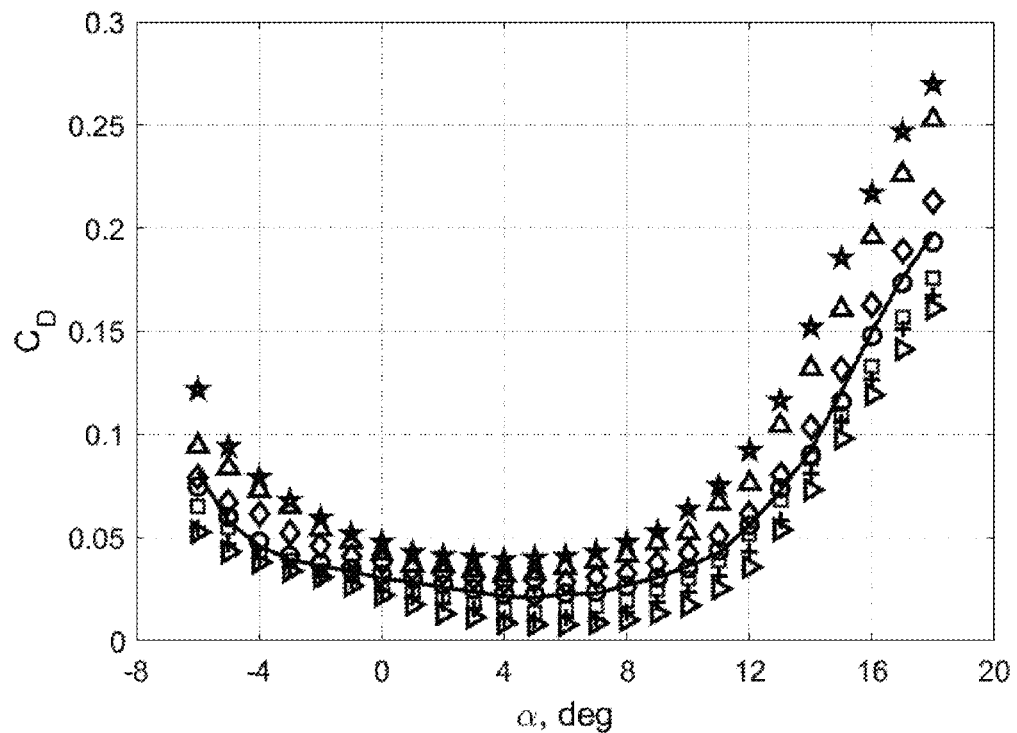

Similar to $C_L$, there is a reasonably coherent influence of Reynolds number with general magnitudes increasing with increasing $Re_n$. It can be seen from FIG. 16C that significant drag increase was obtained when $\alpha=18°$ due to increased sensitivity to the onset flow separation on the wing structure after $\alpha=12°$. This increase is further exacerbated by increasing $Re_n$ ($\Delta C_D=0.025$ compared to $Re_n=3.85\times10^5$) for $\phi=6°$ at $\alpha=18°$ as shown in FIG. 16C. Changing the incidence angle of a wing has the similar trend as seen for $Re_n=3.85\times10^5$. The overall coefficient magnitudes were reduced with reduced angle of attack. In saying this however, there exists subtle characteristics within the results that indicate a small degree of reduction particularly for $0°<\alpha>5°$.

Figure 16D:
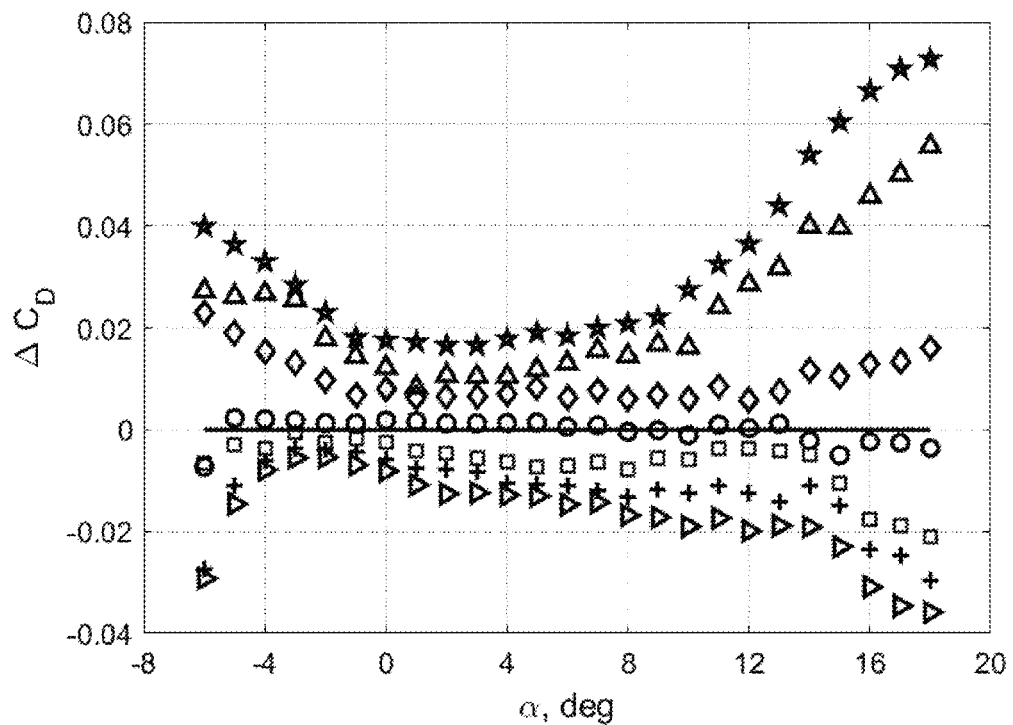

Similar circumstances are discussed for $Re_n=3.85\times10^5$, here for $Re_n=5.14\times10^5$, considering the results for $\phi<0°$ as shown in FIG. 16D, there seems to be much less of a variation in change in drag coefficient when compared to the $\phi>0°$ configurations, with the influence of the twist angle being much less pronounced than that found for $\phi>0°$. One possible reason for this may lay in the increased effectiveness of negative twist angles at producing less overall lift (and therefore less lift-dependent drag) as well the ability of negatively-twisted morphing configurations to maintain lower effective angles of attack relative to the freestream flow. Furthermore, the full span wing drag coefficient results are also illustrated and it is clearly seen that the twist mechanism does not have any detrimental effect on the aerodynamic performance of the plane.

Figure 16E:
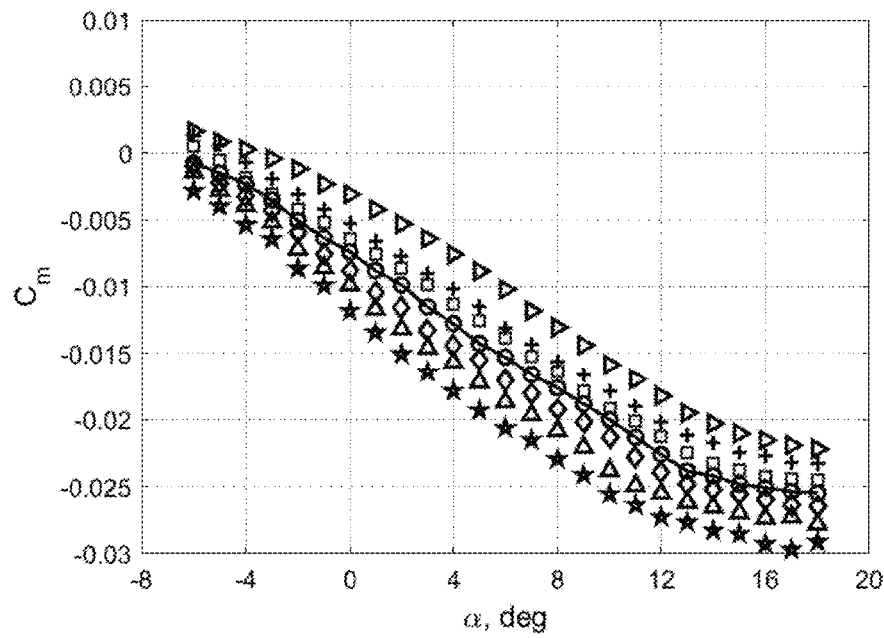
Figure 16F:
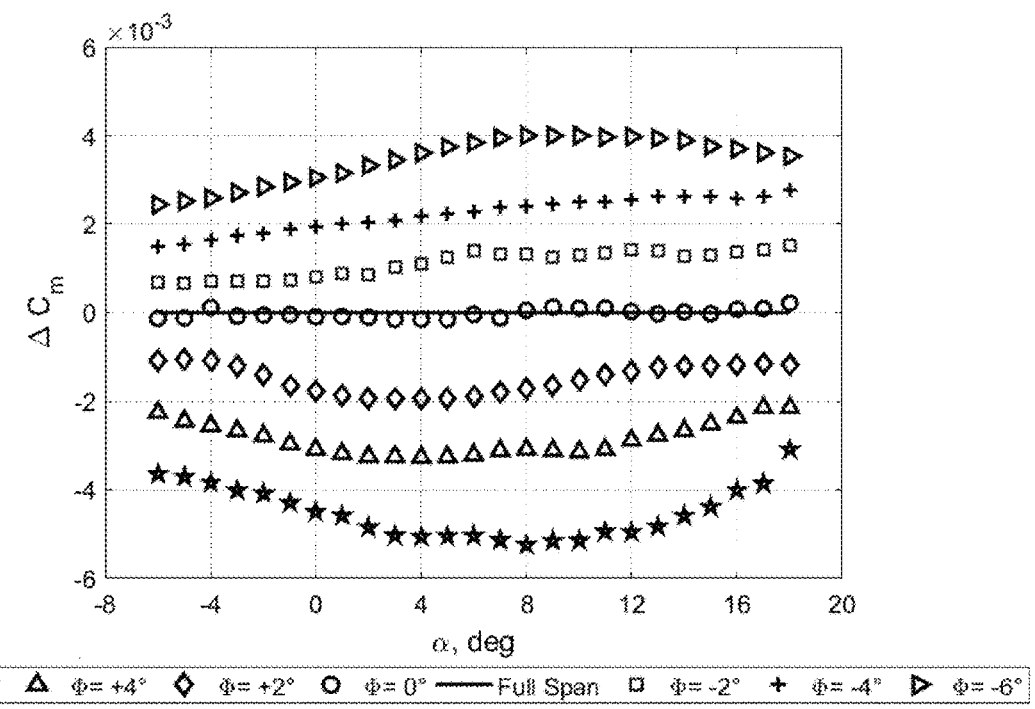

FIGS. 16E and 16F highlight the results for $C_m$ versus angle of attack. As shown, as the twist angle increases from $-6°$ to $6°$, the effective pitching moment coefficient reduces, as with the similar trend seen in FIG. 16E. Comparing FIG. 16E with FIG. 14E, results for $C_m$ indicate that higher $Re_n$ produces lower magnitudes of pitching moment coefficient.

For $C_Y$, the influence of $Re_n$ is the increased effectiveness to produce side force as clear deviation is seen in $C_l$ as well. It can be seen from FIGS. 17A and 17B that negative and the positive twist configurations have completely opposite effects on the aerodynamic. This would be expected as increased lift force on positive twist configurations tends to have negative side effects, and positive side effects for $\phi<0°$. The trend between the small angles of twist ($\phi>0°$) and the larger twist is increased as the angle of twist increases and when negative twisted morphing configurations are considered, similar to $\phi>0°$, the side effects are a little increased, but in a negative direction. Comparing this feature with the low Reynolds number, similar results were obtained. Although similar trends were obtained, in most cases as would be expected there is a slightly augmentation in terms of side force. As far as $\phi=6°$ is considered there is a $\Delta C_Y=0.001$ between $Re_n=3.85\times10^5$ and $Re_n=5.18\times10^5$ and this rate is further amplified to $\Delta C_Y=0.0020$ at $\phi=-6°$ (due to asymmetrical airfoil shape, negative and positive side twist performs differently). Reducing the twist angle to $2°$ and $-2°$, the magnitudes are also reduced to $\Delta C_Y=7\times10^{-4}$ and $\Delta C_Y=5\times10^{-4}$ respectively.

Figure 17A:
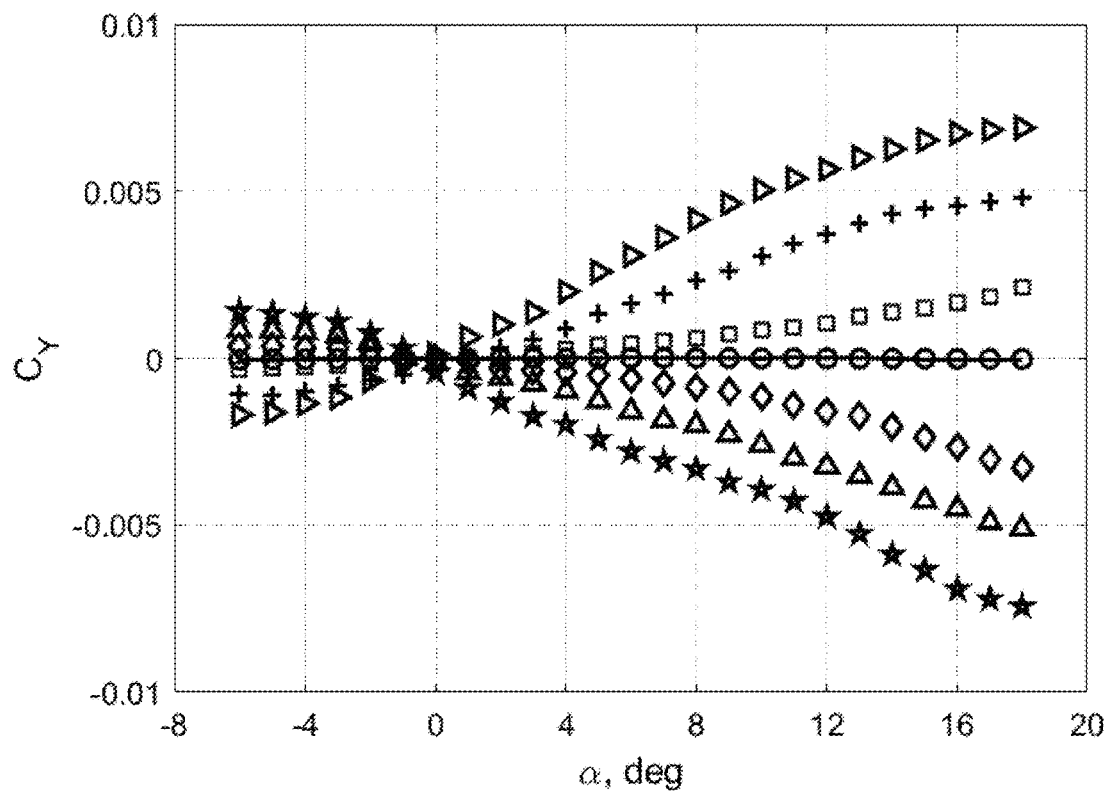
FIG. 17A-FIG. 17F are graphs showing the effects of changing twist angle on the lateral static forces and moments, $Re_n=5.14\times10^5$.
Figure 17B:
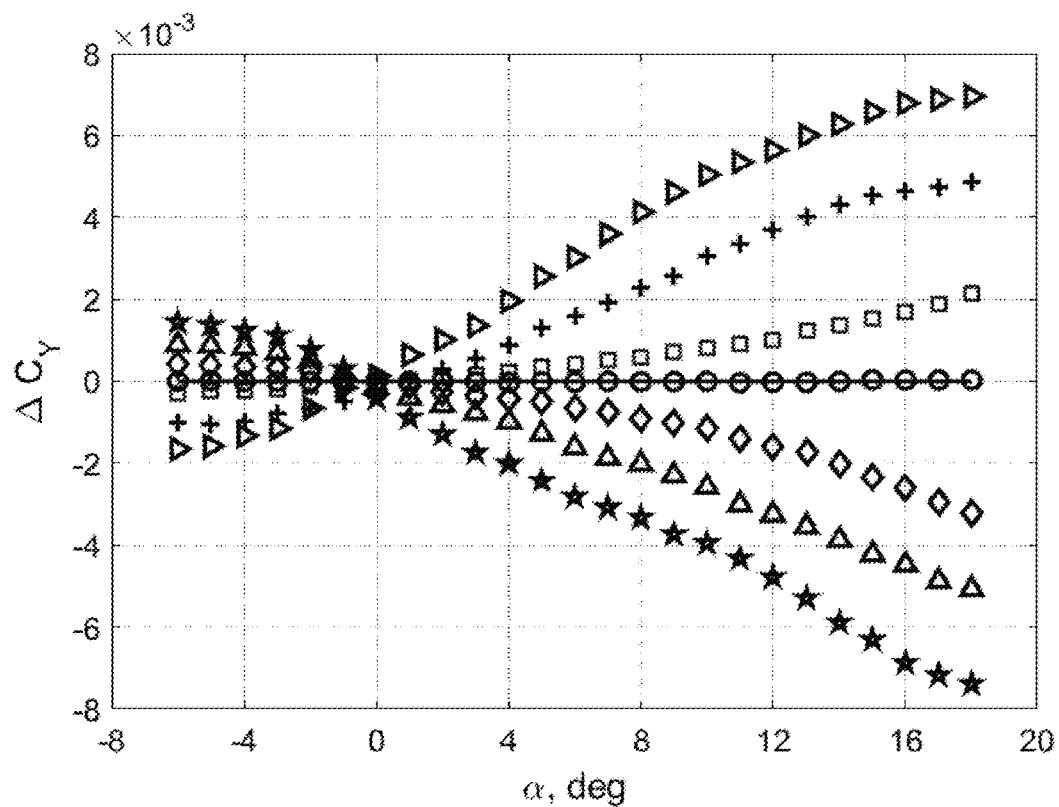
Figure 17C:
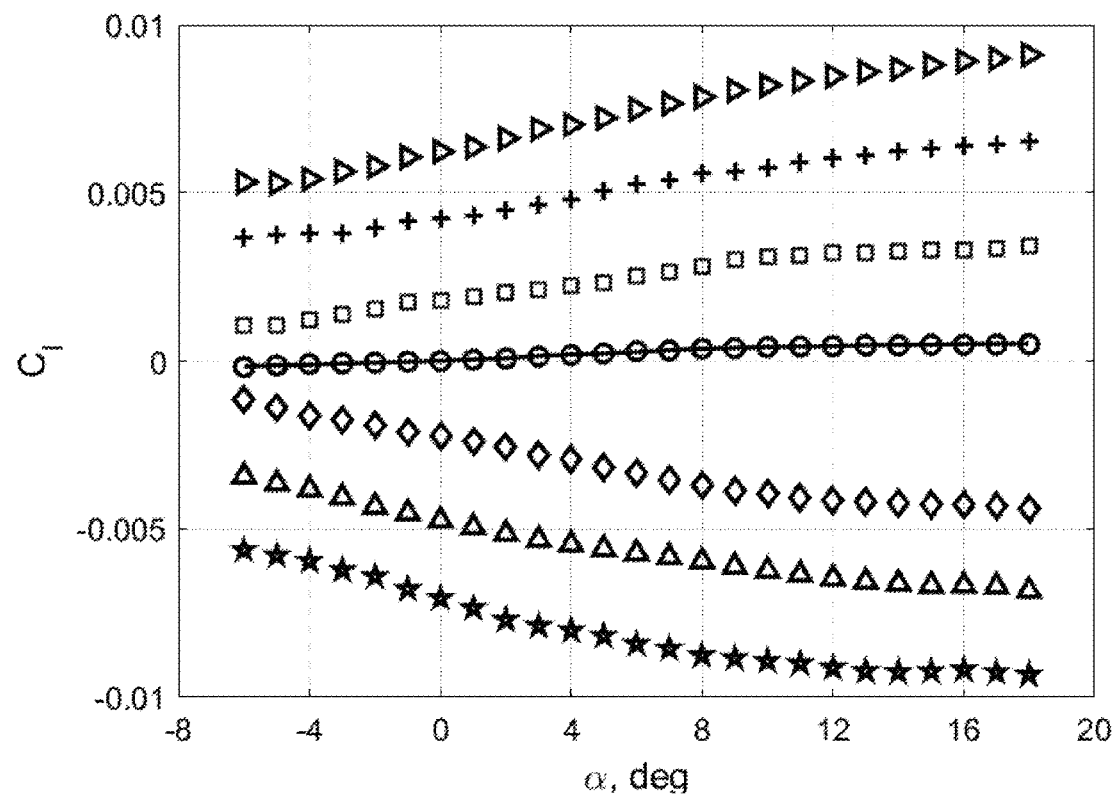
Figure 17D:
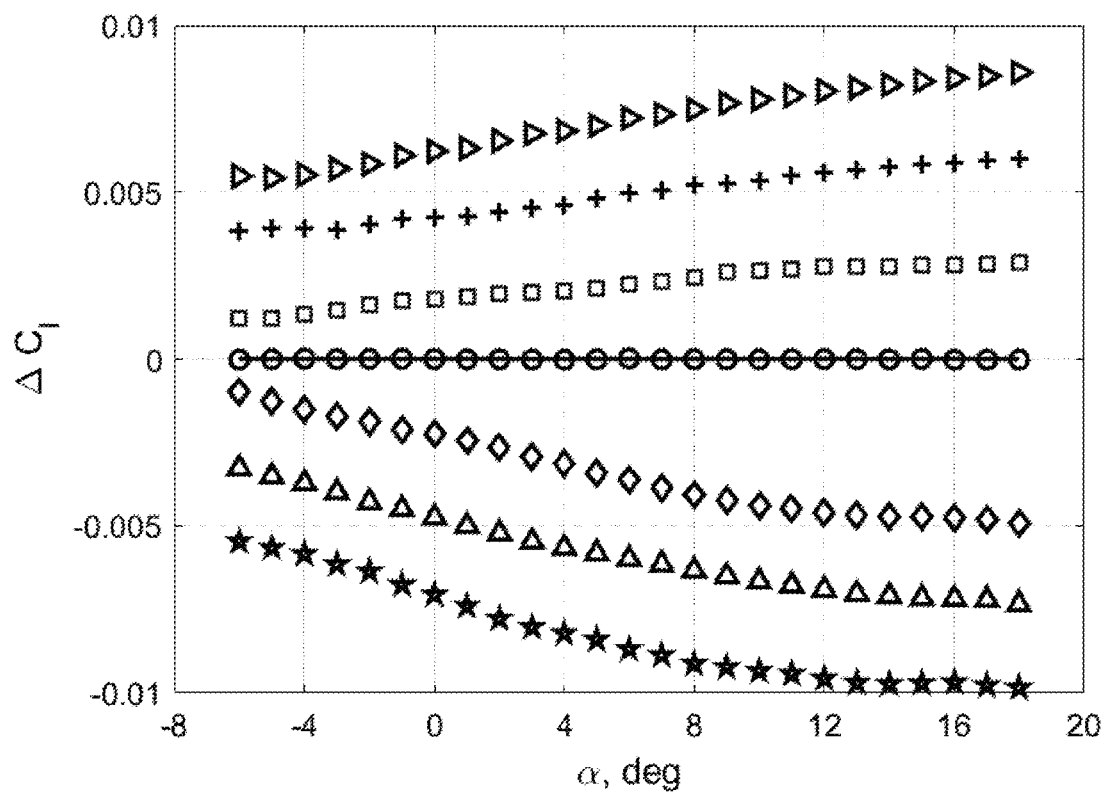

FIG. 17C illustrated $C_l$ results for different angles of twist versus angle of attack at $Re_n=5.18\times10^5$. It can be clearly seen that negative roll moments were achieved at $\phi>0°$ as increased lift force over the morphing elements that tends to roll aircraft left. In contrast, a positive roll moment is produced in $\phi<0°$ that is the wing will roll in the right direction. Moreover, as expected, the results for $\Delta C_l$ show an almost symmetrical deviation with variation in twist angle due to the inherent connection between $\Delta C_L$ and $\Delta C_l$. In general, the roll moment coefficient was slightly increased with the increased Reynolds number and maximum $\Delta C_l$ was found to be 0.001 and 0.0004 for $\phi=6°$ and $\phi=-6°$ respectively.

Figure 17E:
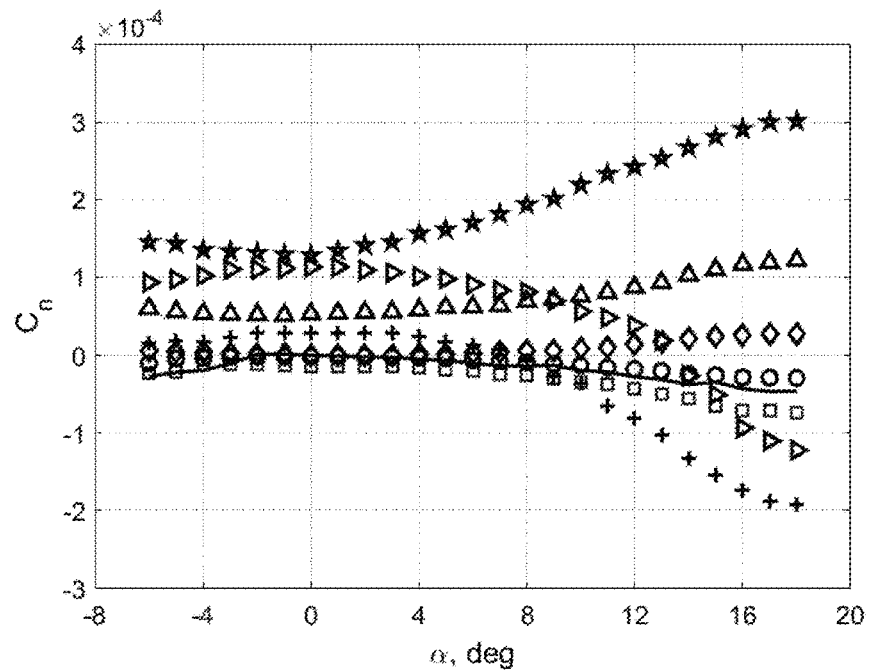
Figure 17F:
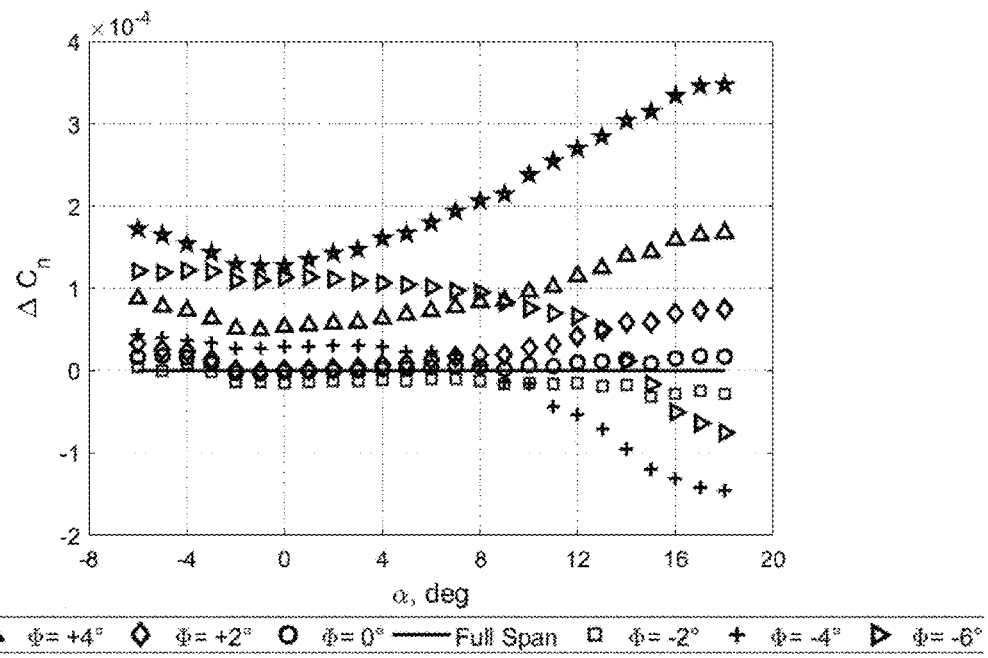

For $C_n$, results show a similar trend as discussed for lift, pitching moment, and rolling moment coefficients for $\alpha<12°$ (FIG. 17E). However, after this angle of attack, the yawing moment coefficient is seen to increase markedly as the dependence on increasing wing drag levels becomes more and more significant. Comparing this to $Re_n=3.85\times10^5$, the yawing moment coefficients showing almost steady performance with $\Delta C_n=6.3\times10^{-6}$ at $\phi=-6°$.

Comparison Between Standard Aileron and Morphing Concept

FIG. 18A-18F compares between the standard aileron model and morphing concept. These results were performed at a $Re_n=5.14\times10^5$. The aileron angles were $-30°$ to $30°$ in steps of $10°$ with the twist angle of the morphing concept, varied from $-6°$ to $6°$ in steps of $2°$. The lift coefficient results are presented in FIG. 18A. It can be seen that deflecting aileron angle to $\gamma>0°$ resulting in an increase in lift at a given angle of attack. Maximum lift coefficient, up until $\gamma=30°$, where only a small lift increment is seen over $\gamma=20°$ (7.6% at $\alpha=9°$). Comparing these aileron models with twist configurations, the morphing concept shows very similar lift results (the differences between the $\phi=6°$ and $\gamma=30°$ configuration of $\Delta C_L=0.03$ (2%) at $\alpha=9°$). At lower deflection magnitudes, a small reduction in the lift curve slope was measured with the $\gamma=20°$ and $\gamma=10°$ configurations, almost equivalent in performance to the $\phi=4°$ and $\phi=2°$ respectively.

For negative angles, the lift becomes lower for reducing angle to $\gamma=-30°$ and $\phi=-6°$. This would be expected as reducing the effective incidence angle of the surface to decrease the lift force. Contrary to positive angles, variation between the negative twisted morphing concept and aileron configurations are slightly less and twisted concept was found to produce more lift than aileron deflections with $\Delta C_L=0.03$ (4.5%) at $\phi=-6°(\alpha=9°)$ compare to $\gamma=-30°$. Reducing the angle of twist and aileron deflection angle, similar characteristics were seen with $\Delta C_L$ is 0.05 (5%) and 0.01 (1%) for $\phi=-4°$ and $\phi=-2°$ respectively compare to $\gamma=-20°$ and $\gamma=-10°$.

For drag coefficient, there is a clear difference between the aileron and morphing concept model at large deflection angles. For the twisted morphing configuration at $\phi=6°$, same the highest drag coefficients were measured only to be supposed by the aileron configuration at $\gamma=30°$. It can also be seen from FIG. 18B that the minimum drag coefficient is higher for the aileron configuration (23.9%) compared to the morphing concept (compare to $\phi=6°$ with $\Delta C_D=0.055$ at $\alpha=18°$). These differences exist at lower angles, but reduce in magnitude. For $\gamma=20°$, the drag coefficient results are still larger (15.4% and 24% high drag production compare to $\phi=6°$ and $\phi=4°$ respectively). This trend was continued for $\gamma=10°$ with 14% drag increase over $\phi=2°$. These would be expected due to the aileron configuration generating significant flow separation.

Figure 18A:
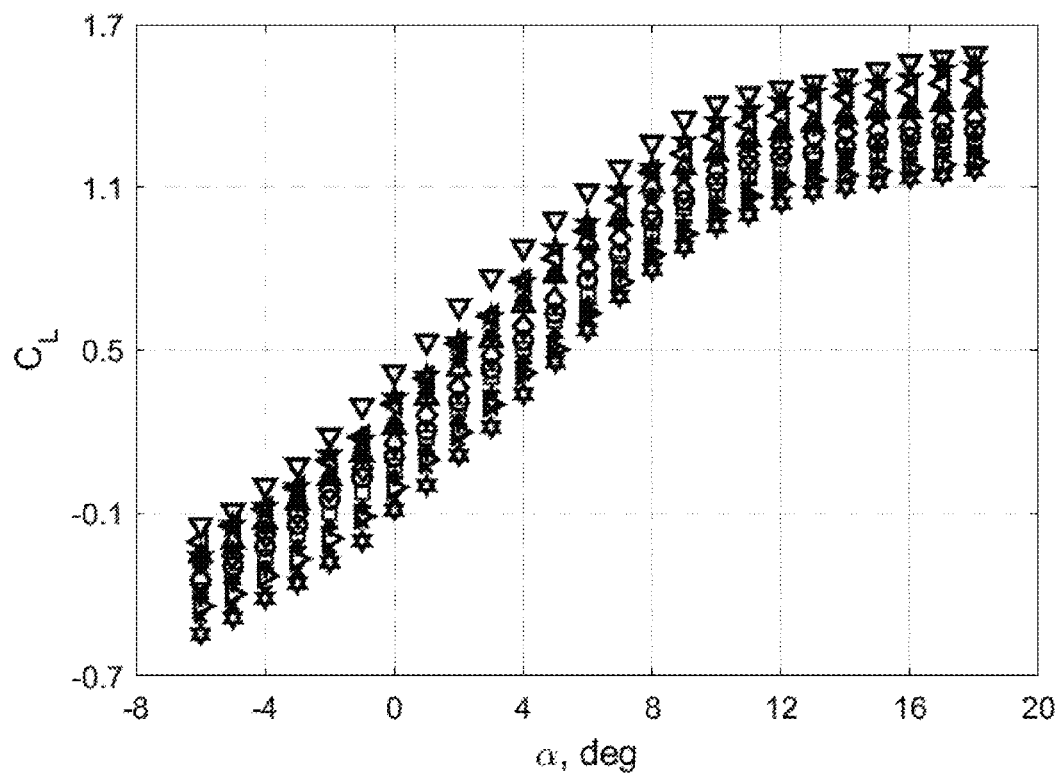
FIG. 18A-FIG. 18F are graphs showing a comparison between plain aileron and twist configuration: (a) $C_L$, (b) $C_D$, (c) $C_Y$, (d) $C_l$, (e) $C_m$, and (f) $C_n$
Figure 18B:
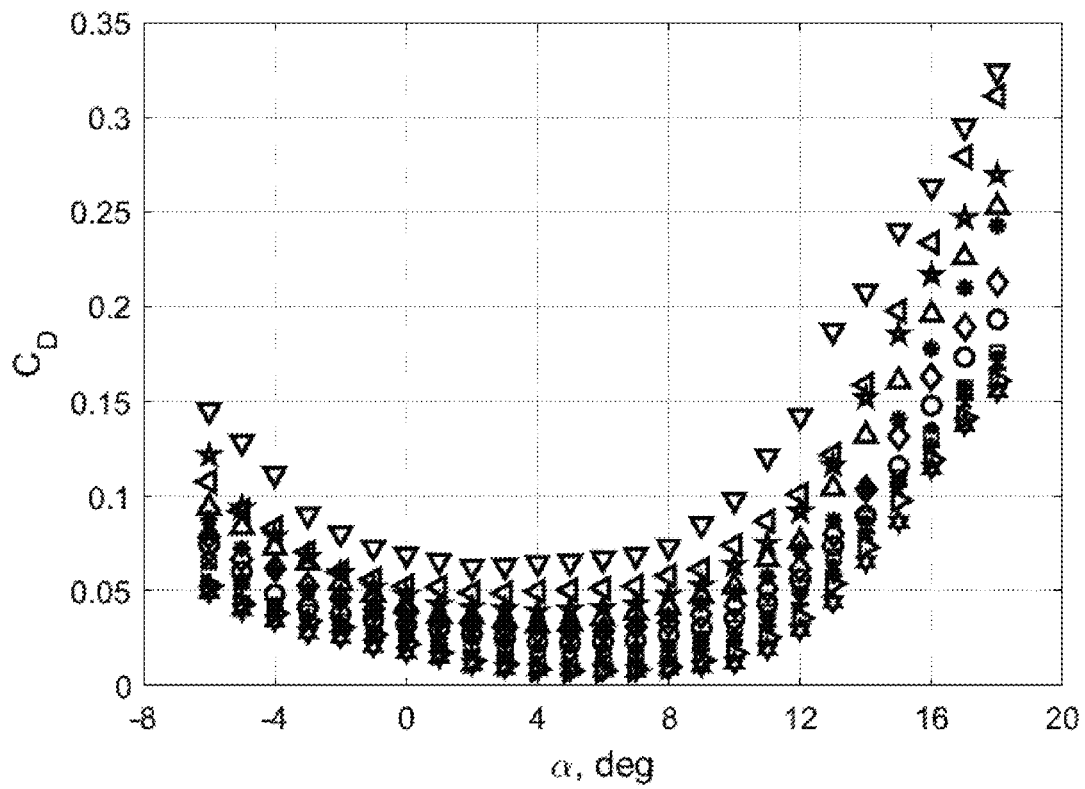
Figure 18C:
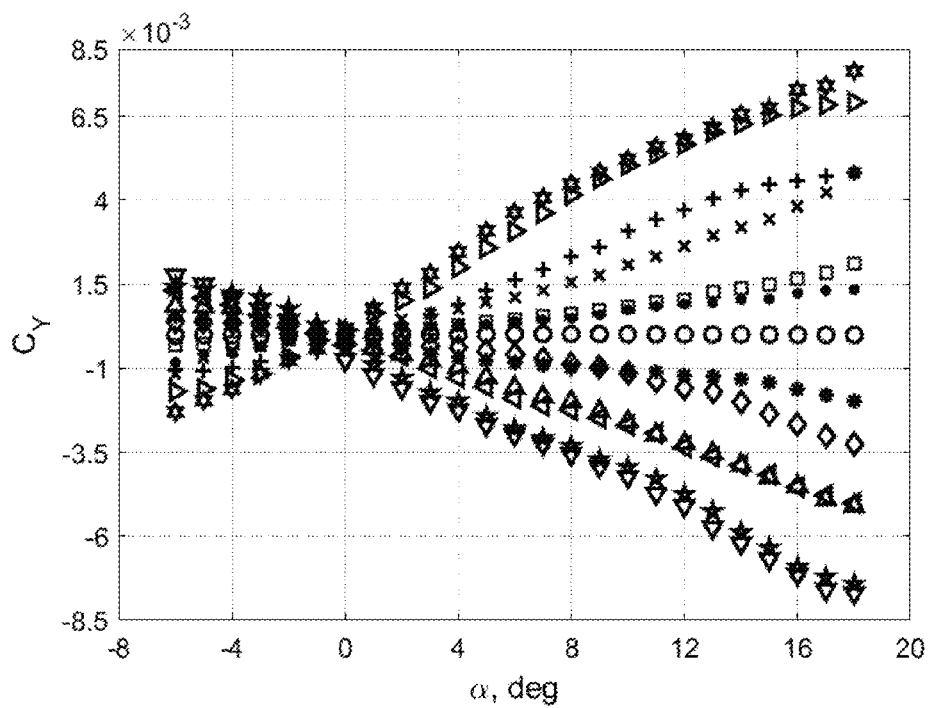

Considering the results for $\gamma<0°$ and $\phi<0°$ as shown in FIG. 18B, overall, there appears to be less of a variation in change in drag coefficient for comparable angles of attack comparing to the $\gamma>0°$ and $\phi>0°$ configurations. One possible reason for this may lay in the increased effectiveness of both negative twist and negative aileron configurations at producing less overall lift (and therefore less lift-dependent drag) as well the ability of negatively-twisted morphing configurations to maintain lower effective angles of attack relative to the freestream flow. When comparing the aileron configuration with the negative twist configuration, 3.5% higher drag was found to exist for $\gamma=-30°$ over $\phi=-6°$ at $\alpha=18°$. This trend can be seen for $\gamma=-20°$ with 2.79% drag increase over $\phi=-4°$, and 1.15% for $\gamma=-10°$ compare to $\phi=-2°$. These results indicate that twist configuration produce less drag in all over aileron deflection angle, which tend to increase the flight envelope.

Figure 18D:
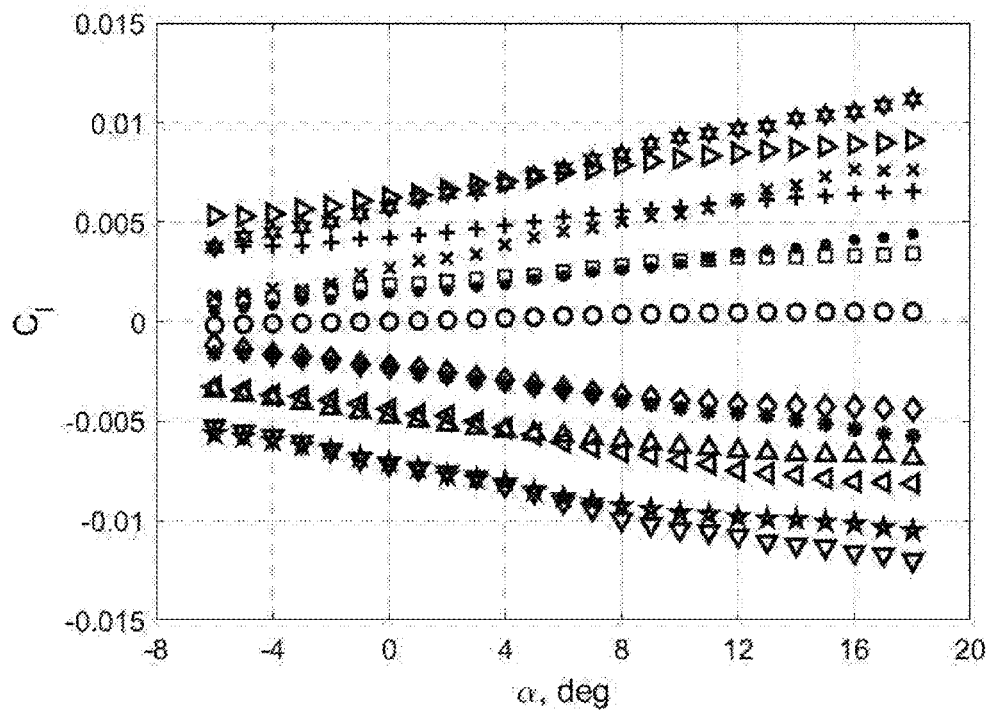
Figure 18E:
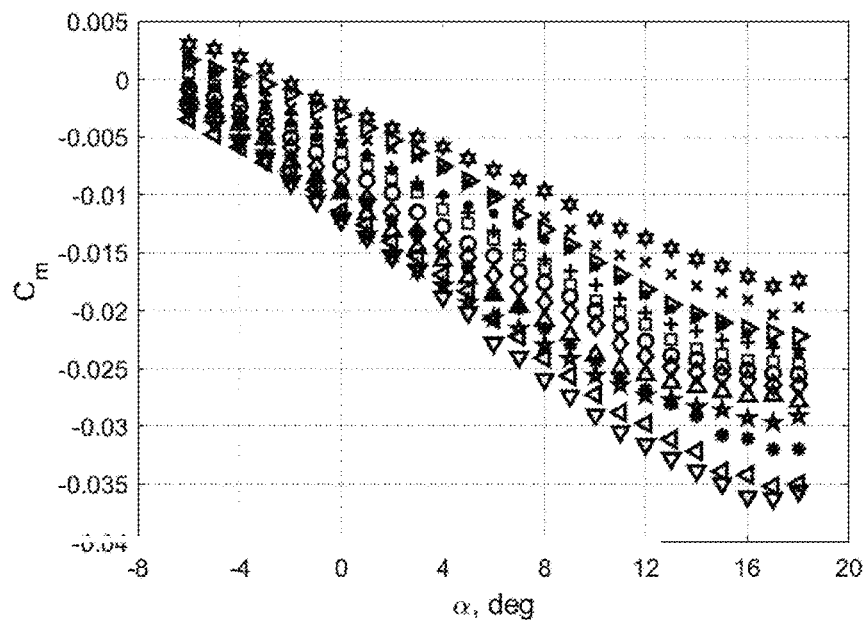
Figure 18F:
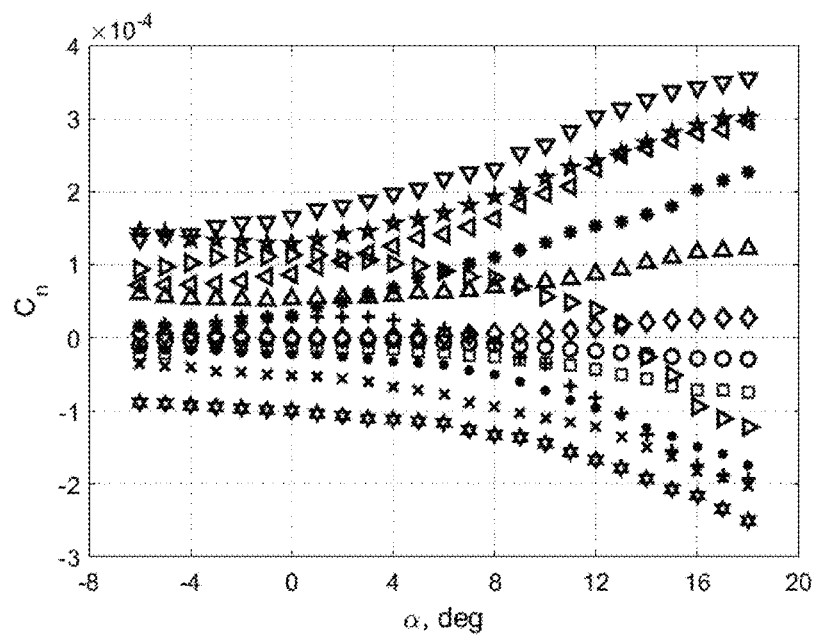

FIG. 18E highlights the influence of changing twist and aileron angle on the pitching moment coefficient. Increased negative pitching moment is the predominant result for all cases presented. Comparing these aileron angles with twist cases, the results for the aileron configuration had similar performance as that seen for twist cases between $-6°\leq\alpha\geq0°$. This situation does change as aerodynamic loading increases with the reduction in $C_m$ with deflection either in twist or aileron deflection angle, becoming more pronounced for $\alpha>0°$. When comparing directly the pitching moment coefficient between these two configurations, maximum $\Delta C_m$ between $\gamma=30°$ and $\phi=6°$, and $\gamma=-30°$ and $\phi=-6°$ were found to be 0.0064 and 0.0048 respectively, introducing that aileron deflection is more effective at pitching moment production.

For the side force coefficient, a similar trend was observed for both the aileron and morphing configurations with possible exception of $\phi=2°$ and $\phi=-4°$. It can be seen from FIG. 18C, when the aileron configuration is deflected to $\gamma=30°$, negative side force is obtained with a magnitude much larger than when the deflection angle is reduced to $10°$. Contrary to the morphing configuration, at $\gamma=30°$, $\Delta C_Y=0.0003$ (3.5%) compare to $\phi=6°$, this rate is less pronounced between $\phi=4°$ and $\gamma=20°$, where $\Delta C_Y$ was found to be 0.001 (2.2%) and seen to favour movement to $\phi=4°$ (which indicated $\phi=4°$ produce more side force than $\gamma=20°$). When negative angles are considered for $\phi=-4°$ and $\gamma=-20°$, the results seem to be shifted to the aileron configuration ($\gamma=20°$ produced more side force than $\phi=4°$). Moreover, the variations between these angles are minimal with $\Delta C_Y=0.0001$ (0.1%).

FIG. 18D illustrates the roll coefficient results for the various twist and aileron configurations. As is shown in all of these trends, roll authority is significant with both aileron and twist changes. This would be expected due to increases in the lift distribution increases roll moment. Comparing the twist with aileron configurations directly, very similar trends were observed. It can be seen that the aileron at $\gamma=30°$ produces a similar roll coefficient with $\phi=6°$. For these cases ($\gamma=30°$), the produced roll moment appears to be slightly more than $\phi=+6°$ (maximum $\Delta C_l$ is 0.0004 (4.6%) at $\alpha=18°$). When reducing the angle of aileron deflection to $20°$, the roll coefficient performed similar to results for $\phi=4°$, although at higher angles of attack there is a large moment generated from the aileron configuration than for the morphing configuration ($\Delta C_l=0.0015$). For negative deflection ranges, similar trends as discussed for positive deflection seem to be exist. The difference between the $\gamma=-30°$ and $\phi=-6°$ shows an advantage of $\Delta C_l=0.002$. For morphing concept $\phi>6°$ with this advantage decreasing with further in negative angles of aileron deflection ($\gamma=-20°$ and $\gamma=-10°$) and twist ($\phi=-4°$ and $\phi=-2°$) ($\Delta C_l=0.0011$ and $\Delta C_l=0.0009$ respectively). In general, in both cases presented here, roll authority was achieved and compared well to both aileron and twist morphing configurations. The similar roll moments obtained implies that the morphing concept can replace a traditional aileron with less drag penalty.

Comparing $C_n$ results between the ailerons and morphing configurations, there appears to be much more variation compared to the other aerodynamic coefficients already discussed. It can be seen from FIG. 18F that, for some cases presented linearly increasing yawing moments were found to exist up to $\alpha\approx12°$. For $\alpha>12°$, the yawing moment coefficient is seen to deviate markedly in both cases as the dependence on increasing wing drag and propensity for stall becomes more and more significant. For positive aileron configuration, positive yawing exists with comparisons between $\gamma=30°$ and $\phi=6°$, show results higher by $\Delta C_n=5\times10^{-5}$ (14%). The deviation was found to increase with decreasing aileron deflection angle at $\gamma=20°$. Similar to $\gamma=30°$ here, the results show the same trend seen for $\gamma=30°$, however comparing the results with $\phi=4°$, the $\Delta C_n$ variation increased further to $1.75\times10^{-4}$ (more than 80% less performance compare to $\gamma=20°$). For negative deflection, results for morphing configurations are more promising with 15% differences at between $\gamma=20°$ and $\phi=4°$.

Figure 19:
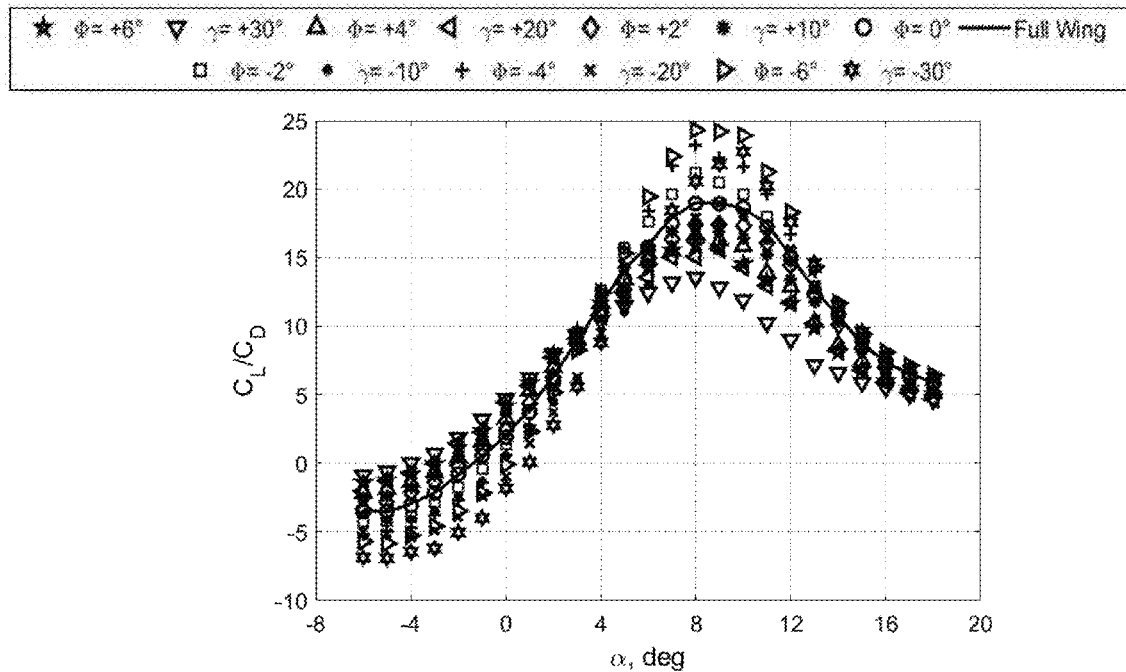
FIG. 19 is a graph showing lift to drag ratio for wing twist and aileron configurations.

The combined effects of lift and drag can be usefully combined by plotting the lift to drag ratio versus angle of attack (aerodynamic efficiency). To further discuss the advantage of the morphing system compared to a traditional aileron system $C_L/C_D$ will be used. This is shown in FIG. 19. Since the range of lift coefficient obtainable is very similar for both morphing and aileron configurations, drag coefficients are far difference and dictated $C_L/C_D$. In all of these configurations, and as would be expected, it can be clearly seen that the best $C_L/C_D$ occurred in $8°≤α≥10°$ and the principle effect on $C_L/C_D$ is one of a reducing magnitude with movement of aileron deflection magnitude and twist with positive deflection. With deflection of $γ=30°$, appear to show the worst with comparison to $ϕ=6°$, $\Delta(C_L/C_D)$ found to 17.5% less. In overall, performance is reduced 28.7% at $α=8°$ compare to full wing baseline model. This would actually be expected due to severe flow separation at the sudden and sharp discontinuity in ailerons. With further decrease aileron deflection angle to $γ=20°$, appear to be much closer producing 1.8% and 6.25% less performance than $ϕ=6°$ and $ϕ=4°$ respectively. This also shows how standard aileron systems decrease the aerodynamic efficiency of an aircraft over morphing twist. For $γ=10°$, interestingly similar trend was observed compare to $ϕ=2°$ with reduction of 0.5% ($C_L/C_D$=17.4 at $α=9°$). This also initiates that the small degree of deflection has small detrimental effects on aerodynamic performance.

To further quantify this improvement and through comparing positive and negative deflection for both aileron and morphing configurations, there is a significant improvement in terms of efficiency. For $ϕ=-6°$ configuration, best ($C_L/C_D$) is obtained as 24.3 at $α=8°$ and $C_L/C_D$ shows 18.3% improvement over aileron configuration ($γ=-30°$). This rate was 22% contrary to full baseline wing model. This reduces by reducing twist angle to $-4°$ with the efficiency reducing to 23.16 (4.7%). However, it is also promising the advantage over the aileron configuration of $γ=-20°$. Overall 22.66% improvements achieved at $α=8°$ and with further increase in angle of attack to $α=10°$, as expected improvement rate is reduced to 17.84%, which is still high. Interestingly, the $γ=-20°$ configuration performed similarly to a full span (zero-twist) wing profile due to low lift coefficient. As mentioned previously for a small positive angle of deflection ($γ=10°$) and twist $ϕ=2°$ have minor effect on aerodynamic performance, but in here, for negative angle configurations, 10.5% improvement was seen at $ϕ=-2°$ ($α=8°$) compare to full baseline wing model. Comparing $ϕ=-2°$ with $γ=-10°$, 12% improvement was achieved. Thus, this smooth and continuous morphing concept appears to be more aerodynamic efficiency than the use of a standard aileron design.

Figure 20:
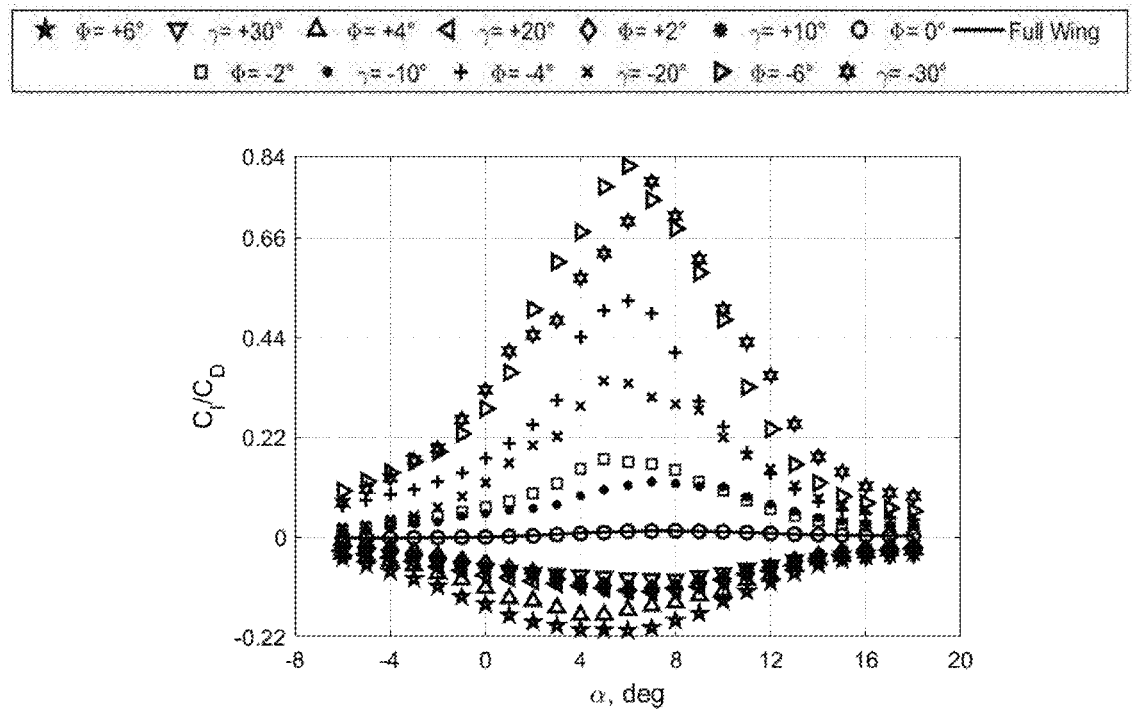
FIG. 20 is a graph showing rolling moment Coefficient versus drag coefficient.

Lastly, to compare the effectiveness of the two concepts, the roll/drag coefficient ratio is shown in FIG. 20. It can be clearly seen that increasing aileron and twist angles in both the positive and negative side increase the magnitudes of moments generated with maximum values occurring at maximum degrees of twist or aileron deflections. However, this ratio provides further insight into how the drag coefficient influences the efficiency of two configurations. This improved performance over the aileron configuration is seen at $ϕ=-6°$ with the results showing ($C_l/C_D$) approximately 14.95% ($α=6°$) higher than $γ=-30°$. This implies that morphing concept with $ϕ=-6°$ can provide similar roll moment like aileron ($γ=-30°$), but superior aerodynamic efficiency compare to aileron deflection. As far as $ϕ=-4°$ is concerned, 50% improvements are seen over $γ=-20°$. This would be expected because twist configurations do provide effective drag reduction while generating significant roll moments compared to standard aileron configurations. Further reduction in twist angle to $ϕ=-2°$, similar scenario as seen at $ϕ=-4°$ is continued with 38.6% improvement over $γ=-10°$. Thence, the negative twisted morphing concepts showed substantial improvement for $C_l/C_D$ in all cases presented over aileron configurations.

Considering the positive angle deflection in aileron and twist configurations, it can be seen from FIG. 20, the highest $C_l/C_D$ value was obtained at $ϕ=6°$. Comparing this with $ϕ=-6°$, due to drag increase in positive twist configuration tend to reduce the efficiency. Although efficiency is low, it still has reasonable improvements over the aileron configurations with 44% ($α=6°$) (compare to $γ=30°$). Interestingly, maximum $C_l/C_D$ was not occurred at maximum aileron deflection angle due to high lift-dependent drag at $γ=30°$. For $ϕ=4°$ configuration, maximum $C_l/C_D$ was found at $α=4°$ with 63% improvement over $γ=20°$. As far as $ϕ=2°$ considered, minor enhancement (1%) is obtained compare to $γ=10°$. As a results of this $C_l/C_D$ comparison clearly showed that the morphing configuration either in negative and positive twist provides substantial improvements in contrast to aileron configuration due to low drag coefficient.

Structural Comparison Between FEA and Prototype Morphing Wing

The structural deformation magnitudes without aero-load cases are shown in FIG. 21A-FIG. 22B. In general, there is good agreement between the computational and experimental results. It can be seen that the displacement magnitude in experimental modelling was 37 mm (FIG. 21A) and compare to 38.7 mm for the FEA (FIG. 21B). Similar results were also seen for negative twist configurations as shown in FIG. 22A-22B. It can be clearly seen that the negative twist (max) deformation magnitudes were 38.7 mm and 37 mm for the FEA and the experimental models respectively. As would be expected, there are slight differences between these two approaches ±2.5 mm thought mainly to originate from un-modelled friction forces between the ribs and elements.

Rolling Rate Comparison Between the Traditional Wing Structure and Prototype Morphing Wing Concept Actual flight testing of the concept was performed to demonstrate the viability of the design. Both full wing with aileron (unmodified baseline wing) modified wings (morphing concept) were tested and compared.

Figure 23:
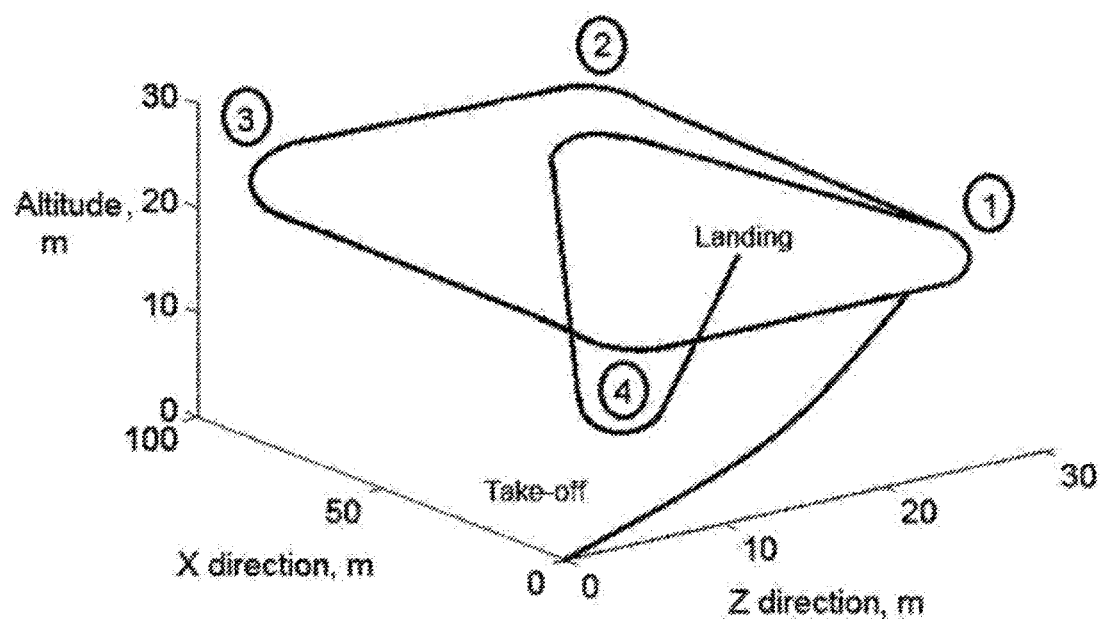
FIG. 23 shows altitude and Approximate Flight Path for a test flight.

The altitude and flight paths adapted shown in FIG. 23. Here, it can be seen that the pilot tried to do close approximations for both configurations. On the day of flight, the temperature was 6° and the wind speed nominally 5 mph. The flight testing started with a take-off position and climbed the desired altitude (30 m). Then the basic roll maneuvering was followed as numbered from 1 to 4. After the $4^{th}$ roll, the aircraft was landed. It should be also noted that, before and after each test, zero readings were obtained in order to achieve accurate results.

Figure 24A:
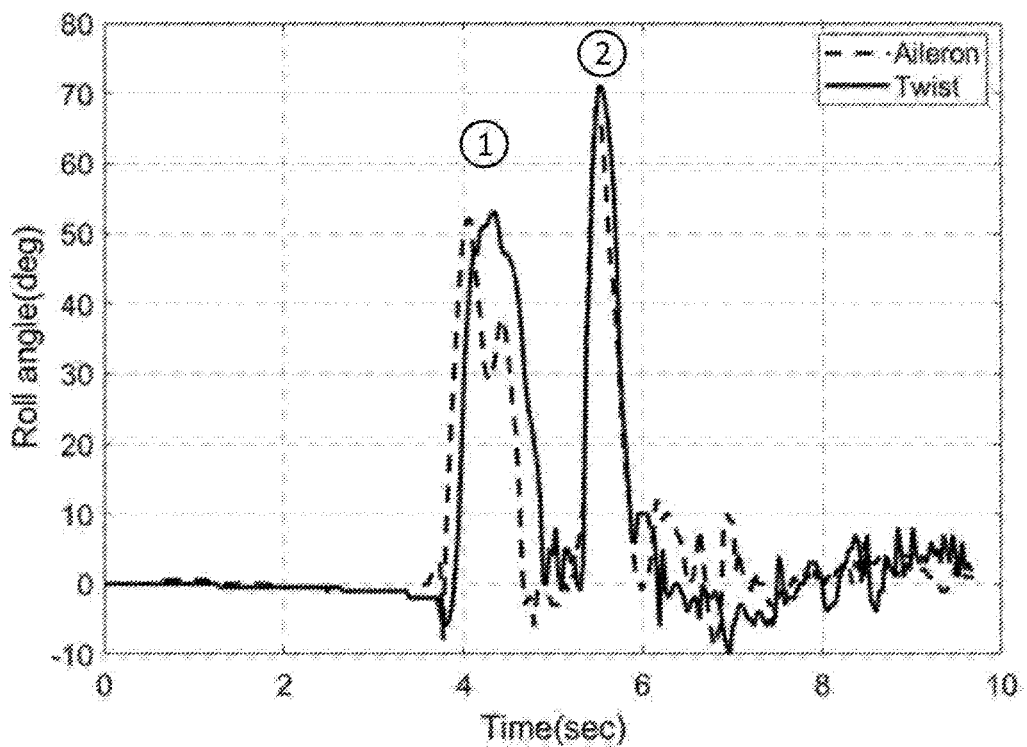
FIG. 24A shows flight Data for baseline (aileron) and morphing (twist) configuration: Roll angle for rotation 1 and 2.
Figure 24B:
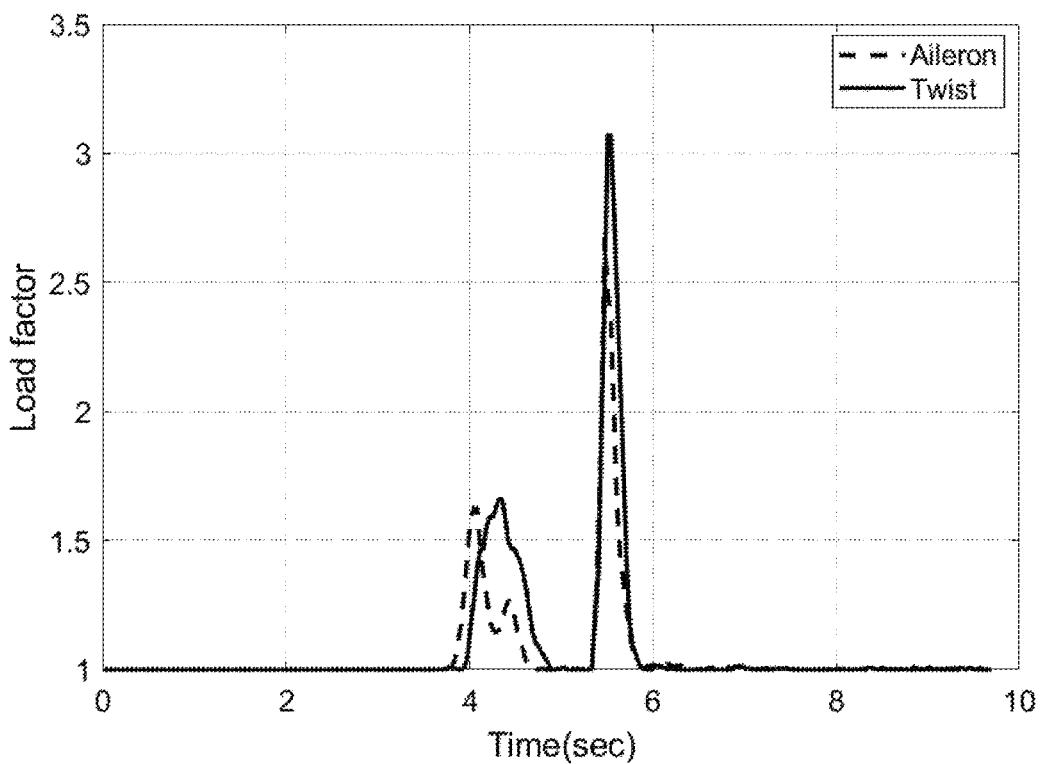
FIG. 24B shows flight Data for baseline (aileron) and morphing (twist) configuration: Load factor for rotation 1 and 2.
Figure 25A:
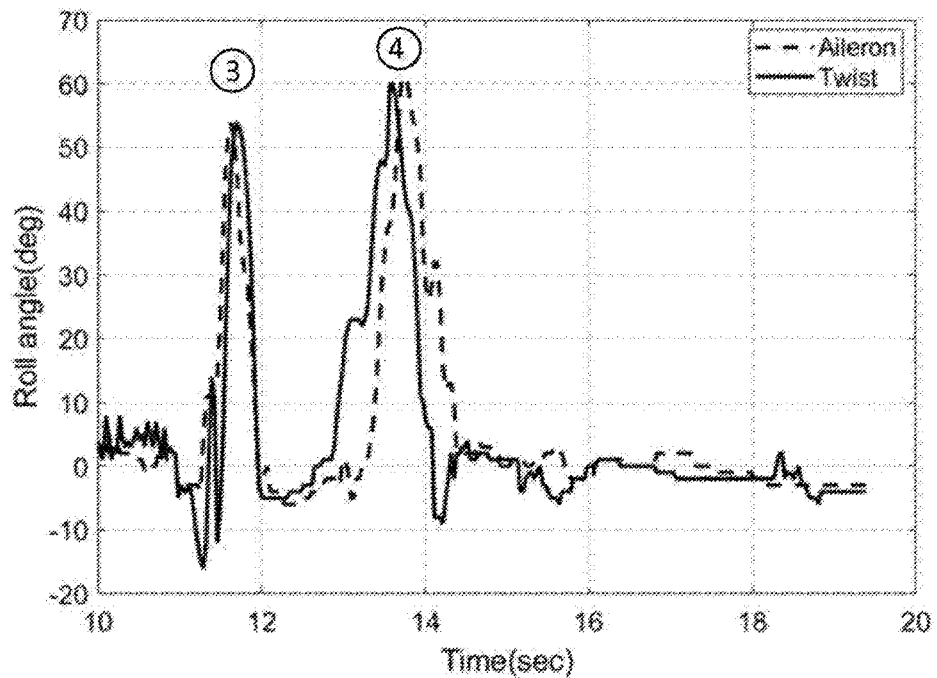
FIG. 25A shows flight Data for baseline (aileron) and morphing (twist) configuration: Roll angle for rotation 3 and 4.
Figure 25B:
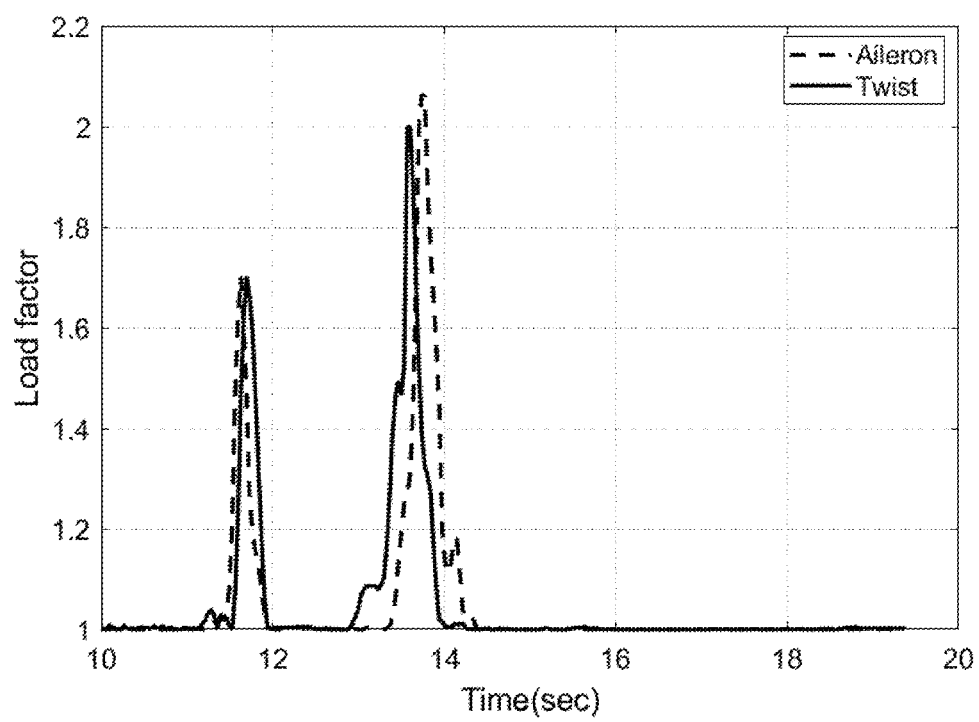
FIG. 25B shows flight Data for baseline (aileron) and morphing (twist) configuration: Load factor for rotation 3 and 4.

FIG. 24A-FIG. 25B illustrate the basic roll angle achieved for both morphing and baseline wing configurations. It can be seen that the achieved roll angle for both designs is very similar for number 1 and 2 (FIG. 24A). Comparing these results with FIG. 25A, similar results were obtained; nevertheless, the variation is less than the $1^{st}$ and $2^{nd}$ roll. Overall, results indicated that the morphing concept provides adequate roll moments and performance compared to traditional control surfaces.

Load factors for both the baseline (aileron) and morphing (twist) configurations are presented in FIG. 24A-FIG. 25B. The load factor (n) is defined as the ratio of the lift of the aircraft to its weight (Total weight baseline=5.698 kg morphing concept=5.805 kg). This dictates the load factor. It can be seen from FIG. 24B and FIG. 25B that the morphing concept produced more lift force than the baseline wing for this particular manoeuvre. Although the overall weight of the morphing wing structure is heavier than the baseline, it performed comparably for these tests.

Figure 26:
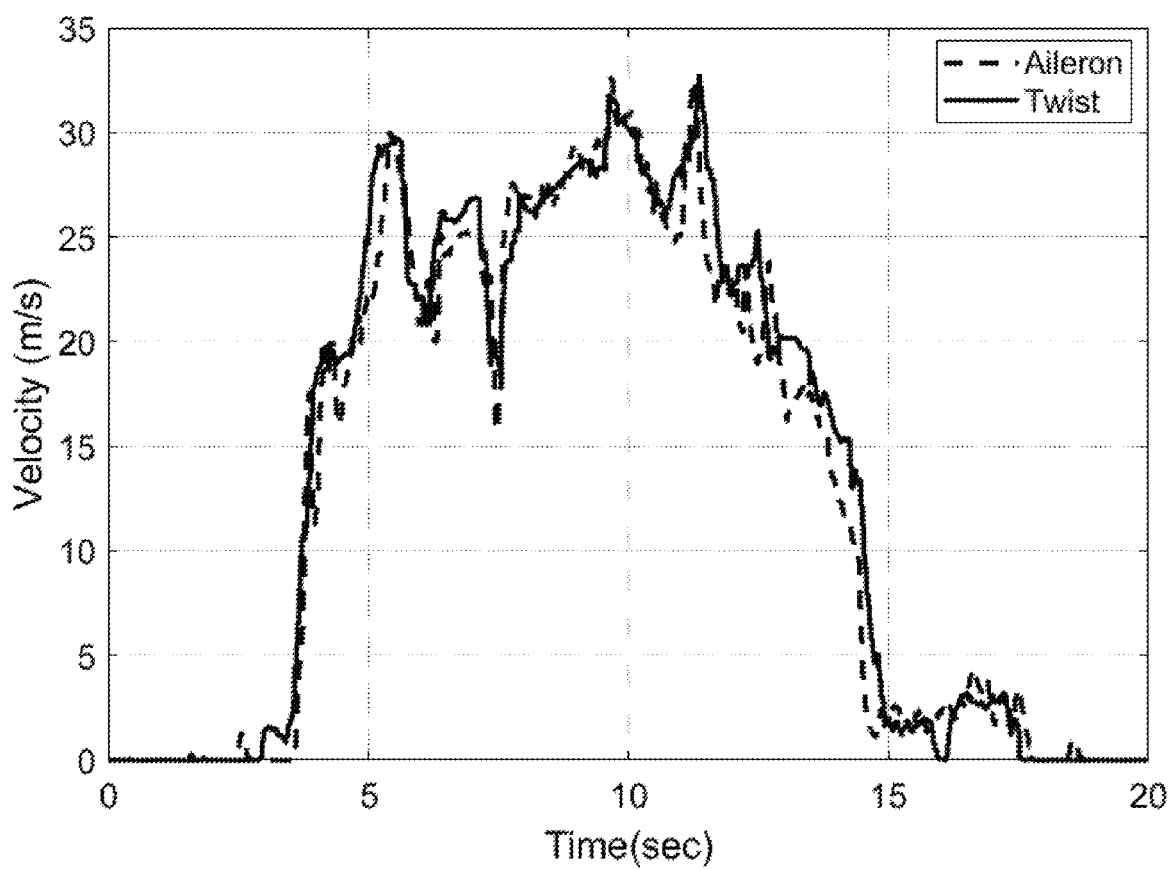
FIG. 26 shows a velocity profile for baseline (aileron) and morphing (twist) configurations.
Figure 27A:
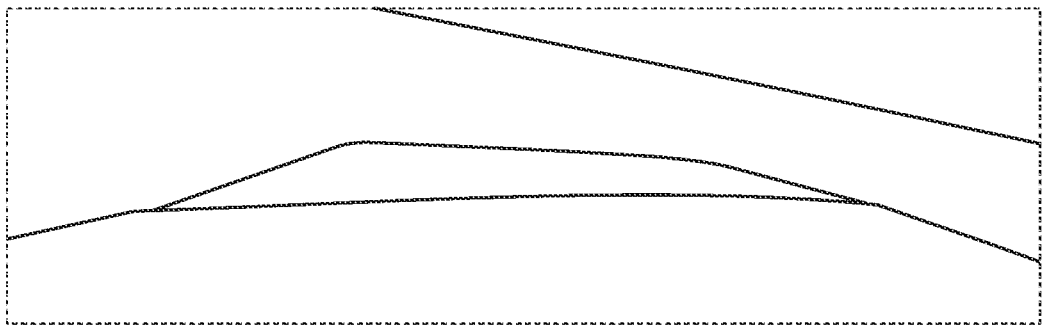
FIGS. 27A-27B show a morphing design during flight (washout).
Figure 27B:
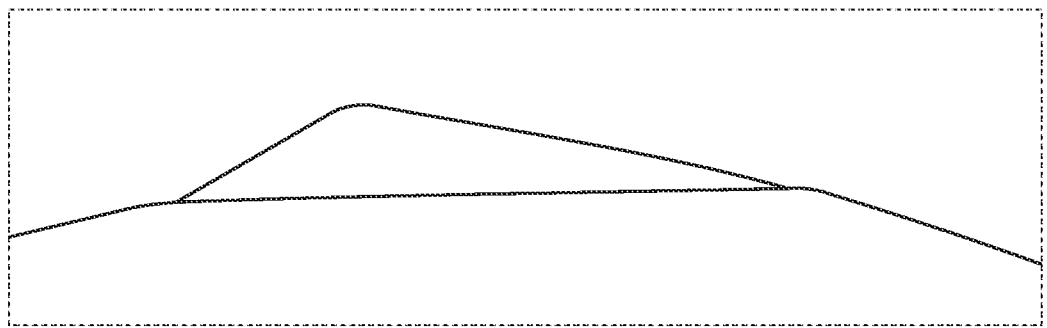
Figure 27C:
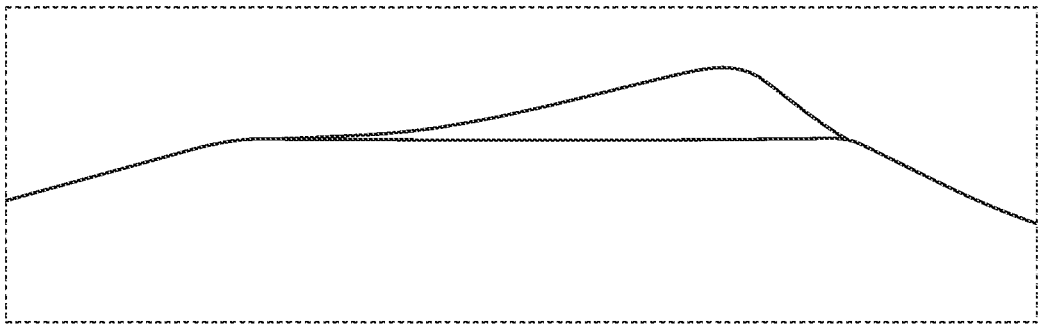
FIGS. 27C-27D show a morphing design during flight (washin).
Figure 27D:
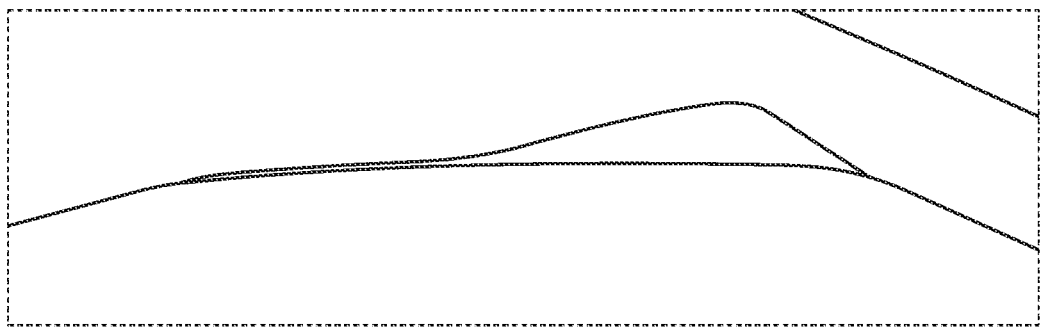

In order to measure the efficiency of the morphing concept at rolling, the velocity was measured during the flight. This would provide some insight into relation drag increase in the turn. The velocity plot for both the morphing and baseline configurations is shown in FIG. 26. It can be clearly seen that, during the rotation, a high velocity was achieved for morphing wing configuration, implying less drag production than the baseline (aileron) configuration. According to data, the velocity for the twist wing is 15% higher than the baseline configuration at time=7.5 sec.

According to the Pilot (Dr Alvin Gatto): "Both configurations were able to achieve the basic maneuvering. However, it was noticeable that the morphing wing enhanced performance without losing excessive velocity profile in the turn".

Figure 28:
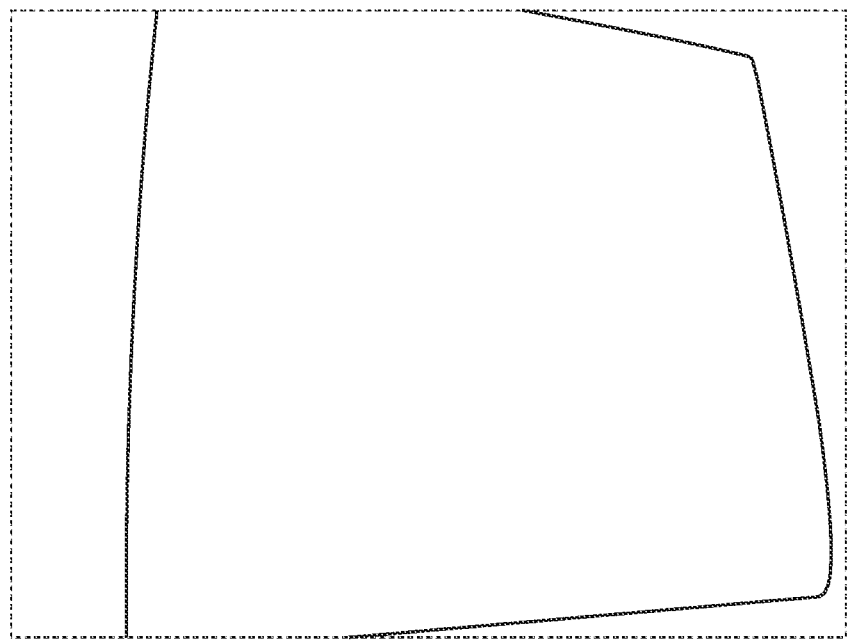
FIG. 28 shows a morphing design after flight testing.

In at least some embodiments, it is important that skin remain smooth. FIG. 28 illustrates the skin of the morphing concept after testing. It was clearly seen that no undue deformation existed and the configuration survived the flight. Further indications of performances can be gained from detailed flight pictures obtained during the test flights via a HD Rc Logger in-flight camera FIG. 27A-FIG. 27D. It can be clearly seen that the wash-in and wash-out configurations performed very well with smooth surface changes (FIG. 28) with no large undesired structural separations and/or surface wrinkling.

A design of variable twist wings and adaptive skin concepts were described. According to results, the implemented and investigated morphing concept showed adequate aerodynamic efficiency as well as control moment for aircrafts. Moreover, the split rib design illustrates good agreement with numerical analysis (ANSYS). Finally, a morphing design also provided shape changing performance with smooth aerodynamic surface finish. Leading to the design being a viable skin for morphing application.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

What is claimed is:

1. A blade or wing comprising a blade or wing element comprising:
   (a) many ribs slidable with respect to one another whereby to vary an aerodynamic configuration of said wing element by causing a twist thereof,
   wherein the leading edge and trailing edge of each rib are at said leading edge and trailing edge of said blade or wing; and
   wherein said ribs are adjacent and substantially without gaps between adjacent ribs whereby to provide a substantially smooth surface to said blade or wing element.
2. The blade or wing of claim 1 further comprising:
   (b) a plurality of actuators, each actuator of said plurality of actuators being coupled to an associated rib and each actuator being operable to rotate said respective associated rib.
3. The blade or wing of claim 2, wherein each said actuator is coupled to a main spar and is operable to rotate said respective rib with respect to said main spar.
4. The blade or wing of claim 3, wherein each actuator is coupled to the main spar via a lever arm.
5. The blade or wing of claim 4, wherein each actuator is operable to cause the respective lever arm to rotate about a pivot position in the main spar to cause a rotation of the respective rib.
6. The blade or wing of claim 2, wherein each actuator includes a servomotor.
7. The blade or wing of claim 1, wherein the ribs are coupled together by a linkage member configured to resist relative rotation of the ribs.
8. The blade or wing of claim 1, including at least one stiffening rod coupled to each of the ribs to resist relative rotation of the ribs.
9. The blade or wing of claim 1, wherein the ribs are uncovered.
10. The blade or wing of claim 1, wherein the ribs are compliant to deformation in width.
11. An aerodynamic apparatus including said blade or wing element according to claim 1.
12. The aerodynamic apparatus of claim 11, wherein said aerodynamic apparatus is an aircraft or a wind turbine.
13. The aerodynamic apparatus of claim 11, wherein said aerodynamic apparatus is a wind turbine.
14. The blade or wing of claim 1 wherein each rib comprises an elastomeric material and a rigid support.
15. The blade or wing of claim 1 wherein the wing element is over the complete wing span.
16. A method of assembling a blade or wing element wherein said blade or wing element comprises many ribs rotatable or slidable with respect to one another whereby to vary an aerodynamic configuration of said wing element by causing a twist thereof,
   wherein the leading edge and trailing edge of each rib are at said leading edge and trailing edge of said blade or wing; and
   wherein said ribs are adjacent and substantially without gaps between adjacent ribs whereby to provide a substantially smooth surface to said blade or wing element,
   said method comprising compressing said ribs before coupling an at least one stiffening rod.

* * * * *